(12) United States Patent
Ogawa et al.

(10) Patent No.: US 9,441,158 B2
(45) Date of Patent: Sep. 13, 2016

(54) LIQUID CRYSTAL DISPLAY DEVICE

(71) Applicant: DIC CORPORATION, Tokyo (JP)

(72) Inventors: Shinji Ogawa, Saitama (JP); Yoshinori Iwashita, Saitama (JP); Seiji Funakura, Kamisu (JP); Isao Oshiumi, Tokyo (JP); Katsunori Shimada, Sakura (JP)

(73) Assignee: DIC CORPORATION, Tokyo (JP)

( * ) Notice: Subject to any disclaimer, the term of this patent is extended or adjusted under 35 U.S.C. 154(b) by 0 days.

(21) Appl. No.: 14/346,590

(22) PCT Filed: May 23, 2013

(86) PCT No.: PCT/JP2013/064762
§ 371 (c)(1),
(2) Date: Mar. 21, 2014

(87) PCT Pub. No.: WO2014/192079
PCT Pub. Date: Dec. 4, 2014

(65) Prior Publication Data
US 2016/0152893 A1 Jun. 2, 2016

(51) Int. Cl.
*C09K 19/42* (2006.01)
*C09K 19/12* (2006.01)
(Continued)

(52) U.S. Cl.
CPC .......... *C09K 19/30* (2013.01); *C09K 19/3003* (2013.01); *C09K 19/3066* (2013.01);
(Continued)

(58) Field of Classification Search
CPC .. C09K 19/12; C09K 19/20; C09K 19/2007; C09K 19/3066; C09K 19/30; C09K 19/3068; C09K 19/42; C09K 19/60; C09K 2019/0448; C09K 2019/0466; C09K 2019/122; C09K 2019/123; C09K 2019/2007; C09K 2019/3004; C09K 2019/3009; C09K 2019/301; C09K 2019/3015; C09K 2019/3016; C09K 2019/3021; C09K 2019/3027; C09K 2019/3071; C09K 2019/3075; C09K 2019/523
See application file for complete search history.

(56) References Cited

U.S. PATENT DOCUMENTS 8,860,912 B2 * 10/2014 Kaneoya ................. G02B 5/201
                                                    252/299.1
8,885,124 B2 * 11/2014 Kaneoya ............ C09K 19/3066
                                                    252/299.1
(Continued)

FOREIGN PATENT DOCUMENTS

JP     2000-019321 A    1/2000
JP     2000-192040 A    7/2000
(Continued)

OTHER PUBLICATIONS

International Search Report for PCT/JP2013/064762, Mailing Date of Aug. 20, 2013.
(Continued)

*Primary Examiner* — Shean C Wu
(74) *Attorney, Agent, or Firm* — Westerman, Hattori, Daniels & Adrian, LLP

(57) ABSTRACT

The present invention provides a liquid crystal display device which prevents a decrease in the voltage holding ratio (VHR) of a liquid crystal layer and an increase in ion density (ID) therein and which overcomes problems of defective display such as dropouts, uneven alignment, and screen burn-in. The liquid crystal display device of the present invention prevents a decrease in the voltage holding ratio (VHR) of a liquid crystal layer and an increase in ion density (ID) therein and reduces defective display such as screen burn-in; hence, such a liquid crystal display device is properly used as liquid crystal display devices of a VA mode and PSVA mode which involve active matrix driving and can be applied to liquid crystal display devices of liquid crystal TV sets, monitors, mobile phones, and smartphones.

17 Claims, 1 Drawing Sheet

(51) Int. Cl.
*C09K 19/20* (2006.01)
*C09K 19/30* (2006.01)
*G02F 1/1335* (2006.01)
*C09K 19/60* (2006.01)
*C09K 19/04* (2006.01)

(52) U.S. Cl.
CPC ............... *C09K19/42* (2013.01); *C09K 19/60* (2013.01); *G02F 1/133512* (2013.01); *G02F 1/133514* (2013.01); *C09K 19/12* (2013.01); *C09K 19/20* (2013.01); *C09K 19/2007* (2013.01); *C09K 19/3068* (2013.01); *C09K 2019/0448* (2013.01); *C09K 2019/0466* (2013.01); *C09K 2019/122* (2013.01); *C09K 2019/123* (2013.01); *C09K 2019/301* (2013.01); *C09K 2019/3004* (2013.01); *C09K 2019/3009* (2013.01); *C09K 2019/3015* (2013.01); *C09K 2019/3016* (2013.01); *C09K 2019/3021* (2013.01); *C09K 2019/3027* (2013.01); *C09K 2019/3071* (2013.01); *C09K 2019/3075* (2013.01)

(56) References Cited

U.S. PATENT DOCUMENTS

| | | | |
|---|---|---|---|
| 9,120,968 B2 * | 9/2015 | Kaneoya | C09K 19/3066 |
| 2009/0162576 A1 | 6/2009 | Lee et al. | |
| 2011/0297881 A1 | 12/2011 | Hirata et al. | |
| 2012/0236246 A1 | 9/2012 | Furusato et al. | |
| 2013/0135575 A1 | 5/2013 | Goto et al. | |
| 2014/0028964 A1 | 1/2014 | Klassen-Memmer et al. | |
| 2015/0315471 A1 * | 11/2015 | Ogawa | C09K 19/44 349/106 |
| 2016/0009997 A1 * | 1/2016 | Ogawa | C09K 19/3066 349/106 |

FOREIGN PATENT DOCUMENTS

| | | |
|---|---|---|
| JP | 2002-309255 A | 10/2002 |
| JP | 2003-295169 A | 10/2003 |
| JP | 2009-109542 A | 5/2009 |
| JP | 2009-203426 A | 9/2009 |
| JP | 2012-032697 A | 2/2012 |
| TW | 200829965 A | 7/2008 |
| TW | 201245426 A | 11/2012 |
| TW | 201321484 A | 6/2013 |
| WO | 2010/095506 A1 | 8/2010 |
| WO | 2011/092973 A1 | 8/2011 |

OTHER PUBLICATIONS

Decision to Grant a Patent for JP2013-540151, Mailing Date of Oct. 17, 2013.

* cited by examiner

LIQUID CRYSTAL DISPLAY DEVICE

TECHNICAL FIELD

The present invention relates to a liquid crystal display device.

BACKGROUND ART

Liquid crystal display devices have been applied to, for example, watches, calculators, a variety of household electrical appliances, measuring equipment, panels used in automobiles, word processors, electronic notebooks, printers, computers, and television sets. Representative examples of types of liquid crystal display devices include a TN (twisted nematic) type, an STN (super twisted nematic) type, a DS (dynamic scattering) type, a GH (guest•host) type, an IPS (in-plane switching) type, an OCB (optically compensated birefringence) type, an ECB (electrically controlled birefringence) type, a VA (vertical alignment) type, a CSH (color super homeotropic) type, and an FLC (ferroelectric liquid crystal) type. Regarding a drive system, multiplex driving has become popular instead of typical static driving; a simple matrix, in particular, an active matrix (AM) in which, for example, a TFT (thin film transistor) or TFD (thin film diode) is used have become mainstream in recent years.

As illustrated in FIG. 1, in a general color liquid crystal display device, a transparent electrode layer (3a) as a common electrode and a color filter layer (2) are disposed between one of two substrates (1) and one of alignment films (4) provided so as to correspond thereto, a pixel electrode layer (3b) is disposed between the other substrate (1) and the other alignment film, the substrates are disposed such that the alignment films face each other, and a liquid crystal layer (5) is disposed therebetween.

The color filter layer is a color filter consisting of a black matrix, a red layer (R), a green layer (G), a blue layer (B), and optionally a yellow layer (Y).

Impurities remaining in liquid crystal materials of a liquid crystal layer have a large effect on the electrical properties of a display device, and impurities have been therefore highly controlled. In terms of materials of alignment films, it has been known that impurities remaining in the alignment films which directly contact a liquid crystal layer shift to the liquid crystal layer with the result that the impurities affect the electrical properties of the liquid crystal layer; hence, the relationship between the properties of liquid crystal display devices and impurities contained in materials of alignment films have been being studied.

Also in terms of materials, such as organic pigments, used for a color filter layer, it is believed that impurities contained therein have an effect on a liquid crystal layer as in materials of alignment films. However, since an alignment film and a transparent electrode are disposed between the color filter layer and the liquid crystal layer, it has been believed that direct effect thereof on the liquid crystal layer is significantly smaller than that of materials of the alignment film. In general, however, the thickness of the alignment film is only not more than 0.1 μm, and the thickness of the transparent electrode that is a common electrode disposed on the color filter layer side is not more than 0.5 μm even in the case where the thickness is increased to enhance the electric conductivity. Hence, the color filter layer and the liquid crystal layer are not in a state in which they are completely isolated from each other, and the color filter layer may therefore cause problems due to impurities which are contained in the color filter layer and which pass through the alignment film and the transparent electrode, such as a decrease in the voltage holding ratio (VHR) of the liquid crystal layer and defective display, e.g., dropouts due to increased ion density (ID), uneven alignment, and screen burn-in.

Techniques for overcoming defective display caused by impurities present in a pigment contained in the color filter layer have been studied, such as a technique in which dissolution of impurities in liquid crystal is controlled by use of a pigment in which the amount of an extract from the pigment by ethyl formate is at a predetermined level or lower (Patent Literature 1) and a technique in which dissolution of impurities in liquid crystal is controlled by use of a specific pigment for a blue layer (Patent Literature 2). These techniques, however, are substantially not different from merely reducing the impurity content in a pigment and are insufficient to overcome defective display even in a current situation in which a technique for purifying pigments has been advanced.

In another disclosed technique that, attention is paid to the relationship between organic impurities contained in a color filter layer and a liquid crystal composition, the degree in which the organic impurities are less likely to be dissolved in a liquid crystal layer is represented by the hydrophobic parameter of liquid crystal molecules contained in the liquid crystal layer, and the hydrophobic parameter is adjusted to be at a predetermined level or more; furthermore, since such a hydrophobic parameter has a correlation with a —$OCF_3$ group present at an end of a liquid crystal molecule, a liquid crystal composition is prepared so as to contain a certain amount of a liquid crystal compound having a —$OCF_3$ group at an end of each liquid crystal molecule thereof (Patent Literature 3).

Also in this disclosure, however, the technique is substantially for reducing effects of impurities present in a pigment on the liquid crystal layer, and a direct relationship between the structure of a colorant, such as a dye or a pigment, used for the color filter and the structure of a liquid crystal material is not considered.

In a technique for forming a black matrix, a film is formed of chromium (Cr), chromium metal such as chromium oxide (CrOX), or a chromium metal compound by, for example, sputtering, an etching resist pattern is formed of a positive photoresist on the resulting thin film, exposed part of the chromium metal film is etched, and the etching resist pattern is removed; in another technique, a black matrix is formed by photolithography using a photosensitive colored resin composition in which a black pigment such as carbon black has been dispersed.

A technique is disclosed, in which a high-resistance carbon black or titanium black is used for a black matrix to overcome uneven color and generation of afterimages (Patent Literature 4); however, such a technique is not effective for overcoming defective display in liquid crystal display devices which have been highly developed in recent years.

Furthermore, another technique is disclosed, in which a photosensitive composition used for a black matrix and containing blue, yellow, red organic pigments is highly insulating and has a low dielectric constant and high optical density (Patent Literature 5); however, the display characteristics of a liquid crystal display device in which such a composition is used are not considered, and such a technique is not therefore effective for overcoming defective display in liquid crystal display devices which have been highly developed in recent years.

3

CITATION LIST

Patent Literature

PTL 1: Japanese Unexamined Patent Application Publication No. 2000-19321
PTL 2: Japanese Unexamined Patent Application Publication No. 2009-109542
PTL 3: Japanese Unexamined Patent Application Publication No. 2000-192040
PTL 4: Japanese Unexamined Patent Application Publication No. 2003-295169
PTL 5: Japanese Unexamined Patent Application Publication No. 2012-32697

SUMMARY OF INVENTION

Technical Problem

It is an object of the present invention to provide a liquid crystal display device in which a specific liquid crystal composition and a color filter having a black matrix using a specific pigment are used to prevent a decrease in the voltage holding ratio (VHR) of a liquid crystal layer and an increase in ion density (ID) therein and to overcome problems of defective display such as dropouts, uneven alignment, and screen burn-in.

Solution to Problem

In order to achieve the above-mentioned object, the inventor has intensively studied a structural combination of a colorant, such as a pigment, used for a black matrix of a color filter and a liquid crystal material used for a liquid crystal layer and found that a liquid crystal display device involving use of a specific liquid crystal material and a color filter having a black matrix in which a specific pigment is used enables prevention of a decrease in the voltage holding ratio (VHR) of the liquid crystal layer and an increase in ion density (ID) therein and enables solution of problems of defective display such as dropouts, uneven alignment, and screen burn-in, thereby accomplishing the present invention.

In particular, an aspect of the present invention provides a liquid crystal display device including a first substrate, a second substrate, a liquid crystal composition layer disposed between the first substrate and the second substrate, a color filter including a black matrix and at least RGB three-color pixel portions, a pixel electrode, and a common electrode, wherein
the liquid crystal composition layer contains a liquid crystal composition containing a compound represented by general formula (I) in an amount of 30 to 50%

[Chem. 1]

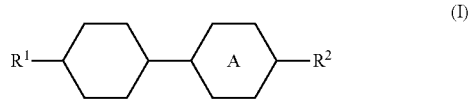

(I)

(where $R^1$ and $R^2$ each independently represent an alkyl group having 1 to 8 carbon atoms, an alkenyl group having 2 to 8 carbon atoms, an alkoxy group having 1 to 8 carbon atoms, or an alkenyloxy group having 2 to 8 carbon atoms; and A represents a 1,4-phenylene group or a trans-1,4-cyclohexylene group), a compound represented by general formula (II-1) in an amount of 5 to 30%

[Chem. 2]

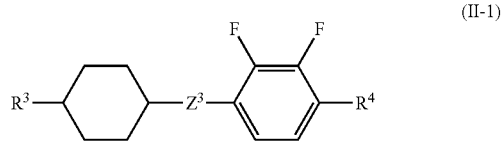

(II-1)

(where $R^3$ represents an alkyl group having 1 to 8 carbon atoms, an alkenyl group having 2 to 8 carbon atoms, an alkoxy group having 1 to 8 carbon atoms, or an alkenyloxy group having 2 to 8 carbon atoms; $R^4$ represents an alkyl group having 1 to 8 carbon atoms, an alkenyl group having 4 to 8 carbon atoms, an alkoxy group having 1 to 8 carbon atoms, or an alkenyloxy group having 3 to 8 carbon atoms; and $Z^3$ represents a single bond, —CH=CH—, —C≡C—, —CH$_2$CH$_2$—, —(CH$_2$)$_4$—, —COO—, —OCO—, —OCH$_2$—, —CH$_2$O—, —OCF$_2$—, or —CF$_2$O—), and a compound represented by general formula (II-2) in an amount of 25 to 45%

[Chem. 3]

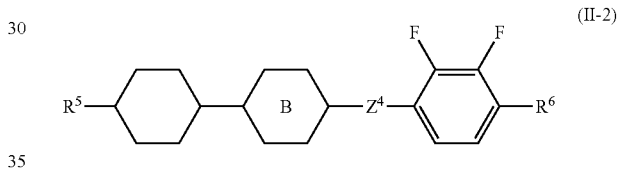

(II-2)

(where $R^5$ represents an alkyl group having 1 to 8 carbon atoms, an alkenyl group having 2 to 8 carbon atoms, an alkoxy group having 1 to 8 carbon atoms, or an alkenyloxy group having 2 to 8 carbon atoms; R represents an alkyl group having 1 to 8 carbon atoms, an alkenyl group having 4 to 8 carbon atoms, an alkoxy group having 1 to 8 carbon atoms, or an alkenyloxy group having 3 to 8 carbon atoms; B represents a 1,4-phenylene group or trans-1,4-cyclohexylene group which is optionally substituted with a fluorine atom; and $Z^4$ represents a single bond, —CH=CH—, —C≡C—, —CH$_2$CH$_2$—, —(CH$_2$)$_4$—, —COO—, —OCO—, —OCH$_2$—, —CH$_2$O—, —OCF$_2$—, or —CF$_2$O—), and the black matrix contains a colorant that is at least one pigment selected from carbon black, titanium black, and an organic pigment.

Advantageous Effects of Invention

In the liquid crystal display device of the present invention, using a specific liquid crystal composition and a color filter having a black matrix in which a specific pigment is used enables prevention of a decrease in the voltage holding ratio (VHR) of a liquid crystal layer and an increase in ion density (ID) therein and enables prevention of defective display such as dropouts, uneven alignment, and screen burn-in.

Figure 1:
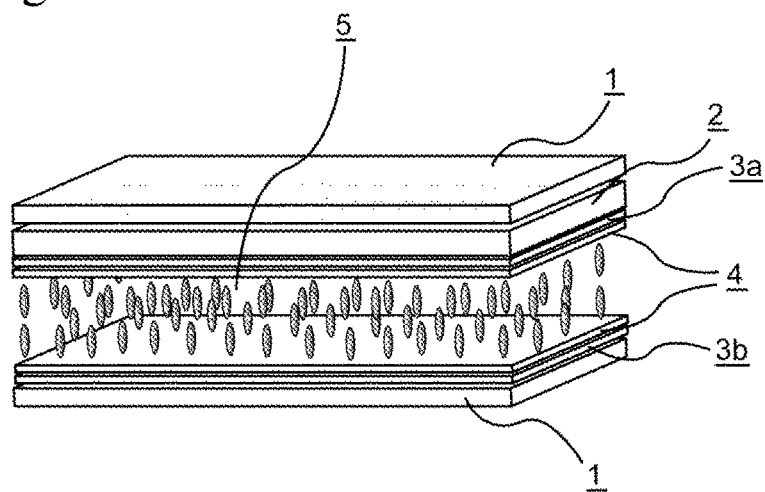
FIG. 1 illustrates an example of typical liquid crystal display devices generally used.

REFERENCE SIGNS LIST 1 substrate
2 color filer layer
2a color filter layer having black matrix in which specific pigment is used
3a transparent electrode layer (common electrode)
3b pixel electrode layer
4 alignment film
5 liquid crystal layer
5a liquid crystal layer containing specific liquid crystal composition

DESCRIPTION OF EMBODIMENTS

Figure 2:
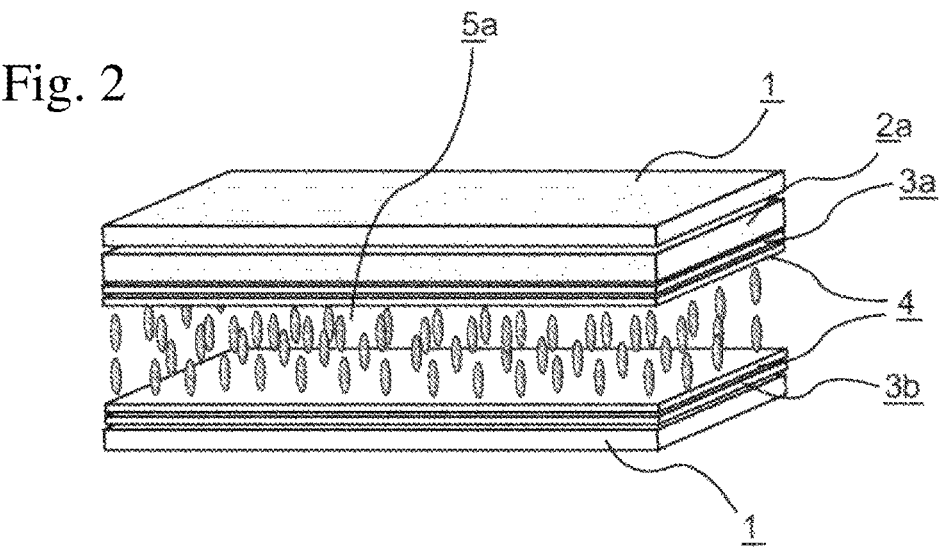
FIG. 2 illustrates an example of the liquid crystal display device of the present invention.

FIG. 2 illustrates an example of the liquid crystal display device of the present invention. In the liquid crystal display device, a transparent electrode layer (3a) as a common electrode and a color filter layer (2) having a black matrix containing a specific pigment are disposed between one of two substrates (1) of first and second substrates and one of alignment films (4) provided so as to correspond thereto, a pixel electrode layer (3b) is disposed between the other substrate and the other alignment film, the substrates are disposed such that the alignment films face each other, and a liquid crystal layer (5a) containing a specific liquid crystal composition is disposed therebetween.

In the display device, the two substrates are attached to each other with a sealant and a sealing material placed at the peripheries thereof, and particulate spacers or spacer columns formed of resin by photolithography are disposed between the substrates to maintain the distance therebetween in many cases.

(Liquid Crystal Layer)

The liquid crystal layer of the liquid crystal display device of the present invention is composed of a liquid crystal composition containing a compound represented by general formula (I) in an amount of 30 to 50%

[Chem. 4]

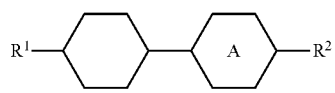

(I)

(where $R^1$ and $R^2$ each independently represent an alkyl group having 1 to 8 carbon atoms, an alkenyl group having 2 to 8 carbon atoms, an alkoxy group having 1 to 8 carbon atoms, or an alkenyloxy group having 2 to 8 carbon atoms; and A represents a 1,4-phenylene group or a trans-1,4-cyclohexylene group), a compound represented by general formula (II-1) in an amount of 5 to 30%

[Chem. 5]

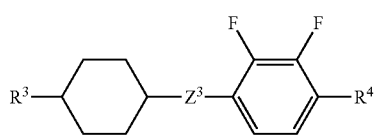

(II-1)

(where $R^3$ represents an alkyl group having 1 to 8 carbon atoms, an alkenyl group having 2 to 8 carbon atoms, an alkoxy group having 1 to 8 carbon atoms, or an alkenyloxy group having 2 to 8 carbon atoms; $R^4$ represents an alkyl group having 1 to 8 carbon atoms, an alkenyl group having 4 to 8 carbon atoms, an alkoxy group having 1 to 8 carbon atoms, or an alkenyloxy group having 3 to 8 carbon atoms; and $Z^3$ represents a single bond, —CH=CH—, —C≡C—, —CH$_2$CH$_2$—, —(CH$_2$)$_4$—, —COO—, —OCO—, —OCH$_2$—, —CH$_2$O—, —OCF$_2$—, or —CF$_2$O—), and a compound represented by general formula (II-2) in an amount of 25 to 45%

[Chem. 6]

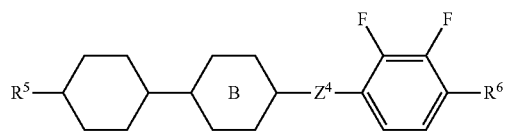

(II-2)

(where $R^5$ represents an alkyl group having 1 to 8 carbon atoms, an alkenyl group having 2 to 8 carbon atoms, an alkoxy group having 1 to 8 carbon atoms, or an alkenyloxy group having 2 to 8 carbon atoms; $R^6$ represents an alkyl group having 1 to 8 carbon atoms, an alkenyl group having 4 to 8 carbon atoms, an alkoxy group having 1 to 8 carbon atoms, or an alkenyloxy group having 3 to 8 carbon atoms; B represents a 1,4-phenylene group or trans-1,4-cyclohexylene group which is optionally substituted with a fluorine atom; and $Z^4$ represents a single bond, —CH=CH—, —C≡C—, —CH$_2$CH$_2$—, —(CH$_2$)$_4$—, —COO—, —OCO—, —OCH$_2$—, —CH$_2$O—, —OCF$_2$—, or —CF$_2$O—).

The amount of the compound represented by general formula (I) in the liquid crystal layer of the liquid crystal display device of the present invention is 30 to 50%, preferably 32 to 48%, and more preferably 34 to 46%.

In general formula (I), $R^1$ and $R^2$ each independently represent an alkyl group having 1 to 8 carbon atoms, an alkenyl group having 2 to 8 carbon atoms, an alkoxy group having 1 to 8 carbon atoms, or an alkenyloxy group having 2 to 8 carbon atoms; in the case where A is a trans-1,4-cyclohexylene group, $R^1$ and $R^2$ preferably each independently represent an alkyl group having 1 to 5 carbon atoms, an alkenyl group having 2 to 5 carbon atoms, an alkoxy group having 1 to 5 carbon atoms, or an alkenyloxy group having 2 to 5 carbon atoms; and more preferably an alkyl group having 2 to 5 carbon atoms, an alkenyl group having 2 to 4 carbon atoms, an alkoxy group having 1 to 4 carbon atoms, or an alkenyloxy group having 2 to 4 carbon atoms.

$R^1$ preferably represents an alkyl group; in this case, an alkyl group having 2, 3, or 4 carbon atoms is especially preferred. In the case where $R^1$ represents an alkyl group having 3 carbon atoms, $R^2$ is preferably an alkyl group having 2, 4, or 5 carbon atoms or an alkenyl group having 2 or 3 carbon atoms, and more preferably an alkyl group having 2 carbon atoms.

In the case where A represents a 1,4-phenylene group, $R^1$ and $R^2$ preferably each independently represent an alkyl group having 1 to 5 carbon atoms, an alkenyl group having 4 or 5 carbon atoms, an alkoxy group having 1 to 5 carbon atoms, or an alkenyloxy group having 3 to 5 carbon atoms; and
more preferably an alkyl group having 2 to 5 carbon atoms, an alkenyl group having 4 or 5 carbon atoms, an alkoxy group having 1 to 4 carbon atoms, or an alkenyloxy group having 2 to 4 carbon atoms.

$R^1$ preferably represents an alkyl group; in this case, an alkyl group having 1, 3, or 5 carbon atoms is especially preferred. In addition, $R^2$ preferably represents an alkoxy group having 1 or 2 carbon atoms.

The amount of a compound represented by general formula (I) in which at least one of the substituents $R^1$ and $R^2$ is an alkyl group having 3 to 5 carbon atoms preferably accounts for not less than 50% of the total amount of compounds represented by general formula (I), more preferably not less than 70%, and further preferably not less than 80%. Moreover, the amount of a compound represented by general formula (I) in which at least one of the substituents $R^1$ and $R^2$ is an alkyl group having 3 carbon atoms preferably accounts for not less than 50% of the total amount of compounds represented by general formula (I), more preferably not less than 70%, further preferably not less than 80%, and most preferably 100%.

One or more compounds represented by general formula (I) can be used, and at least one compound in which A represents a trans-1,4-cyclohexylene group and at least one compound in which A represents a 1,4-phenylene group are preferably used.

The amount of a compound represented by general formula (I) in which A represents a trans-1,4-cyclohexylene group preferably accounts for not less than 50% of the total amount of compounds represented by general formula (I), more preferably not less than 70%, and further preferably not less than 80%.

In particular, preferred examples of compounds represented by general formula (I) include the following compounds represented by general formulae (Ia) to (Ik):

[Chem. 7]

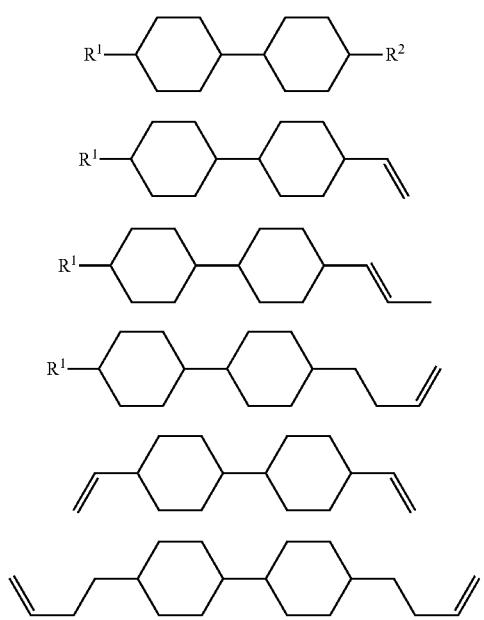

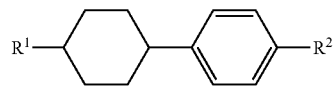

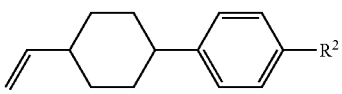

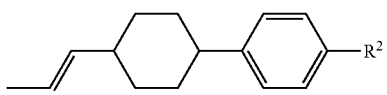

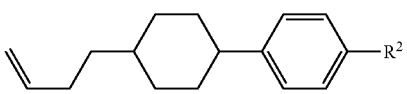

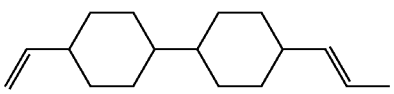

(where $R^1$ and $R^2$ each independently represent an alkyl group having 1 to 5 carbon atoms or an alkoxy group having 1 to 5 carbon atoms, and preferred $R^1$ and $R^2$ are the same as specified in general formula (I)).

Among general formulae (Ia) to (Ik), general formulae (Ia), (Ic), and (Ig) are preferred, general formulae (Ia) and (Ig) are more preferred, and general formula (Ia) is especially preferred; in order to emphasize response speed, general formula (Ib) is also preferred; in order to further emphasize response speed, general formulae (Ib), (Ic), (Ie), and (Ik) are preferred, and general formulae (Ic) and (Ik) are more preferred; and in order to especially emphasize response speed, a dialkenyl compound represented by general formula (Ik) is preferred.

From such a viewpoint, the amounts of compounds represented by general formulae (Ia) and (Ic) preferably account for not less than 50% of the total amount of compounds represented by general formula (I), more preferably not less than 70%, further preferably not less than 80%, and most preferably 100%. The amount of a compound represented by general formula (Ia) preferably accounts for not less than 50% of the total amount of compounds represented by general formula (I), more preferably not less than 70%, and further preferably not less than 80%.

The amount of the compound represented by general formula (II-1) in liquid crystal layer of the liquid crystal display device of the present invention is from 5 to 30%, preferably 8 to 27%, and more preferably 10 to 25%.

In general formula (II-1), $R^3$ represents an alkyl group having 1 to 8 carbon atoms, an alkenyl group having 2 to 8 carbon atoms, an alkoxy group having 1 to 8 carbon atoms, or an alkenyloxy group having 2 to 8 carbon atoms; preferably an alkyl group having 1 to 5 carbon atoms or an alkenyl group having 2 to 5 carbon atoms; more preferably an alkyl group having 2 to 5 carbon atoms or an alkenyl group having 2 to 4 carbon atoms; further preferably an alkyl group having 3 to 5 carbon atoms or an alkenyl group having 2 carbon atoms; and especially preferably an alkyl group having 3 carbon atoms.

$R^4$ represents an alkyl group having 1 to 8 carbon atoms, an alkenyl group having 4 to 8 carbon atoms, an alkoxy group having 1 to 8 carbon atoms, or an alkenyloxy group having 3 to 8 carbon atoms; preferably an alkyl group having 1 to 5 carbon atoms or an alkoxy group having 1 to 5 carbon atoms; more preferably an alkyl group having 1 to 3 carbon atoms or an alkoxy group having 1 to 3 carbon atoms; further preferably an alkyl group having 3 carbon atoms or an alkoxy group having 2 carbon atoms; and especially preferably an alkoxy group having 2 carbon atoms.

$Z^3$ represents a single bond, —CH═CH—, —C≡C—, —CH$_2$CH$_2$—, —(CH$_2$)$_4$—, —COO—, —OCO—, —OCH$_2$—, —CH$_2$O—, —OCF$_2$—, or —CF$_2$O—; preferably a single bond, —CH$_2$CH$_2$—, —COO—, —OCH$_2$—, —CH$_2$O—, —OCF$_2$—, or —CF$_2$O—; and more preferably a single bond or —CH$_2$O—.

The liquid crystal layer of the liquid crystal display device of the present invention can contain one or two or more compounds represented by general formula (II-1); it is preferred that one or two compounds be contained.

In particular, preferred examples of compounds represented by general formula (II-1) include the following compounds represented by general formulae (II-1a) to (II-1d):

[Chem. 8]

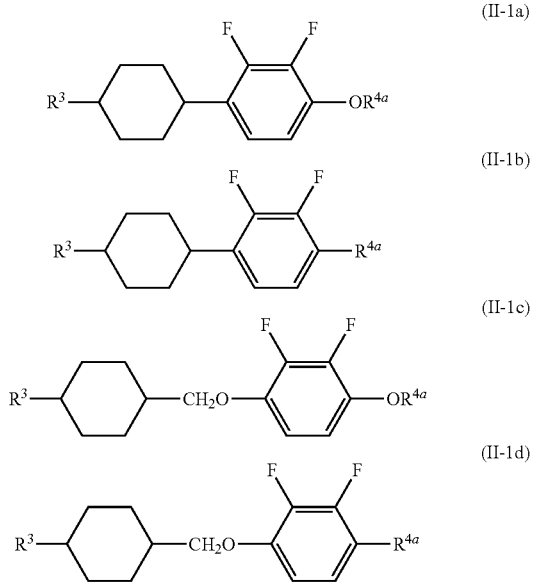

(where $R^3$ represents an alkyl group having 1 to 5 carbon atoms or an alkenyl group having 2 to 5 carbon atoms, and $R^{4a}$ represents an alkyl group having 1 to 5 carbon atoms).

In general formulae (II-1a) and (II-1c), $R^3$ preferably represents the same as specified in general formula (II-1). $R^{4a}$ preferably represents an alkyl group having 1 to 3 carbon atoms, more preferably an alkyl group having 1 or 2 carbon atoms, and especially preferably an alkyl group having 2 carbon atoms.

In general formulae (II-1b) and (II-1d), $R^3$ preferably represents the same as specified in general formula (II-1). $R^{4a}$ preferably represents an alkyl group having 1 to 3 carbon atoms, more preferably an alkyl group having 1 or 3 carbon atoms, and especially preferably an alkyl group having 3 carbon atoms.

Among general formulae (II-1a) to (II-1d), in order to increase the absolute value of dielectric anisotropy, general formulae (II-1a) and (II-1c) are preferred, and general formula (II-1a) is more preferred.

The liquid crystal layer of the liquid crystal display device of the present invention preferably contains one or two or more compounds represented by general formulae (II-1a) to (II-1d), and more preferably one or two compounds; in particular, one or two compounds represented by general formula (II-1a) are preferably contained.

The amount of the compound represented by general formula (II-2) in the liquid crystal layer of the liquid crystal display device of the present invention is from 25 to 45%, preferably 28 to 42%, and more preferably 30 to 40%.

In general formula (II-2), $R^5$ represents an alkyl group having 1 to 8 carbon atoms, an alkenyl group having 2 to 8 carbon atoms, an alkoxy group having 1 to 8 carbon atoms, or an alkenyloxy group having 2 to 8 carbon atoms; preferably an alkyl group having 1 to 5 carbon atoms or an alkenyl group having 2 to 5 carbon atoms; more preferably an alkyl group having 2 to 5 carbon atoms or an alkenyl group having 2 to 4 carbon atoms; further preferably an alkyl group having 3 to 5 carbon atoms or an alkenyl group having 2 carbon atoms; and especially preferably an alkyl group having 3 carbon atoms.

$R^6$ represents an alkyl group having 1 to 8 carbon atoms, an alkenyl group having 4 to 8 carbon atoms, an alkoxy group having 1 to 8 carbon atoms, or an alkenyloxy group having 3 to 8 carbon atoms; preferably an alkyl group having 1 to 5 carbon atoms or an alkoxy group having 1 to 5 carbon atoms; more preferably an alkyl group having 1 to 3 carbon atoms or an alkoxy group having 1 to 3 carbon atoms; further preferably an alkyl group having 3 carbon atoms or an alkoxy group having 2 carbon atoms; and especially preferably an alkoxy group having 2 carbon atoms.

B represents a 1,4-phenylene group or trans-1,4-cyclohexylene group which is optionally substituted with a fluorine atom, preferably an unsubstituted 1,4-phenylene group or trans-1,4-cyclohexylene group, and more preferably trans-1,4-cyclohexylene group.

$Z^4$ represents, a single bond, —CH═CH—, —C≡C—, —CH$_2$CH$_2$—, —(CH$_2$)$_4$—, —COO—, —OCO—, —OCH$_2$—, —CH$_2$O—, —OCF$_2$—, or —CF$_2$O—; preferably a single bond, —CH$_2$CH$_2$—, —COO—, —OCH$_2$—, —CH$_2$O—, —OCF$_2$—, or —CF$_2$O—; and more preferably a single bond or —CH$_2$O—.

In particular, preferred examples of compounds represented by general formula (II-2) include the following compounds represented by general formulae (II-2a) to (II-2f):

[Chem. 9]

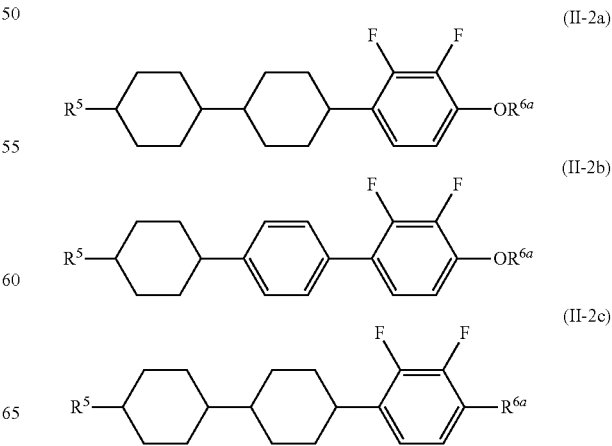

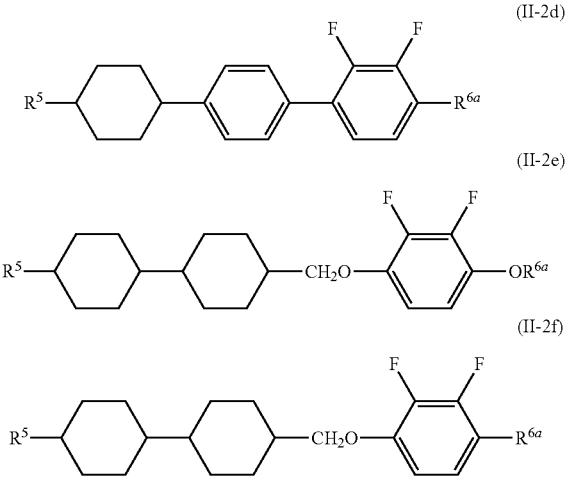

(where R⁵ represents an alkyl group having 1 to 5 carbon atoms or an alkenyl group having 2 to 5 carbon atoms, and R⁶ᵃ represents an alkyl group having 1 to 5 carbon atoms; preferred R⁵ and R⁶ᵃ are the same as preferred R⁵ and R⁶ specified in general formula (II-2), respectively).

In general formulae (II-2a), (II-2b), and (II-2e), R⁵ preferably represents the same as specified in general formula (II-2). R⁶ᵃ preferably represents an alkyl group having 1 to 3 carbon atoms, more preferably an alkyl group having 1 or 2 carbon atoms, and especially preferably an alkyl group having 2 carbon atoms.

In general formulae (II-2c), (II-2d), and (II-2f), R⁵ preferably represents the same as specified in general formula (II-2). R⁶ᵃ preferably represents an alkyl group having 1 to 3 carbon atoms, more preferably an alkyl group having 1 or 3 carbon atoms, and especially preferably an alkyl group having 3 carbon atoms.

Among general formulae (II-2a) to (II-2f), in order to increase the absolute value of dielectric anisotropy, general formulae (II-2a), (II-2b), and (II-2e) are preferred.

One or two or more compounds represented by general formula (II-2) can be used, and it is preferred at least one compound in which B represents a 1,4-phenylene group and at least one compound in which B represents a trans-1,4-cyclohexylene group be used.

The liquid crystal layer of the liquid crystal display device of the present invention preferably further contains a compound represented by general formula (III):

[Chem. 10]

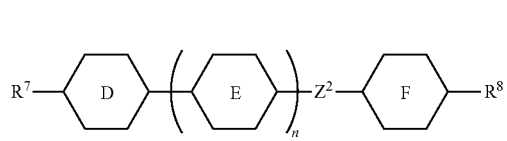

(III)

(where R⁷ and R⁸ each independently represent an alkyl group having 1 to 8 carbon atoms, alkenyl group having 2 to 8 carbon atoms, an alkoxy group having 1 to 8 carbon atoms, or an alkenyloxy group having 2 to 8 carbon atoms; D, E, and F each independently represent a 1,4-phenylene group or trans-1,4-cyclohexylene group which is optionally substituted with a fluorine atom; Z² represents a single bond, —OCH₂—, —OCO—, —CH₂O—, —COO—, or —OCO—; n represents 0, 1, or 2; and a compound represented by general formula (III) is different from compounds represented by general formulae (I), (II-1), and (II-2)).

The amount of the compound represented by general formula (III) is preferably in the range of 3 to 35%, more preferably 5 to 33%, and further preferably 7 to 30%.

In general formula (III), R⁷ represents an alkyl group having 1 to 8 carbon atoms, an alkenyl group having 2 to 8 carbon atoms, an alkoxy group having 1 to 8 carbon atoms, or an alkenyloxy group having 2 to 8 carbon atoms;
in the case where D represents trans-1,4-cyclohexylene, R⁷ preferably represents an alkyl group having 1 to 5 carbon atoms or an alkenyl group having 2 to 5 carbon atoms, more preferably an alkyl group having 2 to 5 carbon atoms or an alkenyl group having 2 to 4 carbon atoms, further preferably an alkyl group having 3 to 5 carbon atoms or an alkenyl group having 2 or 3 carbon atoms, and especially preferably an alkyl group having 3 carbon atoms; and
in the case where D represents a 1,4-phenylene group which is optionally substituted with a fluorine atom, R⁷ preferably represents an alkyl group having 1 to 5 carbon atoms or an alkenyl group having 4 or 5 carbon atoms, more preferably an alkyl group having 2 to 5 carbon atoms or an alkenyl group having 4 carbon atoms, and further preferably an alkyl group having 2 to 4 carbon atoms.

R⁸ represents an alkyl group having 1 to 8 carbon atoms, an alkenyl group having 2 to 8 carbon atoms, an alkoxy group having 1 to 8 carbon atoms, or an alkenyloxy group having 3 to 8 carbon atoms;
in the case where F represents trans-1,4-cyclohexylene, R⁸ preferably represents an alkyl group having 1 to 5 carbon atoms or an alkenyl group having 2 to 5 carbon atoms, more preferably an alkyl group having 2 to 5 carbon atoms or an alkenyl group having 2 to 4 carbon atoms, further preferably an alkyl group having 3 to 5 carbon atoms or an alkenyl group having 2 to 3 carbon atoms, and especially preferably an alkyl group having 3 carbon atoms; and
in the case where F represents a 1,4-phenylene group which is optionally substituted with a fluorine atom, R⁸ preferably represents an alkyl group having 1 to 5 carbon atoms or an alkenyl group having 4 or 5 carbon atoms, more preferably an alkyl group having 2 to 5 carbon atoms or an alkenyl group having 4 carbon atoms, and further preferably an alkyl group having 2 to 4 carbon atoms.

In the case where R⁷ and R⁸ each represent an alkenyl group and where D and F respectively connected thereto each represent a 1,4-phenylene group which is optionally substituted with a fluorine atom, the preferred structure of an alkenyl group having 4 or 5 carbon atoms is as follows:

[Chem. 11]

(where the right end of each structure is bonded to a ring structure).

Also in this case, an alkenyl group having 4 carbon atoms is preferred.

D, E, and F each independently represent a 1,4-phenylene group or trans-1,4-cyclohexylene which is optionally substituted with a fluorine atom; preferably a 2-fluoro-1,4-phenylene group, a 2,3-difluoro-1,4-phenylene group, a 1,4-phenylene group, or trans-1,4-cyclohexylene; more preferably a 2-fluoro-1,4-phenylene group, a 2,3-difluoro- 1,4-phenylene group, or a 1,4-phenylene group; and especially preferably a 2,3-difluoro-1,4-phenylene group or a 1,4-phenylene group.

$Z^2$ represents a single bond, —OCH$_2$—, —OCO—, —CH$_2$O—, or —COO—; preferably a single bond, —CH$_2$O—, or —COO—; and more preferably a single bond.

n represents 0, 1, or 2, and preferably 0 or 1. In the case where $Z^2$ does not represent a single bond but represents a substituent, n preferably represents 1.

In the case where n represents 1, preferred compounds represented by general formula (III) are compounds represented by general formulae (III-1a) to (III-1e) in order to enhance negative dielectric anisotropy and are compounds represented by general formulae (III-1f) to (III-1j) in order to enhance response speed:

[Chem. 12]

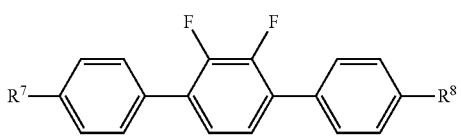
(III-1a)

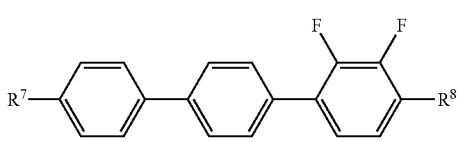
(III-1b)

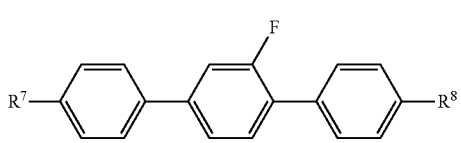
(III-1c)

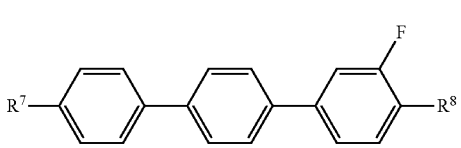
(III-1d)

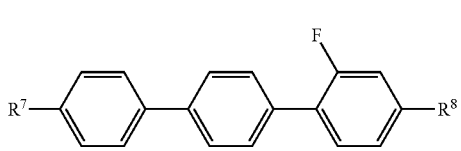
(III-1e)

[Chem. 13]

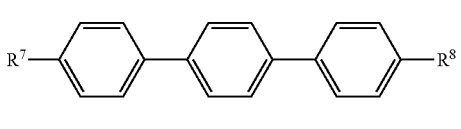
(III-1f)

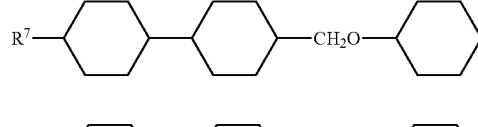
(III-1g)

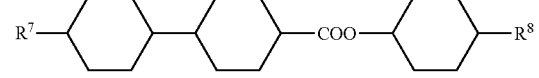
(III-1h)

(III-1i)

(III-1j)

(where $R^7$ and $R^8$ each independently represent an alkyl group having 1 to 5 carbon atoms, an alkenyl group having 2 to 5 carbon atoms, or an alkoxy group having 1 to 5 carbon atoms; and preferred $R^7$ and $R^8$ are the same as specified in general formula (III)).

In the case where n represents 2, preferred compounds represented by general formula (III) are compounds represented by general formulae (III-2a) to (III-2i) in order to enhance negative dielectric anisotropy and are compounds represented by general formulae (III-2j) to (III-2l) in order to enhance response speed:

[Chem. 14]

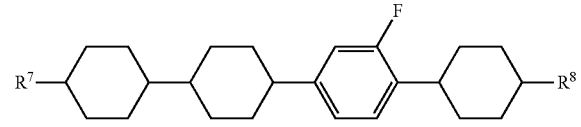
(III-2a)

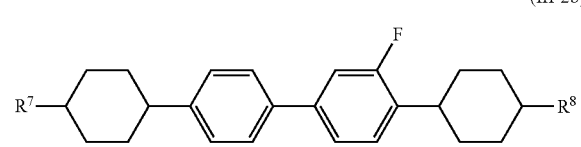
(III-2b)

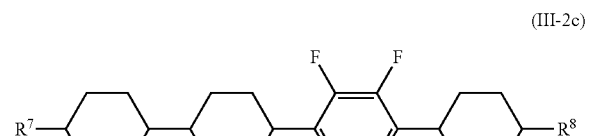
(III-2c)

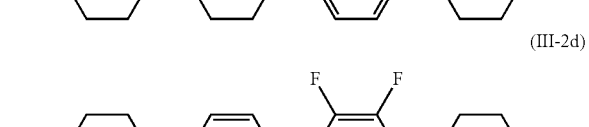
(III-2d)

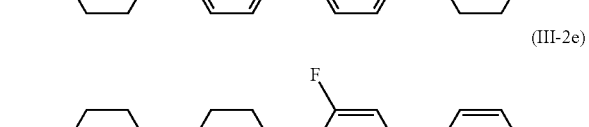
(III-2e)

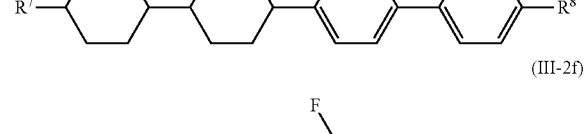
(III-2f)

(III-2g)
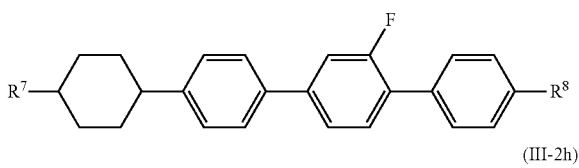

(III-2h)
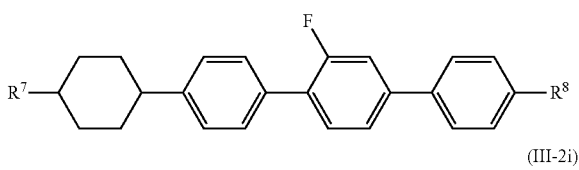

(III-2i)
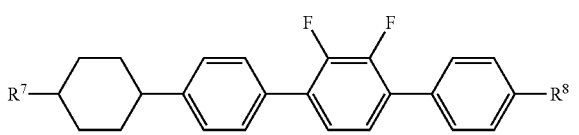

[Chem. 15]

(III-2j)

(III-2k)
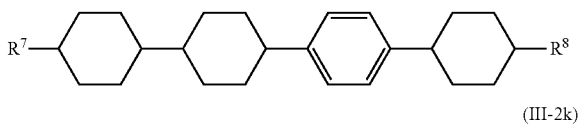

(III-2l)
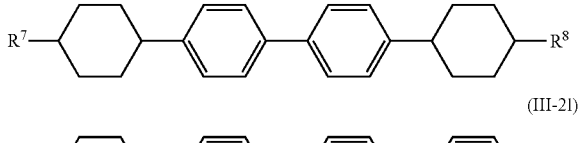

(where $R^7$ and $R^8$ each independently represent an alkyl group having 1 to 5 carbon atoms, an alkenyl group having 2 to 5 carbon atoms, or an alkoxy group having 1 to 5 carbon atoms; and preferred $R^7$ and $R^8$ are the same as specified in general formula (III)).

In the case where n represents 0, preferred compounds represented by general formula (III) are compounds represented by general formula (III-3a) in order to enhance negative dielectric anisotropy and are compounds represented by general formulae (III-3b) in order to enhance response speed:

[Chem. 16]

(III-3a)

[Chem. 17]

(III-3b)
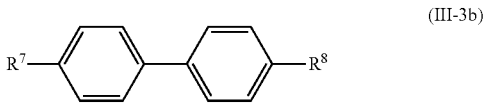

(where $R^7$ and $R^8$ each independently represent an alkyl group having 1 to 5 carbon atoms, an alkenyl group having 2 to 5 carbon atoms, or an alkoxy group having 1 to 5 carbon atoms; and preferred $R^7$ and $R^8$ are the same as specified in general formula (III)).

$R^7$ is preferably an alkyl group having 2 to 5 carbon atoms, and more preferably an alkyl group having 3 carbon atoms. $R^8$ is preferably an alkoxy group having 1 to 3 carbon atoms, and more preferably an alkoxy group having 2 carbon atoms.

Each of the compounds represented by general formulae (II-1) and (II-2) has a negative dielectric anisotropy of which the absolute value is relatively large. The total amount of such compounds is preferably in the range of 30 to 65%, more preferably 40 to 55%, and especially preferably 43 to 50%.

Compounds represented by general formula (III) include both a compound having a positive dielectric anisotropy and a compound having a negative dielectric anisotropy; in the case where a compound that is to be used has a negative dielectric anisotropy of which the absolute value is not less than 0.3, the total amount of compounds represented by general formulae (II-1), (II-2), and (III) is preferably in the range of 35 to 70%, more preferably 45 to 65%, and especially preferably 50 to 60%.

It is preferred that the amount of a compound represented by general formula (I) range from 30 to 50% and that the amount of compounds represented by general formulae (II-1), (II-2), and (III) range from 35 to 70%. It is more preferred that the amount of a compound represented by general formula (I) range from 35 to 45% and that the amount of compounds represented by general formulae (II-1), (II-2), and (III) range from 45 to 65%. It is especially preferred that the amount of a compound represented by general formula (I) range from 38 to 42% and the amount of compounds represented by general formulae (II-1), (II-2), and (III) range from 50 to 60%.

The total amount of compounds represented by general formulae (I), (II-1), (II-2), and (III) is preferably in the range of 80 to 100%, more preferably 90 to 100%, and especially preferably 95 to 100% relative to the whole of the composition.

The liquid crystal layer of the liquid crystal display device of the present invention can be used in a broad range of nematic phase-isotropic liquid phase transition temperature ($T_{ni}$), and the temperature is preferably in the range of 60 to 120° C., more preferably 70 to 100° C., and especially preferably 70 to 85° C.

Dielectric anisotropy at 25° C. is preferably in the range of −2.0 to −6.0, more preferably −2.5 to −5.0, and especially preferably −2.5 to −4.0.

Refractive index anisotropy at 25° C. is preferably in the range of 0.08 to 0.13, and more preferably 0.09 to 0.12. In particular, in the case where a cell gap is small, the refractive index anisotropy preferably ranges from 0.10 to 0.12; and in the case where a cell gap is large, the refractive index anisotropy preferably ranges 0.08 to 0.10.

Rotational viscosity (γ1) is preferably not more than 150, more preferably not more than 130, and especially preferably not more than 120.

In the liquid layer of the liquid crystal display device of the present invention, the function Z of rotational viscosity to refractive index anisotropy preferably has a specific value:

$$Z = \frac{\gamma 1}{\Delta n^2} \quad [\text{Math. 1}]$$

(where γ1 represents rotational viscosity, and Δn represents refractive index anisotropy).

Z is preferably not more than 13000, more preferably not more than 12000, and especially preferably not more than 11000.

In the case where the liquid crystal display device of the present invention is an active-matrix display device, the liquid crystal layer used therein needs to have a specific resistance of not less than $10^{12}$ (Ω·m), preferably $10^{13}$ (Ω·m), and more preferably not less than $10^{14}$ (Ω·m).

The liquid crystal layer of the liquid crystal display device of the present invention may contain, in addition to the above-mentioned compounds, typical nematic liquid crystal, smectic liquid crystal, cholesteric liquid crystal, an antioxidant, an ultraviolet absorber, and a polymerizable monomer depending on applications thereof.

The polymerizable monomer is preferably a difunctional monomer represented by general formula (V):

[Chem. 18]

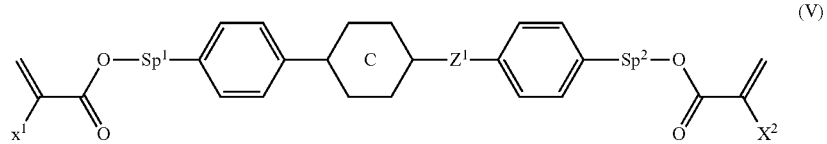

(V)

(where $X^1$ and $X^2$ each independently represent a hydrogen atom or a methyl group;
$Sp^1$ and $Sp^2$ each independently represent a single bond, an alkylene group having 1 to 8 carbon atoms, or —O—$(CH_2)_s$— (where s represents an integer from 2 to 7, and an oxygen atom is connected to an aromatic ring);
$Z^1$ represents —OCH$_2$—, —CH$_2$O—, —COO—, —OCO—, —CF$_2$O—, —OCF$_2$—, —CH$_2$CH$_2$—, —CF$_2$CF$_2$—, —CH=CH—COO—, —CH=CH—OCO—, —COO—CH=CH—, —OCO—CH=CH—, —COO—CH$_2$CH$_2$—, —OCO—CH$_2$CH$_2$—, —CH$_2$CH$_2$—COO—, —CH$_2$CH$_2$—OCO—, —COO—CH$_2$—, —OCO—CH$_2$—, —CH$_2$—COO—, —CH$_2$—OCO—, —CY$^1$=CY$^2$— (where $Y^1$ and $Y^2$ each independently represent a fluorine atom or a hydrogen atom), —C≡C—, or a single bond; and C represents a 1,4-phenylene group, a trans-1,4-cyclohexylene group, or a single bond, and in each 1,4-phenylene group in the formula, any hydrogen atom may be substituted with a fluorine atom).

Both a diacrylate derivative in which $X^1$ and $X^2$ each represent a hydrogen atom and a dimethacrylate derivative in which $X^1$ and $X^2$ each represent a methyl group are preferred, and a compound in which one of $X^1$ and $X^2$ represents a hydrogen atom and in which the other one represents a methyl group is also preferred. Among such compounds, the diacrylate derivative has the highest polymerization rate, the dimethacrylate derivative has a low polymerization rate, and the asymmetric compound has an intermediate polymerization rate; hence, suitable compound can be employed depending on applications. In PSA display devices, a dimethacrylate derivative is especially preferred.

$Sp^1$ and $Sp^2$ each independently represent a single bond, an alkylene group having 1 to 8 carbon atoms, or —O—$(CH_2)_s$—; in PSA display devices, at least any one of $Sp^1$ and $Sp^2$ is preferably a single bond, and a compound in which each of them represents a single bond and a compound in which one of them represents a single bond and in which the other one represents an alkylene group having 1 to 8 carbon atoms or —O—$(CH_2)_s$— are preferred. In this case, an alkyl group having 1 to 4 carbon atoms is preferred, or s is preferably from 1 to 4.

$Z^1$ preferably represents —OCH$_2$—, —CH$_2$O—, —COO—, —OCO—, —CF$_2$O—, —OCF$_2$—, —CH$_2$CH$_2$—, —CF$_2$CF$_2$—, or a single bond; more preferably —COO—, —OCO—, or a single bond; and especially preferably a single bond.

C represents a single bond or a 1,4-phenylene group or trans-1,4-cyclohexylene group in which any hydrogen atom is optionally substituted with a fluorine atom, and preferably a 1,4-phenylene group or a single bond. In the case where C does not represent a single bond but represents a ring structure, $Z^1$ is also preferably a linking group as well as a single bond; in the case where C represents a single bond, $Z^1$ is preferably a single bond.

From these viewpoints, a preferred ring structure between $Sp^1$ and $Sp^2$ in general formula (V) is particularly as follows.

In the case where C in general formula (V) represents a single bond and where the ring structure consists of two rings, the ring structure is preferably represented by any of general formulae (Va-1) to (Va-5), more preferably general formulae (Va-1) to (Va-3), and especially preferably general formula (Va-1):

[Chem. 19]

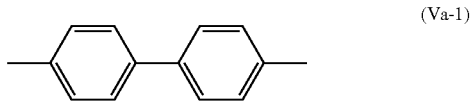

(Va-1)

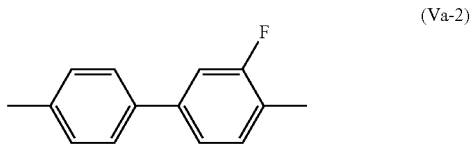

(Va-2)

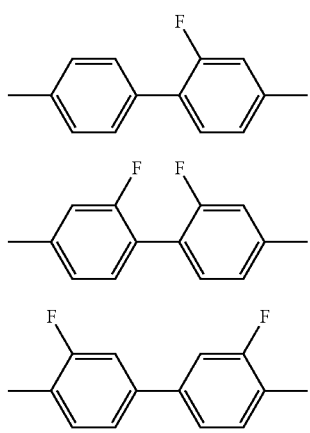

(where the two ends of each structure are connected to Sp$^1$ and Sp$^2$, respectively).

Polymerizable compounds having such skeletons enable alignment regulation optimum for PSA liquid crystal display devices after polymerization thereof, which enables a good alignment state; hence, uneven display is reduced or eliminated.

Accordingly, the polymerizable monomer is especially preferably represented by any of general formulae (V-1) to (V-4), and most preferably general formula (V-2):

[Chem. 20]

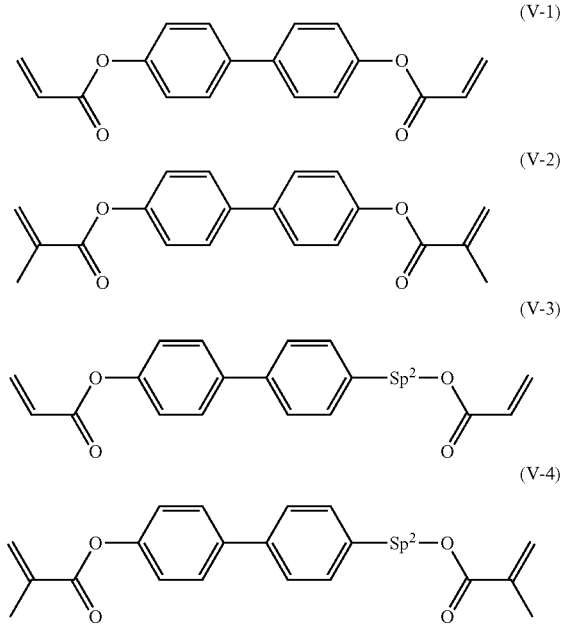

(where Sp$^2$ represents an alkylene group having 2 to 5 carbon atoms).

In the case where the polymerizable monomer is added, polymerization is carried out even without a polymerization initiator; however, a polymerization initiator may be used to promote the polymerization. Examples of the polymerization initiator include benzoin ethers, benzophenones, acetophenones, benzyl ketals, and acyl phosphine oxides. In order to enhance storage stability, a stabilizer may be added.

Examples of usable stabilizers include hydroquinones, hydroquinone monoalkylethers, tertiary butylcatechol, pyrogallols, thiophenols, nitro compounds, β-naphthylamines, β-naphthols, and nitroso compounds.

The liquid crystal layer containing the polymerizable monomer is useful in liquid crystal display devices, and especially useful in liquid crystal display devices driven by an active matrix; hence, such a liquid crystal layer can be used in liquid crystal display devices of a PSA mode, PSVA mode, VA mode, IPS mode, and ECB mode.

The polymerizable monomer contained in the liquid crystal layer is polymerized by being irradiated with ultraviolet with the result that liquid crystal molecules can be aligned, and such a liquid crystal layer is used in liquid crystal display devices in which the birefringence of a liquid crystal composition is utilized to control the amount of transmitted light. Such a liquid crystal layer is useful in liquid crystal display devices, such as an AM-LCD (active matrix liquid crystal display device), a TN (twisted nematic liquid crystal display device), an STN-LCD (super twisted nematic liquid crystal display device), an OCB-LCD, and an IPS-LCD (in-plane switching liquid crystal display device), particularly useful in an AM-LCD, and can be used in transmissive or reflective liquid crystal display devices.

(Color Filter)

The color filter according to the present invention includes a black matrix and at least RGB three-color pixel portions.

The black matrix contains a colorant which is at least one pigment selected from carbon blacks, titanium blacks, and organic pigments.

Examples of the carbon blacks include C. I. Pigment Black 6, 7, 8, and 10; and C. I. Pigment Black 7 is preferred. Furthermore, a resin-coated carbon black disclosed in Japanese Unexamined Patent Application Publication No. 2002-249678 can be also used.

An example of the titanium blacks is C. I. Pigment Black 35, and a water-repellent titanium black treated with a water-repellent material, such as a fluororesin or a silicone resin, as disclosed in Japanese Unexamined Patent Application Publication No. 2007-302836 can be also used.

Among the organic pigments, examples of yellow organic pigments include C. I. Pigment Yellow 1, 1:1, 2, 3, 4, 5, 6, 9, 10, 12, 13, 14, 16, 17, 24, 31, 32, 34, 35, 35:1, 36, 36:1, 37, 37:1, 40, 41, 42, 43, 48, 53, 55, 61, 62, 62:1, 63, 65, 73, 74, 75, 81, 83, 87, 93, 94, 95, 97, 100, 101, 104, 105, 108, 109, 110, 111, 116, 117, 119, 120, 126, 127, 127:1, 128, 129, 133, 134, 136, 138, 139, 142, 147, 148, 150, 151, 153, 154, 155, 157, 158, 159, 160, 161, 162, 163, 164, 165, 166, 167, 168, 169, 170, 172, 173, 174, 175, 176, 180, 181, 182, 183, 184, 185, 188, 189, 190, 191, 191:1, 192, 193, 194, 195, 196, 197, 198, 199, 200, 202, 203, 204, 205, 206, 207, and 208.

Examples of orange organic pigments include C. I. Pigment Orange 1, 2, 3, 4, 5, 13, 15, 16, 17, 19, 20, 21, 24, 31, 34, 36, 38, 40, 43, 46, 48, 49, 51, 60, 61, 64, 65, 66, 67, 68, 69, 271, 72, 73, and 81.

Examples of red organic pigments include C. I. Pigment Red 1, 2, 3, 4, 5, 6, 7, 8, 9, 12, 14, 15, 16, 17, 21, 22, 23, 31, 32, 37, 38, 41, 47, 48, 48:1, 48:2, 48:3, 48:4, 49, 49:1, 49:2, 50:1, 52:1, 52:2, 53, 53:1, 53:2, 53:3, 57, 57:1, 57:2, 58:4, 60, 63, 63:1, 63:2, 64, 64:1, 68, 69, 81, 81:1, 81:2, 81:3, 81:4, 83, 88, 90:1, 101, 101:1, 104, 108, 108:1, 109, 112, 113, 114, 122, 123, 144, 146, 147, 149, 151, 166, 168, 169, 170, 172, 173, 174, 175, 176, 177, 178, 179, 181, 184, 185, 187, 188, 190, 193, 194, 200, 202, 206, 207, 208, 209, 210, 214, 216, 220, 221, 224, 230, 231, 232, 233, 235, 236, 237, 238, 239, 242, 243, 245, 247, 249, 250, 251, 253, 254, 255, 256, 257, 258, 259, 260, 262, 263, 264, 265, 266, 267, 268, 269, 270, 271, 272, 273, 274, 275, and 276.

Examples of purple organic pigments include C. I. Pigment Violet 1, 2, 3, 5:1, 13, 15, 16, 17, 19, 23, 25, 29, 31, 32, 34, 35, 36, 37, 38, 41, 44, and 50.

Examples of blue organic pigments include C. I. Pigment Blue 1, 1:2, 9, 14, 15, 15:1, 15:2, 15:3, 15:4, 15:6, 16, 17, 19, 25, 27, 28, 29, 33, 35, 36, 56, 56:1, 60, 61, 61:1, 62, 63, 66, 67, 68, 71, 72, 73, 74, 75, 76, 78, and 79.

Examples of green organic pigments include C. I. Pigment Green 1, 4, 7, 8, 10, 15, 17, 26, 36, 48, 50, and 58.

Examples of brown organic pigments include C. I. Pigment Brown 5, 6, 23, 24, 25, 32, 38, 41, and 42.

Examples of black organic pigments include C. I. Pigment Black 1, 9, 11, 20, 31, 32, and 34.

The above-mentioned organic pigments can be used alone or in combination; one to six of these pigments are preferably used, and one to four of these pigments are more preferably used. In the case of using one pigment, a black organic pigment can be used; for example, C. I. Pigment Black 31, 32, or 34 is preferably used. In the case of using two or more pigments, a mixture of a blue organic pigment, a purple organic pigment, a green organic pigment, and a red organic pigment and a mixture of a blue organic pigment, a red organic pigment, and a yellow organic pigment are preferred; for instance, a mixture of C. I. Pigment Blue 60, C. I. Pigment Violet 23, C. I. Pigment Green 7, and C. I. Pigment Red 179; a mixture of C. I. Pigment Blue 60, C. I. Pigment Violet 19, and C. I. Pigment Green 7; a mixture of C. I. Pigment Blue 15:6, C. I. Pigment Red 254, and C. I. Pigment Yellow 150; a mixture of C. I. Pigment Blue 15:6, C. I. Pigment Red 177, and C. I. Pigment Yellow 150; a mixture of C. I. Pigment Blue 15:6, C. I. Pigment Red 254, and C. I. Pigment Yellow 138; and a mixture of C. I. Pigment Blue 15:6, C. I. Pigment Red 177, and C. I. Pigment Yellow 138 are preferably used.

The black matrix according to the present invention contains a colorant which is at least one pigment selected from carbon blacks, titanium blacks, and organic pigments; one to six pigments are preferably used, one to five pigments are more preferably used, and one to four pigments are further preferably used. These pigments may be selected only from carbon blacks, only from titanium blacks, or only from organic pigments. Alternatively, the pigment may be a combination of a carbon black and a titanium black, a combination of a carbon black and an organic pigment, a combination of a titanium black and an organic pigment, or a combination of a carbon black, a titanium black, and an organic pigment. In particular, the pigment is preferably selected only from carbon blacks, only from titanium blacks, only from organic pigments, and combinations of carbon blacks and organic pigments. In the case where the pigment is selected from carbon blacks and organic pigments, C. I. Pigment Black 7 and C. I. Pigment Blue 15:3, 15:4, and 15:6 are preferably used.

The above-mentioned carbon blacks, titanium blacks, and organic pigments each preferably have a volume resistivity of not less than $10^5$ Ω·cm, and more preferably not less than $10^6$·cm.

The RGB three-color pixel portions contain colorants; in particular, the R pixel portion contains a diketopyrrolopyrrole pigment and/or an red anionic organic dye; the G pixel portion contains at least one selected from the group consisting of a halogenated metallophthalocyanine pigment, a green phthalocyanine dye, and a mixture of a blue phthalocyanine dye and an yellow azo organic dye; and the B pixel portion contains a ∈-copper phthalocyanine pigment, a triarylmethane pigment, and/or a blue cationic organic dye.

In the RGB three-color pixel portions, the colorant contained in the R pixel portion is preferably C. I. Solvent Red 124, the colorant contained in the G pixel portion is preferably a mixture of C. I. Solvent Blue 67 and C. I. Solvent Yellow 162, and the colorant contained in the B pixel portion is preferably C. I. Solvent Blue 7.

In the RGB three-color pixel portions, the colorant contained in the R pixel portion is also preferably C. I. Pigment Red 254, the colorant contained in the G pixel portion is also preferably C. I. Pigment Green 7, 36, and/or 58, and the colorant contained in the B pixel portion is also preferably C. I. Pigment Blue 15:6 and/or a triarylmethane pigment.

The R pixel portion of the RGB three-color pixel portions preferably further contains a colorant that is at least one organic dye or pigment selected from the group consisting of C. I. Pigment Red 177, 242, 166, 167, and 179; C. I. Pigment Orange 38 and 71; C. I. Pigment Yellow 150, 215, 185, 138, and 139; C. I. Solvent Red 89; C. I. Solvent Orange 56; and C. I. Solvent Yellow 21, 82, 83:1, 33, and 162.

The G pixel portion of the RGB three-color pixel portions preferably further contains a colorant that is at least one organic dye or pigment selected from the group consisting of C. I. Pigment Yellow 150, 215, 185, and 138 and C. I. Solvent Yellow 21, 82, 83:1, and 33.

The B pixel portion of the RGB three-color pixel portions preferably further contains a colorant that is at least one organic dye or pigment selected from the group consisting of C. I. Pigment Blue 1; C. I. Pigment Violet 23; C. I. Basic Blue 7; C. I. Basic Violet 10; C. I. Acid Blue 1, 90, and 83; and C. I. Direct Blue 86.

It is also preferred that the color filter include the black matrix, the RGB three-color pixel portions, and a Y pixel portion and that the Y pixel portion contain a colorant that is at least one yellow organic dye or pigment selected from the group consisting of C. I. Pigment Yellow 150, 215, 185, 138, and 139 and C. I. Solvent Yellow 21, 82, 83:1, 33, and 162.

The red diketopyrrolopyrrole pigment contained in the R pixel portion is preferably at least one selected from C. I. Pigment Red 254, 255, 264, and 272 and Orange 71 and 73; more preferably at least one selected from Red 254, 255, 264, and 272; and especially preferably C. I. Pigment Red 254.

The halogenated metallophthalocyanine pigment contained in the G pixel portion is a halogenated metallophthalocyanine pigment having a metal center that is a metal selected from the group consisting of Al, Si, Sc, Ti, V, Mg, Fe, Co, Ni, Zn, Cu, Ga, Ge, Y, Zr, Nb, In, Sn, and Pb. In a preferred halogenated metallophthalocyanine pigment, in the case where the metal center is trivalent, it is preferred that the metal center be bonded to any of a halogen atom, a hydroxyl group, and a sulfonate group or oxo- or thio-bridged; and in the case where the metal center is tetravalent, it is preferred that the metal center be bonded to any of an oxygen atom, the same or different two halogen atoms, a hydroxyl group, and a sulfonate group. Preferred examples of the halogenated metallophthalocyanine pigment include halogenated metallophthalocyanine pigments belonging to the following two groups.

(First Group)

A halogenated metallophthalocyanine pigment which has the metal center that is a metal selected from the group consisting of Al, Si, Sc, Ti, V, Mg, Fe, Co, Ni, Zn, Cu, Ga, Ge, Y, Zr, Nb, In, Sn, and Pb and in which 8 to 16 halogen atoms per one phthalocyanine molecule are connected to benzene rings of the phthalocyanine molecule. In the case where the metal center is trivalent, the metal center is bonded to any of a halogen atom, a hydroxyl group, and a sulfonate group ($-SO_3H$); and in the case where the metal center is tetravalent, the metal center is bonded to any of an oxygen atom, the same or different two halogen atoms, a hydroxyl group, and a sulfonate group.

(Second Group)

A pigment composed of a halogenated metallophthalocyanine dimer containing two halogenated metallophthalocyanine molecules which have the metal centers that are trivalent metals selected from the group consisting of Al, Sc, Ga, Y, and In and in which 8 to 16 halogen atoms per one phthalocyanine molecule are connected to benzene rings of the phthalocyanine molecule. The metal centers of such halogenated metallophthalocyanine molecules are connected to each other via a divalent atomic group selected from the group consisting of an oxygen atom, a sulfur atom, sulfinyl ($-SO-$), and sulfonyl ($-SO_2-$).

In such halogenated metallophthalocyanine pigments, halogen atoms bonded to benzene rings may be the same as or different from each other. In addition, different halogen atoms may be bonded to one benzene ring.

A halogenated metallophthalocyanine pigment in which 9 to 15 bromine atoms among 8 to 16 halogen atoms per one phthalocyanine molecule are connected to benzene rings of the phthalocyanine molecule has a color of yellow-tinged bright green and is therefore well suitably used for a green pixel portion of the color filter. Such a halogenated metallophthalocyanine pigment is insoluble or less soluble in water or an organic solvent. The above-mentioned halogenated metallophthalocyanine pigment comprehends both a pigment which have not been subjected to a treatment (hereinafter also referred to crude pigment) and a treated pigment.

The halogenated metallophthalocyanine pigments belonging to the first and second groups can be represented by general formula (PIG-1).

[Chem. 21]

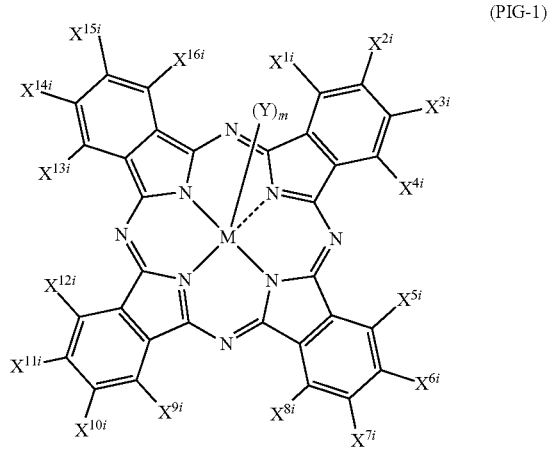

(PIG-1)

With reference to general formula (PIG-1), the detail of the halogenated metallophthalocyanine pigment belonging to the first group is as follows.

In general formula (PIG-1), $X^{1i}$ to $X^{16i}$ each represent a hydrogen atom, a chlorine atom, a bromine atom, or an iodine atom. Four atoms X bonded to one benzene ring may be the same as or different from each other. Among $X^{1i}$ to $X^{16i}$ connected to 4 benzene rings, 8 to 16 of them are chlorine atoms, bromine atoms, or iodine atoms. M represents the metal center. In halogenated metallophthalocyanine pigments having the same type of Y which will be described later and the same value of m which is the number of Y, if a halogenated metallophthalocyanine pigment has less than 8 chlorine atoms, bromine atoms, and iodine atoms in total among 16 $X^{1i}$ to $X^{16i}$, such a pigment is a blue pigment; and if a halogenated metallophthalocyanine pigment has 8 or more chlorine atoms, bromine atoms, and iodine atoms in total among 16 $X^{1i}$ to $X^{16i}$, an increase in the total number of these atoms makes the pigment more yellow. Y bonded to the metal center M is the group of monovalent atoms selected from the group consisting of any of halogen atoms of a fluorine atom, a chlorine atom, a bromine atom, and an iodine atom; a hydroxyl group; and a sulfonate group, and a divalent oxygen atom, m represents the number of Y bonded to the metal center M and is an integer from 0 to 2.

m is determined depending on the valence of the metal center M. In the case where the metal center M is trivalent, such as Al, Sc, Ga, Y, or In, m is 1, and any one selected from the group consisting of a fluorine atom, a chlorine atom, a bromine atom, an iodine atom, a hydroxyl group, and a sulfonate group is bonded to the metal center. In the case where the metal center M is tetravalent, such as Si, Ti, V, Ge, Zr, or Sn, m is 2, and an oxygen atom or any two selected from the group consisting of a fluorine atom, a chlorine atom, a bromine atom, an iodine atom, a hydroxyl group, and a sulfonate group are bonded to the metal center. In the case where the metal center M is divalent, such as Mg, Fe, Co, Ni, Zn, Cu, Zr, Sn, or Pb, Y is absent.

With reference to general formula (PIG-1), the detail of the halogenated metallophthalocyanine pigment belonging to the second group is as follows.

In general formula (PIG-1), $X^{1i}$ to $X^{16i}$ each represent the same as defined above; the metal center M represents a trivalent metal selected from the group consisting of Al, Sc, Ga, Y, and In; and m represents 1. Y represents the following atomic group.

[Chem. 22]

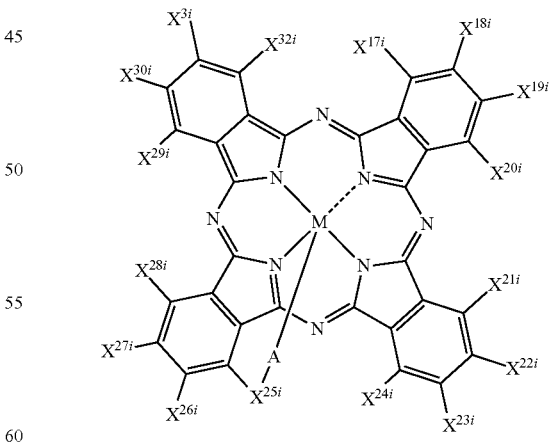

In the structure of the atomic group Y, the metal center M represents the same as defined above, $X^{17i}$ to $X^{32i}$ each represent the same as $X^{1i}$ to $X^{16i}$ defined in general formula (PIG-1). A represents a divalent atomic group selected from the group consisting of an oxygen atom, a sulfur atom, sulfinyl ($-SO-$), and sulfonyl ($-SO_2-$). M in general formula (PIG-1) and M in the atomic group Y are connected to each other via the divalent atomic group A.

In other words, the halogenated metallophthalocyanine pigment belonging to the second group is a halogenated metallophthalocyanine dimer which includes two halogenated metallophthalocyanine molecules and in which such molecules are connected to each other via the divalent atomic group.

Specific examples of the halogenated metallophthalocyanine pigment represented by general formula (PIG-1) include the following (1) to (4).

(1) halogenated metallophthalocyanine pigments which each have the metal center that is a divalent metal selected from the group consisting of Mg, Fe, Co, Ni, Zn, Cu, Zr, Sn, and Pb and in which 8 to 16 halogen atoms are bonded to 4 benzene rings per one phthalocyanine molecule, such as a halogenated copper phthalocyanine pigment, a halogenated tin phthalocyanine pigment, a halogenated nickel phthalocyanine pigment, and a halogenated zinc phthalocyanine pigment. Among such halogenated metallophthalocyanine pigments, a chlorinated brominated zinc phthalocyanine pigment is C. I. Pigment Green 58, which is especially preferred.

(2) halogenated metallophthalocyanine pigments which each have the metal center that is a trivalent metal selected from the group consisting of Al, Sc, Ga, Y, and In, in which the metal center is bonded to a halogen atom, a hydroxyl group, or a sulfonate group, and in which 8 to 16 halogen atoms per one phthalocyanine molecule are bonded to 4 benzene rings, such as halogenated chloroaluminum phthalocyanine.

(3) halogenated metallophthalocyanine pigments which each have the metal center that is a tetravalent metal selected from the group consisting of Si, Ti, V, Ge, Zr, and Sn, in which the metal center is bonded to an oxygen atom or two halogen atoms which may be the same as or different from each other, hydroxyl groups, or sulfonate groups, and in which 8 to 16 halogen atoms per one phthalocyanine molecule are bonded to 4 benzene rings, such as halogenated oxytitanium phthalocyanine and halogenated oxyvanadium phthalocyanine.

(4) pigments each consisting of a halogenated metallophthalocyanine dimer including two halogenated metallophthalocyanine molecules which have the metal centers that are trivalent metals selected from the group consisting of Al, Sc, Ga, Y, and In, in which 8 to 16 halogen atoms per one phthalocyanine molecule are bonded to 4 benzene rings, and in which the metal centers of these molecules are bonded to each other via a divalent atomic group selected from the group consisting of an oxygen atom, a sulfur atom, sulfinyl, and sulfonyl, such as a halogenated μ-oxo-aluminum phthalocyanine dimer and a halogenated μ-thio-aluminum phthalocyanine dimer.

In particular, the halogenated metallophthalocyanine pigment contained in the G pixel portion is preferably at least one selected from C. I. Pigment Green 7, 36, and 58; and more preferably at least one selected from Green 36 and 58.

The ∈-phthalocyanine pigment contained in the B pixel portion is preferably C. I. Pigment Blue 15:6, and the triarylmethane pigment contained therein is preferably C. I. Pigment Blue 1 and/or a triarylmethane pigment represented by general formula (1):

[Chem. 23]

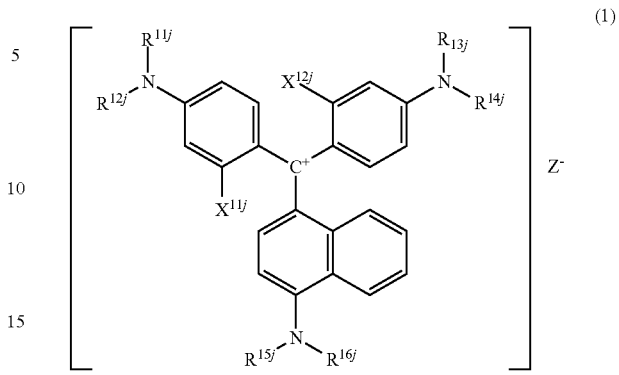

(where $R^{11j}$ to $R^{16j}$ each independently represent a hydrogen atom, an optionally substituted alkyl group having 1 to 8 carbon atoms, or an optionally substituted aryl group. In the case where $R^{11j}$ to $R^{16j}$ each represent an optionally substituted alkyl group, $R^{11j}$, $R^{13j}$, and $R^{15j}$ may be connected to adjoining $R^{12j}$, $R^{14j}$, and $R^{16j}$ to form ring structures, respectively. $X^{11j}$ and $X^{12j}$ each independently represent a hydrogen atom, a halogen atom, or an optionally substituted alkyl group having 1 to 8 carbon atoms. $Z^-$ is at least one anion selected from heteropolyoxometalate anion represented by $(P_2Mo_yW_{18-y}O_{62})^{6-}/6$ in which y is an integer of 0, 1, 2, or 3, heteropolyoxometalate anion represented by $(SiMoW_{11}O_{40})^{4-}/4$, and lacunary Dawson-structure phosphotungstic acid heteropolyoxometalate anion. In the case where one molecule has multiple structures represented by general formula (1), these structures may be the same as or different from each other).

In general formula (1), $R^{11j}$ to $R^{16j}$ may be the same as or different from each other. Hence, a —NRR moiety (RR represents any of combinations of $R^{11j}$ and $R^{12j}$, $R^{13j}$ and $R^{14j}$, and $R^{15j}$ and $R^{16j}$) may be symmetric or asymmetric.

In the case where R (R represents any of $R^{11j}$ to $R^{16j}$) is bonded to the adjoining R to form a ring, a cross-linked structure may be formed in such a ring by a hetero atom. Specific examples of such a ring include the following rings. These rings are optionally substituted.

[Chem. 24]

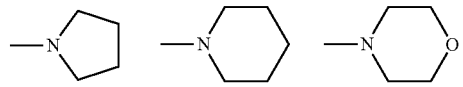

In terms of chemical stability, $R^{11j}$ to $R^{16j}$ are preferably each independently a hydrogen atom, an optionally substituted alkyl group, or an optionally substituted aryl group.

In particular, $R^{11j}$ to $R^{16j}$ are preferably each independently any one of the followings: a hydrogen atom; alkyl groups such as a methyl group, an ethyl group, a propyl group, an isopropyl group, a cyclopropyl group, a butyl group, an isobutyl group, a sec-butyl group, a tert-butyl group, a pentyl group, a cyclopentyl group, a hexyl group, a cyclohexyl group, a heptyl group, an octyl group, and a 2-ethylhexyl group; and aryl groups such as a phenyl group and a naphthyl group.

In the case where $R^{11j}$ to $R^{16j}$ each represent an alkyl group or an aryl group, such an alkyl group or an aryl group is further optionally substituted with any substituent.

Examples of such a substituent with which an alkyl group or an aryl group is further optionally substituted include substituents of [Substituent Group Y].

[Substituent Group Y]

Alkyl groups such as a methyl group, an ethyl group, a propyl group, an isopropyl group, a cyclopropyl group, a butyl group, an isobutyl group, a sec-butyl group, a tert-butyl group, a pentyl group, a cyclopentyl group, a hexyl group, a cyclohexyl group, a heptyl group, an octyl group, and a 2-ethylhexyl group; aryl groups such as a phenyl group and a naphthyl group; halogen atoms such as a fluorine atom and a chlorine atom; a cyano group; a hydroxyl group; alkoxy groups having 1 to 8 carbon atoms such as a methoxy group, an ethoxy group, a propoxy group, and a butoxy group; optionally substituted amino groups such as an amino group, a diethylamino group, a dibutylamino group, and an acetylamino group; acyl groups such as an acetyl group and a benzoyl group; and acyloxy groups such as an acetyloxy group and a benzoyloxy group $R^{11j}$ to $R^{16j}$ are more preferably each an optionally substituted alkyl group having 1 to 8 carbon atoms: in particular, an unsubstituted alkyl group such as a methyl group, an ethyl group, a propyl group, an isopropyl group, a butyl group, an isobutyl group, a sec-butyl group, a pentyl group, a hexyl group, or a 2-ethylhexyl group; an alkoxyalkyl group such as a 2-methoxyethyl group or a 2-ethoxyethyl group; an acyloxy group such as a 2-acetyloxyethyl group; a cyanoalkyl group such as a 2-cyanoethyl group; and a fluoroalkyl group such as a 2,2,2-trifluoroethyl group or a 4,4,4-trifluorobutyl group.

In the case where $X^{11j}$ and $X^{12j}$ are each the above-mentioned alkyl group, $X^{11j}$ and $X^{12j}$ may be further substituted with any substituent. Examples of such a substituent include halogen atoms, such as a fluorine atom, a chlorine atom, a bromine atom, and an iodine atom, and alkoxy groups, such as a methoxy group, an ethoxy group, and a propoxy group. Specific examples of $X^{11j}$ and $X^{12j}$ include haloalkyl groups, such as a fluoromethyl group, a trifluoromethyl group, a trichloromethyl group, and a 2,2,2-trifluoroethyl group, and an alkoxyalkyl group, such as a methoxymethyl group.

$X^{11j}$ and $X^{12j}$ are preferably each a substituent having a proper steric hindrance that does not affect a twist structure, such as a hydrogen atom, a methyl group, a chlorine atom, or a trifluoromethyl group. In terms of color tone and thermal resistance, $X^{11j}$ and $X^{12j}$ are most preferably each a hydrogen atom, a methyl group, or a chlorine atom.

$Z^-$ represents an anion selected from a heteropolyoxometalate anion represented by $(P_2Mo_yW_{18-y}O_{62})^{6-}/6$ in which y is an integer of 0, 1, 2, or 3, a heteropolyoxometalate anion represented by $(SiMoW_{11}O_{40})^{4-}/4$, and a lacunary Dawson-structure phosphotungstic acid heteropolyoxometalate anion. In particular, a preferred lacunary Dawson-structure phosphotungstic acid is a mono-lacunary Dawson-structure phosphotungstic acid heteropolyoxometalate anion represented by $(P_2W_{17}O_{61})^{10-}/10$ in terms of durability.

Specific examples of the triarylmethane pigment represented by general formula (1) include compounds shown in Tables 1 to 7; however, the present invention is not limited thereto within the scope of the present invention.

TABLE 1

| No. | $R^{11j}$ | $R^{12j}$ | $R^{13j}$ | $R^{14j}$ | $R^{15j}$ | $R^{16j}$ | $X^{11j}$ | $X^{12j}$ | Z— |
|---|---|---|---|---|---|---|---|---|---|
| 1 | C2H5— | C2H5— | C2H5— | C2H5— | C2H5— | H | H | H | (P2W18O62)6— |
| 2 | C2H5— | C2H5— | C2H5— | C2H5— | C2H5— | H | H | H | (P2MoW17O62)6— |
| 3 | C2H5— | C2H5— | C2H5— | C2H5— | C2H5— | H | H | H | (P2Mo2W16O62)6— |
| 4 | C2H5— | C2H5— | C2H5— | C2H5— | C2H5— | H | H | H | (P2Mo3W15O62)6— |
| 5 | C2H5— | C2H5— | C2H5— | C2H5— | C2H5— | H | H | H | (SiMoW11O40)4— |
| 6 | C2H5— | C2H5— | C2H5— | C2H5— | C2H5— | H | H | H | (P2W17O61)10— |
| 7 | CH3— | CH3— | CH3— | CH3— | C2H5— | H | H | H | (P2W18O62)6 |
| 8 | CH3— | CH3— | CH3— | CH3— | C2H5— | H | H | H | (P2MoW17O62)6— |
| 9 | CH3— | CH3— | CH3— | CH3— | C2H5— | H | H | H | (P2Mo3W15O62)6— |

TABLE 2

| No. | $R^{11j}$ | $R^{12j}$ | $R^{13j}$ | $R^{14j}$ | $R^{15j}$ | $R^{16j}$ | $X^{11j}$ | $X^{12j}$ | Z— |
|---|---|---|---|---|---|---|---|---|---|
| 10 | CH3— | CH3— | CH3— | CH3— | C2H5— | H | H | H | (P2Mo3W15O62)6 |
| 11 | CH3— | CH3— | CH3— | CH3— | C2H5— | H | H | H | (SiMoW11O40)4— |
| 12 | CH3— | CH3— | CH3— | CH3— | C2H5— | H | H | H | (P2W17O61)10— |
| 13 | CH3— | CH3— | CH3— | CH3— | Ph— | H | H | H | (P2W18O62)6— |
| 14 | CH3— | CH3— | CH3— | CH3— | Ph— | H | H | H | (P2MoW17O62)6— |
| 15 | CH3— | CH3— | CH3— | CH3— | Ph— | H | H | H | (P2Mo2W16O62)6— |
| 16 | CH3— | CH3— | CH3— | CH3— | Ph— | H | H | H | (P2Mo3W15O62)6— |
| 17 | CH3— | CH3— | CH3— | CH3— | Ph— | H | H | H | (SiMoW11O40)4— |
| 18 | CH3— | CH3— | CH3— | CH3— | Ph— | H | H | H | (P2W17O61)10— |

TABLE 3

| No. | $R^{11j}$ | $R^{12j}$ | $R^{13j}$ | $R^{14j}$ | $R^{15j}$ | $R^{16j}$ | $X^{11j}$ | $X^{12j}$ | Z— |
|---|---|---|---|---|---|---|---|---|---|
| 19 | CH3— | CH3— | CH3— | CH3— | Ph— | CH3— | H | H | (P2W18O62)6— |
| 20 | CH3— | CH3— | CH3— | CH3— | Ph— | CH3— | H | H | (P2MoW17O62)6— |
| 21 | CH3— | CH3— | CH3— | CH3— | Ph— | CH3— | H | H | (P2Mo2W16O62)6— |
| 22 | CH3— | CH3— | CH3— | CH3— | Ph— | CH3— | H | H | (P2Mo3W15O62)6— |
| 23 | CH3— | CH3— | CH3— | CH3— | Ph— | CH3— | H | H | (SiMoW11O40)4— |
| 24 | CH3— | CH3— | CH3— | CH3— | Ph— | CH3— | H | H | (P2W17O61)10— |
| 25 | n-C3H7— | n-C3H7— | n-C3H7— | n-C3H7— | C2H5— | H | H | H | (P2W18O62)6— |

TABLE 3-continued

| No. | $R^{11j}$ | $R^{12j}$ | $R^{13j}$ | $R^{14j}$ | $R^{15j}$ | $R^{16j}$ | $X^{11j}$ | $X^{12j}$ | Z— |
|---|---|---|---|---|---|---|---|---|---|
| 26 | n-C3H7— | n-C3H7— | n-C3H7— | n-C3H7— | C2H5— | H | H | H | (P2MoW17O62)6— |
| 27 | n-C3H7— | n-C3H7— | n-C3H7— | n-C3H7— | C2H5— | H | H | H | (P2Mo2W16O62)6— |

TABLE 4

| No. | $R^{11j}$ | $R^{12j}$ | $R^{13j}$ | $R^{14j}$ | $R^{15j}$ | $R^{16j}$ | $X^{11j}$ | $X^{12j}$ | Z— |
|---|---|---|---|---|---|---|---|---|---|
| 28 | C2H5— | C2H5— | C2H5— | C2H5— | C2H5— | H | CH3— | H | (P2W18O62)6— |
| 29 | C2H5— | C2H5— | C2H5— | C2H5— | C2H5— | H | CH3— | H | (P2MoW17O62)6— |
| 30 | C2H5— | C2H5— | C2H5— | C2H5— | C2H5— | H | CH3— | H | (P2Mo2W16O62)6— |
| 31 | C2H5— | C2H5— | C2H5— | C2H5— | C2H5— | H | CH3— | H | (P2Mo3W15O62)6— |
| 32 | C2H5— | C2H5— | C2H5— | C2H5— | C2H5— | H | CH3— | H | (SiMoW11O40)4— |
| 33 | C2H5— | C2H5— | C2H5— | C2H5— | C2H5— | H | CH3— | H | (P2W17O61)10— |
| 34 | C2H5— | C2H5— | C2H5— | C2H5— | C2H5— | H | CH3— | CH3— | (P2W18O62)6 |
| 35 | C2H5— | C2H5— | C2H5— | C2H5— | C2H5— | H | CH3— | CH3— | (P2MoW17O62)6— |
| 36 | C2H5— | C2H5— | C2H5— | C2H5— | C2H5— | H | CH3— | CH3— | (P2Mo3W15O62)6— |

TABLE 5

| No. | $R^{11j}$ | $R^{12j}$ | $R^{13j}$ | $R^{14j}$ | $R^{15j}$ | $R^{16j}$ | $X^{11j}$ | $X^{12j}$ | Z— |
|---|---|---|---|---|---|---|---|---|---|
| 37 | C2H5— | C2H5— | C2H5— | C2H5— | C2H5— | H | CH3— | CH3— | (P2Mo3W15O62)6— |
| 38 | C2H5— | C2H5— | C2H5— | C2H5— | C2H5— | H | CH3— | CH3— | (SiMoW11O40)4— |
| 39 | C2H5— | C2H5— | C2H5— | C2H5— | C2H5— | H | CH3— | CH3— | (P2W17O61)10— |
| 40 | C2H5— | C2H5— | C2H5— | C2H5— | C2H5— | H | Cl | H | (P2W18O62)6— |
| 41 | C2H5— | C2H5— | C2H5— | C2H5— | C2H5— | H | Cl | H | (P2MoW17O62)6— |
| 42 | C2H5— | C2H5— | C2H5— | C2H5— | C2H5— | H | Cl | H | (P2Mo2W16O62)6— |
| 43 | C2H5— | C2H5— | C2H5— | C2H5— | C2H5— | H | Cl | H | (P2Mo3W15O62)6— |
| 41 | C2H5— | C2H5— | C2H5— | C2H5— | C2H5— | H | Cl | H | (SiMoW11O40)4— |
| 45 | C2H5— | C2H5— | C2H5— | C2H5— | C2H5— | H | Cl | H | (P2W17O61)10— |

TABLE 6

| No. | $R^{11j}$ | $R^{12j}$ | $R^{13j}$ | $R^{14j}$ | $R^{15j}$ | $R^{16j}$ | $X^{11j}$ | $X^{12j}$ | Z— |
|---|---|---|---|---|---|---|---|---|---|
| 46 | C2H5— | C2H5— | C2H5— | C2H5— | C2H5— | C2H5— | H | H | (P2W18O62)6— |
| 47 | C2H5— | C2H5— | C2H5— | C2H5— | C2H5— | C2H5— | H | H | (P2MoW17O62)6— |
| 48 | C2H5— | C2H5— | C2H5— | C2H5— | C2H5— | C2H5— | H | H | (P2Mo2W16O62)6— |
| 49 | C2H5— | C2H5— | C2H5— | C2H5— | C2H5— | C2H5— | H | H | (P2Mo3W15O62)6— |
| 50 | C2H5— | C2H5— | C2H5— | C2H5— | C2H5— | C2H5— | H | H | (SiMoW11O40)4— |
| 51 | C2H5— | C2H5— | C2H5— | C2H5— | C2H5— | C2H5— | H | H | (P2W17O61)10— |
| 52 |  | |  | | C2H5— | H | H | H | (P2W18O62)6— |
| 53 |  | |  | | C2H5— | H | H | H | (P2MoW17O62)6— |
| 54 |  | |  | | C2H5— | H | H | H | (P2Mo2W16O62)6— |

TABLE 7

| No. | $R^{11j}$ | $R^{12j}$ | $R^{13j}$ | $R^{14j}$ | $R^{15j}$ | $R^{16j}$ | $X^{11j}$ | $X^{12j}$ | Z— |
|---|---|---|---|---|---|---|---|---|---|
| 55 |  | |  | | C2H5— | H | H | H | (P2Mo3W15O62)6— |
| 56 |  | |  | | C2H5— | H | H | H | (SiMoW11O40)4— |

TABLE 7-continued

| No. | R^{1j} | R^{12j} | R^{13j} | R^{14j} | R^{15j} | R^{16j} | X^{11j} | X^{12j} | Z— |
|---|---|---|---|---|---|---|---|---|---|
| 57 |  | |  | | C2H5— | H | H | H | (P2W17O61)10— |
| 58 | 4,4,4-tri-fluorobutyl | 4,4,4-tri-fluorobutyl | C2H5— | C2H5— | C2H5— | H | H | H | (P2W18O62)6— |
| 59 | 4,4,4-tri-fluorobutyl | 4,4,4-tri-fluorobutyl | C2H5— | C2H5— | C2H5— | H | H | H | (P2MoW17O62)6— |
| 60 | 4,4,4-tri-fluorobutyl | 4,4,4-tri-fluorobutyl | C2H5— | C2H5— | C2H5— | H | H | H | (SiMoW11O40)4— |
| 61 | 4,4,4-tri-fluorobutyl | 4,4,4-tri-fluorobutyl | C2H5— | C2H5— | C2H5— | H | CH3— | H | (P2W18O62)6— |
| 62 | 4,4,4-tri-fluorobutyl | 4,4,4-tri-fluorobutyl | C2H5— | C2H5— | C2H5— | H | CH3 | H | (P2MoW17O62)6— |
| 63 | 4,4,4-tri-fluorobutyl | 4,4,4-tri-fluorobutyl | C2H5— | C2H5— | C2H5— | H | CH3 | H | ((SiMoW11O40)4— |

In the RGB three-color pixel portions, the colorant contained in the R pixel portion is preferably C. I. Solvent Red 124, the colorant contained in the G pixel portion is preferably a mixture of C. I. Solvent Blue 67 and C. I. Solvent Yellow 162, and the colorant contained in the B pixel portion is preferably C. I. Solvent Blue 7.

In the RGB three-color pixel portions, the colorant contained in the R pixel portion is also preferably C. I. Pigment Red 254; the colorant contained in the G pixel portion is also preferably C. I. Pigment Green 7, 36, and/or 58; and the colorant contained in the B pixel portion is also preferably C. I. Pigment Blue 15:6 and/or a triarylmethane pigment.

Furthermore, in the RGB three-color pixel portions, the colorant contained in the R pixel portion is preferably at least one organic dye or pigment selected from the group consisting of C. I. Pigment Red 177, 242, 166, 167, and 179; C. I. Pigment Orange 38 and 71; C. I. Pigment Yellow 150, 215, 185, 138, and 139; C. I. Solvent Red 89; C. I. Solvent Orange 56; and C. I. Solvent Yellow 21, 82, 83:1, 33, and 162.

Furthermore, in the RGB three-color pixel portions, the colorant contained in the G pixel portion is preferably at least one organic dye or pigment selected from the group consisting of C. I. Pigment Yellow 150, 215, 185, and 138 and C. I. Solvent Yellow 21, 82, 83:1, and 33.

Furthermore, in the RGB three-color pixel portions, the colorant contained in the B pixel portion is preferably at least one organic dye or pigment selected from the group consisting of C. I. Pigment Blue 1; C. I. Pigment Violet 23; C. I. Basic Blue 7; C. I. Basic Violet 10; C. I. Acid Blue 1, 90, and 83; and C. I. Direct Blue 86.

It is also preferred that the color filter include the black matrix, the RGB three-color pixel portions, and a Y pixel portion and that the Y pixel portion contain a colorant that is at least one yellow organic dye or pigment selected from the group consisting of C. I. Pigment Yellow 150, 215, 185, 138, and 139 and C. I. Solvent Yellow 21, 82, 83:1, 33, and 162.

The black matrix of the color filter can be formed by known methods. A representative example of a method for forming the black matrix is photolithography; in the photolithography, pattern exposure is carried out by irradiation with ultraviolet through a photomask to cure part of a photocurable compound which is to be formed into the black matrix, and then the other part thereof which have not been exposed to light is developed with a developer to fix the black matrix to a transparent substrate. In another method for forming a black matrix, a metallic film is formed by, for instance, sputtering, an etching resist pattern is formed of a positive photoresist on the formed thin film, then the exposed part of the metallic film is etched, and the etching resist pattern is removed. The pixel portions of the color filter can be also formed by known methods. A representative example of a method for forming the pixel portions is photolithography; in the photolithography, photocurable compositions which will be described later are applied onto the black-matrix-formed surface of a transparent substrate used for a color filter and then heated for drying (pre-baked), and pattern exposure is carried out by irradiation with ultraviolet through a photomask to cure part of a photocurable compound which is to be formed into the pixel portions, then the unexposed part is developed with a developer to remove the part not formed into the pixel portions and to fix the pixel portions to the transparent substrate. In this method, the pixel portions that are cured and colored films made of the photocurable compositions are formed on the transparent substrate.

Photocurable compositions which will be described later are prepared for the individual R, G, and B pixel portions and optionally a pixel portion of another color, such as a Y pixel portion, and the above-mentioned process is repeated to produce a color filter having colored pixel portions including the R, G, B, and Y pixel portions at intended positions.

Examples of a method for applying photocurable compositions which will be described later onto a transparent substrate such as glass include spin coating, roll coating, and an ink jet technique.

Conditions for drying the coating films of the photocurable compositions formed on the transparent substrate vary depending on, for example, types and proportions of components thereof and are normally approximately from 50 to 150° C. and 1 to 15 minutes. Light used for photo-curing the photocurable compositions is preferably ultraviolet or visible light in a wavelength range of 200 to 500 nm. A variety of light sources that emit light in such a wavelength range can be used.

Examples of a developing method include a puddle method, a dipping method, and a spray method. After the exposure of the photocurable compositions to light and the development, the transparent substrate on which the pixel portions of necessary colors have been formed is washed with water and then dried. The color filter produced in such a manner is then heated (post-baked) for a predetermined time at 90 to 280° C. with heating equipment, such as a hotplate and an oven, to remove volatile components in the colored coating films as well as to thermally cure the unreacted portion of a photocurable compound remaining in the cured and colored coating films of the photocurable compositions, thereby completing production of the color filter.

The colorants used for the black matrix according to the present invention is combined with the liquid crystal composition according to the present invention, which enables production of a liquid crystal display device in which a decrease in the voltage holding ratio (VHR) of a liquid crystal layer and an increase in ion density (ID) therein are prevented and in which problems of defective display, such as dropouts, uneven alignment, and screen burn-in, are overcome.

In a general method for preparing the photocurable compositions used for the black matrix and R, G, B, and Y pixel portions, the pigment used for the black matrix according to the present invention, dye and/or pigment compositions used for the pixel portions of the color filter, an organic solvent, and a dispersant are used as essential components, the components are mixed and stirred for dispersion to a homogeneous state to prepare pigment dispersion liquids used for the black matrix and the pixel portions of the color filter, and then photocurable compounds and optionally thermoplastic resin and a photopolymerization initiator are added thereto, thereby producing the photocurable compositions.

Examples of an organic solvent used include aromatic solvents such as toluene, xylene, and methoxybenzene; acetate ester-based solvents such as ethyl acetate, propyl acetate, butyl acetate, propylene glycol monomethyl ether acetate, propylene glycol monoethyl ether acetate, diethylene glycol methyl ether acetate, diethylene glycol ethyl ether acetate, diethylene glycol propyl ether acetate, and diethylene glycol butyl ether acetate; propionate solvents such as ethoxyethyl propionate; alcohol-based solvents such as methanol and ethanol; ether-based solvents such as butyl cellosolve, propylene glycol monomethyl ether, diethylene glycol ethyl ether, and diethylene glycol dimethyl ether; ketone-based solvents such as methyl ethyl ketone, methyl isobutyl ketone, and cyclohexanone; aliphatic hydrocarbon solvents such as hexane; nitrogen compound-based solvents such as N,N-dimethylformamide, γ-butyrolactam, N-methyl-2-pyrrolidone, aniline, and pyridine; lactone-based solvents such as γ-butyrolactone; and carbamate esters such as a 48:52 mixture of methyl carbamate and ethyl carbamate.

Examples of a dispersant used include dispersants such as DISPERBYK 130, 161, 162, 163, 170, 171, 174, 180, 182, 183, 184, 185, 2000, 2001, 2020, 2050, 2070, 2096, 2150, LPN21116, and LPN6919 manufactured by BYK-Chemie GmbH, Efka 46, 47, 452, LP4008, 4009, LP4010, LP4050, LP4055, 400, 401, 402, 403, 450, 451, 453, 4540, 4550, LP4560, 120, 150, 1501, 1502, and 1503 manufactured by Efka Corporation, Solsperse 3000, 9000, 13240, 13650, 13940, 17000, 18000, 20000, 21000, 20000, 24000, 26000, 27000, 28000, 32000, 36000, 37000, 38000, 41000, 42000, 43000, 46000, 54000, and 71000 manufactured by The Lubrizol Corporation, and AJISPER PB711, PB821, PB822, PB814, PN411, and PA111 manufactured by Ajinomoto Co., Inc.; acrylic resins; urethane resins; alkyd resins; natural rosin such as wood rosin, gum rosin, and tall oil rosin; modified rosin such as polymerized rosin, disproportionated rosin, hydrogenated rosin, oxidized rosin, and maleated rosin; and synthetic resins that are in the form of liquid and insoluble to water at room temperature, such as rosin derivatives, e.g., rosin amine, lime rosin, rosin alkylene oxide adducts, rosin alkyd adducts, and rosin-modified phenol. Addition of these dispersants and resins contributes to a reduction in flocculation, an enhancement in the dispersion stability of the pigments, and an enhancement in the viscosity characteristics of the dispersion.

Organic pigment derivatives may be used as a dispersion aid, and examples thereof include phthalimidomethyl derivatives, sulfonic acid derivatives, N-(dialkylamino) methyl derivatives, and N-(dialkylaminoalkyl)sulfonic acid amide derivatives. Different types of such derivatives can be used in combination.

Examples of a thermoplastic resin used for preparing a photocurable composition include urethane resins, acrylic resins, polyamide resins, polyimide resins, styrene-maleic acid resins, and styrene-maleic anhydride resins.

Examples of the photocurable compound include difunctional monomers such as 1,6-hexanediol diacrylate, ethylene glycol diacrylate, neopentyl glycol diacrylate, triethylene glycol diacrylate, bis(acryloxyethoxy)bisphenol A, and 3-methylpentanediol diacrylate; polyfunctional monomers having a relatively low molecular weight, such as trimethylolpropane triacrylate, pentaerythritol triacrylate, tris[2-(meth)acryloyloxyethyl]isocyanurate, dipentaerythritol hexaacrylate, and dipentaerythritol pentaacrylate; and polyfunctional monomers having a relatively large molecular weight, such as polyester acrylates, polyurethane acrylates, and polyether acrylates.

Examples of the photopolymerization initiator include acetophenone, benzophenone, benzyldimethylketanol, benzoyl peroxide, 2-chlorothioxanthone, 1,3-bis(4'-azidobenzal)-2-propane, 1,3-bis(4'-azidobenzal)-2-propane-2'-sulfonic acid, and 4,4'-diazidostilbene-2,2'-disulfonic acid. Examples of commercially available photopolymerization initiators include "IRGACURE (registered trademark)-184", "IRGACURE (registered trademark)-369", and "DAROCUR (registered trademark)-1173" manufactured by BASF SE; "Lucirin-TPO" manufactured by BASF SE; "KAYACURE (registered trademark) DETX" and "KAYACURE (registered trademark) OA" manufactured by Nippon Kayaku Co., Ltd.; "VICURE 10" and "VICURE 55" manufactured by Stauffer Chemical Company; "Trigonal PI" manufactured by Akzo Nobel N.V.; "Sandoray 1000" manufactured by SANDOZ Co., LTD.; "DEAP" manufactured by The Upjohn Company; and "Biimidazole" manufactured by Kurogane Kasei Co., Ltd.

Known photosensitizer can be used in combination with the photopolymerization initiator. Examples of the photosensitizer include amines, ureas, compounds having a sulfur atom, compounds having a phosphorus atom, compounds having a chlorine atom, nitriles, and other compounds having a nitrogen atom. These materials may be used alone or in combination.

The photopolymerization initiator content is not specifically limited; however, the photopolymerization initiator content is preferably in the range of 0.1 to 30% on a mass basis relative to a photopolymerizable compound or a compound having a photocurable functional group. At a content less than 0.1%, photosensitivity in the photo-curing step is likely to be reduced; at a content larger than 30%, the crystals of the photopolymerization initiator precipitate on a dried coating film of a pigment-dispersed resist with the result that the physical properties of the coating film are impaired in some cases.

The above-mentioned materials are used, and 20 to 1000 parts of an organic solvent and 1 to 100 parts of a dispersant relative to 100 parts of the pigment used for the black matrix according to the present invention or a dye composition and/or pigment composition used for the pixel portions of the color filter on a mass basis are stirred for dispersion to a homogeneous state, thereby producing pigment dispersion liquids. Then, to the pigment dispersion liquids, 3 to 20 parts of both a thermoplastic resin and a photocurable compound relative to 1 part of the pigment used for the black matrix according to the present invention or the dye and/or pigment composition used for the color filter, 0.05 to 3 parts of a photopolymerization initiator relative to 1 part of the photocurable compound, and optionally an organic solvent are added, and the products are stirred for dispersion to a homogeneous state, thereby yielding photocurable compositions used for the black matrix and the pixel portions of the color filter.

Known organic solvents and alkali aqueous solutions can be used as a developer. Especially in the case where the photocurable composition contains a thermoplastic resin or a photocurable compound and where at least any one of these materials has an acid value or is soluble in alkali, washing with an alkali aqueous solution is effective for forming the black matrix and the pixel portions of the color filter.

The detail of formation of the pixel portions of the color filter by photolithography has been described; however, in the color filter having the pixel portions formed of the pigment compositions used for the color filter according to the present invention, such pixel portions of individual colors may be formed by another technique such as an electrodeposition method, a transfer process, micelle electrolysis, a PVED (photovoltaic electrodeposition) method, an ink jet technique, a reverse printing method, or a thermal curing method.

Although the detail of formation of the black matrix by photolithography has been described, formation of the black matrix by use of the colorant for the black matrix according to the present invention may be carried out by another technique such as a transfer process, an ink jet technique, a reverse printing method, or a thermal curing method.

(Alignment Film)

In the liquid crystal display device of the present invention, in the case where alignment films need to be disposed on the liquid-crystal-composition-side planes on the first and second substrate to align the molecules of the liquid crystal composition, an alignment film is placed between the color filter and the liquid crystal layer; however, the alignment film has a small thickness that is not more than 100 nm at the largest, and thus the alignment film does not completely block the interaction between a coloring matter, such as a pigment, contained in the color filter and a liquid crystal compound contained in the liquid crystal layer.

The interaction between a coloring matter, such as a pigment, contained in the color filter and a liquid crystal compound contained in the liquid crystal layer is larger in a liquid crystal display device in which an alignment film is not disposed.

Materials usable for the alignment film are transparent organic materials such as polyimide, polyamide, BCB (benzocyclobutene polymer), and polyvinyl alcohol; in particular, polyimide alignment films produced through imidization of polyamic acids synthesized from diamines such as aliphatic or alicyclic diamines, e.g., p-phenylenediamine and 4,4'-diaminodiphenylmethane; aliphatic or alicyclic tetracarboxylic acid anhydrides such as butanetetracarboxylic acid anhydride and 2,3,5-tricarboxycyclopentylacetic acid anhydride; and aromatic tetracarboxylic acid anhydrides such as pyromellitic acid dianhydride are preferred. An alignment function is generally developed by rubbing in this case; however, in the case where the alignment film is used as, for instance, a vertical alignment film, the film can be used without development of an alignment function.

Materials usable for the alignment film may be materials in which compounds contain a chalcone, cinnamate, cinnamoyl, or an azo group. Such materials may be used in combination with another material such as polyimide or polyamide; in this case, the alignment film may be subjected to rubbing or treatment with a photo-alignment technique.

In general formation of alignment films, the above-mentioned material of the alignment film is applied onto a substrate by, for example, spin coating to form a resin film; however, uniaxial drawing or a Langmuir-Blodgett technique may be also employed.

(Transparent Electrode)

In the liquid crystal display device of the present invention, a conductive metallic oxide can be used as a material of the transparent electrode; examples of the metallic oxide include indium (III) oxide ($In_2O_3$), tin dioxide ($SnO_2$), zinc oxide (ZnO), indium tin oxide ($In_2O_3$—$SnO_2$), indium zinc oxide ($In_2O_3$—ZnO), niobium-added titanium dioxide ($Ti_{1-x}Nb_xO_2$), fluorine-doped tin oxide, graphene nanoribbon, and metallic nanowires. Zinc oxide (ZnO), indium tin oxide ($In_2O_3$—$SnO_2$), and indium zinc oxide ($In_2O_3$—ZnO) are preferred. Transparent conductive films formed of these materials can be patterned by photo-etching or a technique involving use of a mask.

The liquid crystal display device of the present invention is combined with a back light and used in a variety of applications such as liquid crystal television sets, computers monitors, mobile phones, displays of smartphones, laptops, personal digital assistants, and digital signage. Examples of the back light include cold-cathode tube backlights and virtually white backlights with two peak wavelengths or backlights with three peak wavelengths; in the backlight with two or three peak wavelengths, light-emitting diodes using inorganic materials and organic EL devices are used.

EXAMPLES

Although some best modes of the present invention will now be described in detail with reference to Examples, the present invention is not limited to Examples. In compositions which will be described in Examples and Comparative Examples, the term "%" refers to "mass %".

In Examples, the following properties were measured.

$T_{ni}$: nematic phase-isotropic liquid phase transition temperature (° C.)

$\Delta n$: refractive index anisotropy at 25° C.

$\Delta\epsilon$: dielectric constant anisotropy at 25° C.

$\eta$: viscosity at 20° C. (mPa·s)

$\gamma_1$: rotational viscosity at 25° C. (mPa·s)

$d_{gap}$: gap between first and second substrates in cell (μm)

VHR: voltage holding ratio at 70° C.

(ratio, represented by %, of measured voltage to initial applied voltage, which was obtained as follows: a liquid crystal composition was put into a cell having a thickness of 3.5 μm, and the measurement was carried out under the conditions of applied voltage of 5 V, frame time of 200 ms and pulse width of 64 ρs.)

ID: ion density at 70° C. ($pC/cm^2$)

(ion density obtained as follows: a liquid crystal composition was put into a cell having a thickness of 3.5 μm, and measurement was carried out with an MTR-1 (manufactured by TOYO Corporation) under the conditions of an applied voltage of 20 V and a frequency of 0.05 Hz)

Screen Burn-In:

In evaluation of screen burn-in in a liquid crystal display device, a certain fixed pattern was continuously displayed in a display area for 1000 hours, and then the whole of the screen evenly showed an image. Then, the degree of an afterimage of the fixed pattern was visually observed, and result of the observation was evaluated on the basis of the following four criteria:

Excellent: No afterimage observed
Good: Slight afterimage observed, but acceptable
Bad: Afterimage observed, unacceptable
Poor: Afterimage observed, quite inadequate In order to measure the volume resistivity of a pigment, the pigment was compressed at 50 tons into a tablet having a thickness of approximately 4 mm, and the volume resistivity of the tablet was measured with a universal bridge.

In Examples, compounds are abbreviated as follows.
(Side Chain)
- -n —$C_nH_{2n+1}$ linear alkyl group having n carbon atoms
- n- $C_nH_{2n+1}$— linear alkyl group having n carbon atoms
- —On —$OC_nH_{2n+1}$ linear alkoxyl group having n carbon atoms
- nO— $C_nH_{2n+1}O$— linear alkoxyl group having n carbon atoms
- —V —CH=$CH_2$
- V— $CH_2$=CH—
- —V1 —CH=CH—$CH_3$
- 1V— $CH_3$—CH=CH—
- -2V —$CH_2$—$CH_2$—CH=$CH_3$
- V2- $CH_3$=CH—$CH_2$—$CH_2$—
- -2V1 —$CH_2$—$CH_2$—CH=CH—$CH_3$
- 1V2- $CH_3$—CH=CH—$CH_2$—$CH_2$ (Ring Structure)

[Chem. 25]

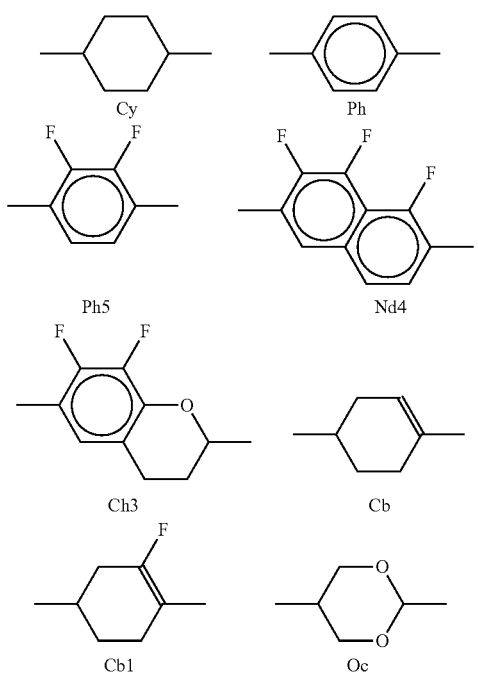

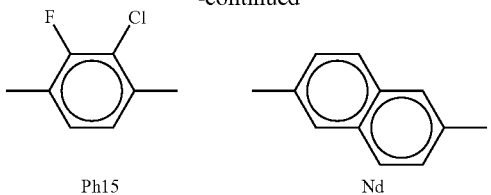

[Production of Color Filter]
[Formation of Black Matrix]
[Black Matrix 1]

A dispersion liquid of carbon black was obtained by dispersing 55 parts of a carbon black (C. I. Pigment Black 7) having a volume resistivity of $10^7$ Ω·cm and 45 parts of a dispersant solution with a Paint Conditioner. Then, 67 parts of this dispersion liquid was mixed with 2 parts of a photopolymerizable monomer curable by being irradiated with ultraviolet, 7 parts of an alkali-soluble resin, 1 part of a photo initiator, and 23 parts of a solvent to prepare a photosensitive composition 1 used for a black matrix.

The photosensitive composition 1 was applied to a glass substrate with a spin coater. The product was vacuum-dried for a minute and then heated on a hot plate at 90° C. for 90 seconds for drying to form a coating film having a dried film thickness of approximately 3 μm. Then, the product was exposed to light imagewise from the coating-film-formed side through a pattern mask, and development was subsequently carried out, thereby forming a black matrix 1.

[Black Matrix 2]

A dispersion liquid of titanium black was obtained by dispersing 70 parts of a titanium black (C. I. Pigment Black 35) having a volume resistivity of $10^6$ Ω·cm and 30 parts of a dispersant solution with a Paint Conditioner. Then, 16 parts of this dispersion liquid was mixed with 66 parts of a photopolymerizable monomer curable by being irradiated with ultraviolet, 16 parts of an alkali-soluble resin, 2 parts of a photo initiator, and 16 parts of a solvent to prepare a photosensitive composition 2 used for a black matrix.

The photosensitive composition 2 was applied to a glass substrate with a spin coater. The product was vacuum-dried for a minute and then heated on a hot plate at 90° C. for 90 seconds for drying to form a coating film having a dried film thickness of approximately 3 μm. Then, the product was exposed to light imagewise from the coating-film-formed side through a pattern mask, and development was subsequently carried out, thereby forming a black matrix 2.

[Black Matrix 3]

A black dispersion liquid of organic pigments was obtained by dispersing 5 parts of a blue organic pigment (C. I. Pigment Blue 60) having a volume resistivity of $10^{10}$ Ω·cm, 2 parts of a purple organic pigment (C. I. Pigment Violet 23) having a volume resistivity of $10^9$ Ω·cm, 4 parts of a green organic pigment (C. I. Pigment Green 7) having a volume resistivity of $10^{13}$ Ω·cm, 4 parts of a red organic pigment (C. I. Pigment Red 179) having a volume resistivity of $10^9$ Ω·cm, and 85 parts of a dispersant solution with a Paint Conditioner. Then, 40 parts of this dispersion liquid was mixed with 4 parts of a photopolymerizable monomer curable by being irradiated with ultraviolet, 2 parts of an alkali-soluble resin, 1 part of a photo initiator, and 53 parts of a solvent to prepare a photosensitive composition 3 used for a black matrix.

The photosensitive composition 3 was applied to a glass substrate with a spin coater. The product was vacuum-dried for a minute and then heated on a hot plate at 90° C. for 90 seconds for drying to form a coating film having a dried film thickness of approximately 3 μm. Then, the product was exposed to light imagewise from the coating-film-formed side through a pattern mask, and development was subsequently carried out, thereby forming a black matrix 3.

[Black Matrix 4]

A black dispersion liquid of organic pigments was obtained by dispersing 6 parts of a blue organic pigment (C. I. Pigment Blue 15:6) having a volume resistivity of $10^9$ Ω·cm, 4 parts of a red organic pigment (C. I. Pigment Red 254) having a volume resistivity of $10^{10}$ Ω·cm, 5 parts of a yellow organic pigment (C. I. Pigment Yellow 150) having a volume resistivity of $10^9$ Ω·cm, and 85 parts of a dispersant solution with a Paint Conditioner. Then, 40 parts of this dispersion liquid was mixed with 4 parts of a photopolymerizable monomer curable by being irradiated with ultraviolet, 2 parts of an alkali-soluble resin, 1 part of a photo initiator, and 53 parts of a solvent to prepare a photosensitive composition 4 used for a black matrix.

The photosensitive composition 4 was applied to a glass substrate with a spin coater. The product was vacuum-dried for a minute and then heated on a hot plate at 90° C. for 90 seconds for drying to form a coating film having a dried film thickness of approximately 3 μm. Then, the product was exposed to light imagewise from the coating-film-formed side through a pattern mask, and development was subsequently carried out, thereby forming a black matrix 4.

[Black Matrix 5]

A chromium oxide film was formed on a glass substrate by sputtering, a photoresist pattern used for forming an opening was formed thereon by photolithography, the exposed part of the chromium oxide film was removed by etching on the basis of the photoresist pattern, and then the photoresist pattern was removed to produce a black matrix 5.

[Preparation of Colored Composition Used for RGB Three-Color Pixel Portion]

[Colored Red Dye Composition 1]

Into a polyethylene bottle, 10 parts of a red pigment 1 (C. I. Pigment Red 254 "IRGAPHOR RED BT-CF" manufactured by BASF SE) was added; 55 parts of propylene glycol monomethyl ether acetate, 7.0 parts of DISPERBYK LPN21116 (manufactured by BYK-Chemie GmbH), and 0.3 to 0.4 mmφ of SEPR beads were added thereto; the product was subjected to dispersion for 4 hours with a PAINT CONDITIONER (manufactured by Toyo Seiki Seisaku-sho, Ltd.); and then the product was filtered through a filter having a pore size of 5 μm to produce a pigment dispersion liquid. Then, 75.00 parts of this pigment dispersion liquid, 5.50 parts of a polyester acrylate resin (ARONIX (registered trademark) M7100 manufactured by TOAGOSEI CO., LTD.), 5.00 parts of dipentaerythritol hexaacrylate (KAYARAD (registered trademark) DPHA manufactured by Nippon Kayaku Co., Ltd.), 1.00 parts of benzophenone (KAYACURE (registered trademark) BP-100 manufactured by Nippon Kayaku Co., Ltd.), and 13.5 parts of UCAR ester EEP were mixed in a dispersion mixer; and the product was filtered through a filter having a pore size of 1.0 μm to yield a colored red pigment composition 1.

[Colored Green Pigment Composition 1]

In place of 10 parts of the red pigment 1 used in the preparation of the colored red pigment composition 1, 6 parts of a green pigment 1 (C. I. Pigment Green 58 "FASTOGEN GREEN A110" manufactured by DIC Corporation) and 4 parts of a yellow pigment 1 (C. I. Pigment Yellow 150 "FANCHON FAST YELLOW E4GN" manufactured by LANXESS) were used. Except for this change, a colored green pigment composition 1 was prepared as in the above-mentioned preparation process.

[Colored Blue Pigment Composition 1]

In place of 10 parts of the red pigment 1 used in the preparation of the colored red pigment composition 1, 9 parts of a blue pigment 1 (C. I. Pigment Blue 15:6 "FASTOGEN BLUE EP-210" manufactured by DIC Corporation) and 1 part of a purple pigment 1 (C. I. Pigment VIOLET 23) were used. Except for this change, a colored blue pigment composition 1 was prepared as in the above-mentioned preparation process.

[Production of Color Filter]

The colored red composition 1 was applied by spin coating onto a glass substrate on which a black matrix had been formed in advance, thereby forming a film having a thickness of 2 μm. The product was dried at 70° C. for 20 minutes and then exposed to ultraviolet through a photomask with exposure equipment having an extra-high pressure mercury lamp to form a striped pattern. The product was subjected to a spray development for 90 seconds with an alkaline developer, washed with ion exchanged water, and air-dried. Then, the product was post-baked at 230° C. for 30 minutes in a clean oven to form a red pixel portion composed of stripe-shaped color layers on the transparent substrate.

Then, the colored green composition 1 was similarly applied by spin coating to form a film having a thickness of 2 μm. The product was dried, and then part of the product which did not correspond to the above-mentioned red pixel portion was exposed to light with exposure equipment and subsequently developed to form stripe-shaped colored layers, thereby forming a green pixel portion adjoining the red pixel portion.

Then, the colored blue composition 1 was similarly applied by spin coating to form a film having a thickness of 2 μm, thereby forming a blue pixel portion adjoining the red and green pixel portions. Through such a process, a color filer having the stripe-shaped pixel portions of three colors of red, green, and blue on the transparent substrate was produced.

The black matrixes shown in Table 8 were used to produce color filters 1 to 4 and a comparative color filter

TABLE 8

|  | Color filter 1 | Color filter 2 | Color filter 3 | Color filter 4 | Comparative color filter 1 |
| --- | --- | --- | --- | --- | --- |
| Black Matrix | Black Matrix 1 | Black Matrix 2 | Black Matrix 3 | Black Matrix 4 | Black Matrix 5 |

Examples 1 to 4

Electrodes corresponding to first and second substrates were formed, vertical alignment films were formed on the facing surfaces thereof, the alignment films were slightly rubbed to form VA cells, and then a liquid crystal composition 1 shown in Table 9 was placed between the first and second substrates. Then, the color filters 1 to 4 shown in Table 8 were used to produce liquid crystal display devices of Examples 1 to 4 ($d_{gap}$=3.5 μm and alignment film SE-5300). The VHR and ID of the produced liquid crystal display devices were measured. The screen burn-in of each liquid crystal display device was evaluated. Table 10 shows results of the measurement and evaluation.

TABLE 9

| Liquid crystal composition 1 | |
| --- | --- |
| $T_{Ni}/°C.$ | 81.0 |
| $\Delta n$ | 0.103 |
| $\Delta \epsilon$ | −2.9 |
| $\eta/mPa \cdot s$ | 20.3 |
| $\gamma_1/mPa \cdot s$ | 112 |
| $\gamma_1/\Delta n^2 \times 10^{-2}$ | 105 |
| 3-Cy—Cy-2 | 24% |
| 3-Cy—Cy-4 | 10% |
| 3-Cy—Cy-5 | 5% |
| 3-Cy—Ph—O1 | 2% |
| 3-Cy—Ph5—O2 | 13% |
| 2-Cy—Ph—Ph5—O2 | 9% |
| 3-Cy—Ph—Ph5—O2 | 9% |
| 3-Cy—Cy—Ph5—O3 | 5% |
| 4-Cy—Cy—Ph5—O2 | 6% |
| 5-Cy—Cy—Ph5—O2 | 5% |
| 3-Ph—Ph5—Ph-2 | 6% |
| 4-Ph—Ph5—Ph-2 | 6% |

TABLE 10

| | Example 1 | Example 2 | Example 3 | Example 4 |
| --- | --- | --- | --- | --- |
| Liquid crystal composition | Liquid crystal composition 1 | Liquid crystal composition 1 | Liquid crystal composition 1 | Liquid crystal composition 1 |
| Color filter | Color filter 1 | Color filter 2 | Color filter 3 | Color filter 4 |
| VHR | 99.5 | 99.4 | 99.1 | 99.0 |
| ID | 16 | 23 | 65 | 77 |
| Screen burn-in | Excellent | Excellent | Good | Good |

The liquid crystal composition 1 had a temperature range of a liquid crystal phase of 81° C., which was practical for a liquid crystal composition used for TV sets, a dielectric anisotropy with a large absolute value thereof, a low viscosity, and optimum Δn.

Each of the liquid crystal display devices of Examples 1 to 4 had high VHR and small ID. In the evaluation of screen burn-in, no afterimage was observed, or, if any, a very minor afterimage was observed but acceptable.

Examples 5 to 12

As in Example 1, liquid crystal compositions shown in Table 11 were placed, the color filters shown in Table 8 were used to produce liquid crystal display devices of Examples 5 to 12, and the VHR and ID thereof were measured. The screen burn-in of each liquid crystal display device was evaluated. Tables 12 and 13 show results of the measurement and evaluation.

TABLE 11

| Liquid crystal composition 2 | |
| --- | --- |
| $T_{Ni}/°C.$ | 76.0 |
| $\Delta n$ | 0.103 |
| $\Delta \epsilon$ | −2.9 |
| $\eta/mPa \cdot s$ | 19.8 |
| $\gamma_1/mPa \cdot s$ | 110 |
| $\gamma_1/\Delta n^2 \times 10^{-2}$ | 103 |
| 3-Cy—Cy-2 | 24% |
| 3-Cy—Cy-4 | 10% |
| 3-Cy—Ph—O1 | 7% |
| 3-Cy—Ph5—O2 | 14% |
| 2-Cy—Ph—Ph5—O2 | 7% |
| 3-Cy—Ph—Ph5—O2 | 9% |
| 3-Cy—Cy—Ph5—O3 | 5% |
| 4-Cy—Cy—Ph5—O2 | 7% |
| 5-Cy—Cy—Ph5—O2 | 5% |
| 3-Ph—Ph5—Ph-2 | 6% |
| 4-Ph—Ph5—Ph-2 | 6% |

| Liquid crystal composition 3 | |
| --- | --- |
| $T_{Ni}/°C.$ | 84.8 |
| $\Delta n$ | 0.103 |
| $\Delta \epsilon$ | −2.9 |
| $\eta/mPa \cdot s$ | 21.4 |
| $\gamma_1/mPa \cdot s$ | 119 |
| $\gamma_1/\Delta n^2 \times 10^{-2}$ | 112 |
| 3-Cy—Cy-2 | 24% |
| 3-Cy—Cy-4 | 11% |
| 3-Cy—Ph5—O2 | 12% |
| 2-Cy—Ph—Ph5—O2 | 5% |
| 3-Cy—Ph—Ph5—O2 | 6% |
| 3-Cy—Cy—Ph5—O3 | 8% |
| 4-Cy—Cy—Ph5—O2 | 8% |
| 5-Cy—Cy—Ph5—O2 | 8% |
| 3-Ph—Ph5—Ph-2 | 6% |
| 4-Ph—Ph5—Ph-2 | 6% |
| 5-Ph—Ph-1 | 3% |
| 3-Cy—Cy—Ph-1 | 3% |

TABLE 12

| | Example 5 | Example 6 | Example 7 | Example 8 |
| --- | --- | --- | --- | --- |
| Liquid crystal composition | Liquid crystal composition 2 | Liquid crystal composition 2 | Liquid crystal composition 2 | Liquid crystal composition 2 |
| Color filter | Color filter 1 | Color filter 2 | Color filter 3 | Color filter 4 |
| VHR | 99.6 | 99.4 | 99.3 | 99.2 |
| ID | 14 | 25 | 36 | 60 |
| Screen burn-in | Excellent | Excellent | Excellent | Excellent |

TABLE 13

| | Example 9 | Example 10 | Example 11 | Example 12 |
| --- | --- | --- | --- | --- |
| Liquid crystal composition | Liquid crystal composition 3 | Liquid crystal composition 3 | Liquid crystal composition 3 | Liquid crystal composition 3 |
| Color filter | Color filter 1 | Color filter 2 | Color filter 3 | Color filter 4 |
| VHR | 99.4 | 99.4 | 99.2 | 99.1 |
| ID | 21 | 25 | 63 | 72 |
| Screen burn-in | Excellent | Excellent | Excellent | Good |

Each of the liquid crystal display devices of Examples 5 to 12 had high VHR and small ID. In the evaluation of screen burn-in, no afterimage was observed, or, if any, a very minor afterimage was observed but acceptable.

Examples 13 to 24

As in Example 1, liquid crystal compositions shown in Table 14 were placed, the color filters shown in Table 8 were used to produce liquid crystal display devices of Examples 13 to 24, and the VHR and ID thereof were measured. The screen burn-in of each liquid crystal display device was evaluated. Tables 15 and 17 show results of the measurement and evaluation.

TABLE 14

| Liquid crystal composition 4 | |
| --- | --- |
| $T_{Ni}/°C$ | 74.9 |
| $\Delta n$ | 0.102 |
| $\Delta \epsilon$ | -2.9 |
| $\eta/mPa \cdot s$ | 21.1 |
| $\gamma_1/mPa \cdot s$ | 116 |
| $\gamma_1/\Delta n^2 \times 10^{-2}$ | 111 |
| 3-Cy—Cy-2 | 22% |
| 3-Cy—Cy-4 | 11% |
| 3-Cy—Ph5—O2 | 7% |
| 3-Cy—Ph5—O4 | 8% |
| 2-Cy—Ph—Ph5—O2 | 6% |
| 3-Cy—Ph—Ph5—O2 | 7% |
| 3-Cy—Cy—Ph5—O3 | 7% |
| 4-Cy—Cy—Ph5—O2 | 7% |
| 5-Cy—Cy—Ph5—O2 | 7% |
| 3-Ph—Ph5—Ph-2 | 4% |
| 4-Ph—Ph5—Ph-2 | 4% |
| 5-Ph—Ph-1 | 8% |
| 3-Cy—Cy—Ph-1 | 2% |

| Liquid crystal composition 5 | |
| --- | --- |
| $T_{Ni}/°C$ | 80.2 |
| $\Delta n$ | 0.105 |
| $\Delta \epsilon$ | -2.9 |
| $\eta/mPa \cdot s$ | 22.7 |
| $\gamma_1/mPa \cdot s$ | 124 |
| $\gamma_1/\Delta n^2 \times 10^{-2}$ | 112 |
| 3-Cy—Cy-2 | 20% |
| 3-Cy—Cy-4 | 10% |
| 3-Cy—Ph5—O2 | 7% |
| 2-Cy—Ph5—O4 | 7% |
| 2-Cy—Ph—Ph5—O2 | 6% |
| 3-Cy—Ph—Ph5—O2 | 7% |
| 3-Cy—Cy—Ph5—O3 | 7% |
| 4-Cy—Cy—Ph5—O2 | 8% |
| 5-Cy—Cy—Ph5—O2 | 7% |
| 3-Ph—Ph5—Ph-2 | 4% |
| 4-Ph—Ph5—Ph-2 | 4% |
| 5-Ph—Ph-1 | 8% |
| 3-Cy—Cy—Ph-1 | 5% |

| Liquid crystal composition 6 | |
| --- | --- |
| $T_{Ni}/°C$ | 85.7 |
| $\Delta n$ | 0.104 |
| $\Delta \epsilon$ | -3.0 |
| $\eta/mPa \cdot s$ | 22.9 |
| $\gamma_1/mPa \cdot s$ | 126 |
| $\gamma_1/\Delta n^2 \times 10^{-2}$ | 116 |
| 3-Cy—Cy-2 | 20% |
| 3-Cy—Cy-4 | 10% |
| 3-Cy—Ph5—O2 | 7% |
| 2-Cy—Ph5—O4 | 7% |
| 2-Cy—Ph—Ph5—O2 | 6% |
| 3-Cy—Ph—Ph5—O2 | 7% |
| 3-Cy—Cy—Ph5—O3 | 7% |
| 4-Cy—Cy—Ph5—O2 | 8% |
| 5-Cy—Cy—Ph5—O2 | 7% |
| 3-Ph—Ph5—Ph-2 | 4% |
| 4-Ph—Ph5—Ph-2 | 4% |
| 5-Ph—Ph-1 | 5% |
| 3-Cy—Cy—Ph-1 | 8% |

TABLE 15

| | Example 13 | Example 14 | Example 15 | Example 16 |
| --- | --- | --- | --- | --- |
| Liquid crystal composition | Liquid crystal composition 4 | Liquid crystal composition 4 | Liquid crystal composition 4 | Liquid crystal composition 4 |
| Color filter | Color filter 1 | Color filter 2 | Color filter 3 | Color filter 4 |
| VHR | 99.5 | 99.4 | 99.2 | 99.1 |
| ID | 16 | 21 | 58 | 73 |
| Screen burn-in | Excellent | Excellent | Excellent | Good |

TABLE 16

| | Example 17 | Example 18 | Example 19 | Example 20 |
| --- | --- | --- | --- | --- |
| Liquid crystal composition | Liquid crystal composition 5 | Liquid crystal composition 5 | Liquid crystal composition 5 | Liquid crystal composition 5 |
| Color filter | Color filter 1 | Color filter 2 | Color filter 3 | Color filter 4 |
| VHR | 99.6 | 99.4 | 99.2 | 99.1 |
| ID | 13 | 24 | 55 | 67 |
| Screen burn-in | Excellent | Excellent | Excellent | Excellent |

TABLE 17

| | Example 21 | Example 22 | Example 23 | Example 24 |
| --- | --- | --- | --- | --- |
| Liquid crystal composition | Liquid crystal composition 6 | Liquid crystal composition 6 | Liquid crystal composition 6 | Liquid crystal composition 6 |
| Color filter | Color filter 1 | Color filter 2 | Color filter 3 | Color filter 4 |
| VHR | 99.4 | 99.3 | 99.1 | 99.0 |
| ID | 22 | 48 | 62 | 76 |
| Screen burn-in | Excellent | Excellent | Excellent | Good |

Each of the liquid crystal display devices of Examples 13 to 24 had high VHR and small ID. In the evaluation of screen burn-in, no afterimage was observed, or, if any, a very minor afterimage was observed but acceptable.

Examples 25 to 36

As in Example 1, liquid crystal compositions shown in Table 18 were placed, the color filters shown in Table 8 were used to produce liquid crystal display devices of Examples 25 to 36, and the VHR and ID thereof were measured. The screen burn-in of each liquid crystal display device was evaluated. Tables 19 to 21 show results of the measurement and evaluation.

TABLE 18

| Liquid crystal composition 7 | |
| --- | --- |
| $T_{Ni}/°C$ | 75.1 |
| $\Delta n$ | 0.103 |
| $\Delta \epsilon$ | -2.6 |
| $\eta/mPa \cdot s$ | 20.5 |
| $\gamma_1/mPa \cdot s$ | 117 |
| $\gamma_1/\Delta n^2 \times 10^{-2}$ | 110 |
| 3-Cy—Cy-2 | 15% |
| 3-Cy—Cy-4 | 12% |
| 3-Cy—Cy-5 | 7% |
| 3-Cy—Ph—O1 | 12% |
| 3-Cy—Ph5—O2 | 6% |
| 3-Cy—Ph5—O4 | 7% |
| 2-Cy—Ph—Ph5—O2 | 11% |
| 3-Cy—Ph—Ph5—O2 | 12% |
| 3-Cy—Cy—Ph5—O3 | 3% |
| 4-Cy—Cy—Ph5—O2 | 4% |
| 5-Cy—Cy—Ph5—O2 | 3% |

TABLE 18-continued

| | |
|---|---|
| 3-Ph—Ph5—Ph-2 | 4% |
| 4-Ph—Ph5—Ph-2 | 4% |

| Liquid crystal composition 8 | |
|---|---|
| $T_{NI}/°C.$ | 80.4 |
| $\Delta n$ | 0.103 |
| $\Delta \epsilon$ | -2.6 |
| $\eta/mPa \cdot s$ | 21.6 |
| $\gamma_1/mPa \cdot s$ | 125 |
| $\gamma_1/\Delta n^2 \times 10^{-2}$ | 117 |
| 3-Cy—Cy-2 | 15% |
| 3-Cy—Cy-4 | 12% |
| 3-Cy—Cy-5 | 7% |
| 3-Cy—Ph—O1 | 12% |
| 3-Cy—Ph5—O2 | 5% |
| 3-Cy—Ph5—O4 | 5% |
| 2-Cy—Ph—Ph5—O2 | 11% |
| 3-Cy—Ph—Ph5—O2 | 11% |
| 3-Cy—Cy—Ph5—O3 | 4% |
| 4-Cy—Cy—Ph5—O2 | 6% |
| 5-Cy—Cy—Ph5—O2 | 4% |
| 3-Ph—Ph5—Ph-2 | 4% |
| 4-Ph—Ph5—Ph-2 | 4% |

| Liquid crystal composition 9 | |
|---|---|
| $T_{NI}/°C.$ | 85.1 |
| $\Delta n$ | 0.103 |
| $\Delta \epsilon$ | -2.6 |
| $\eta/mPa \cdot s$ | 22.7 |
| $\gamma_1/mPa \cdot s$ | 130 |
| $\gamma_1/\Delta n^2 \times 10^{-2}$ | 122 |
| 3-Cy—Cy-2 | 10% |
| 3-Cy—Cy-4 | 15% |
| 3-Cy—Cy-5 | 12% |
| 3-Cy—Ph—O1 | 9% |
| 3-Cy—Ph5—O2 | 5% |
| 3-Cy—Ph5—O4 | 5% |
| 2-Cy—Ph—Ph5—O2 | 11% |
| 3-Cy—Ph—Ph5—O2 | 11% |
| 3-Cy—Cy—Ph5—O3 | 4% |
| 4-Cy—Cy—Ph5—O2 | 6% |
| 5-Cy—Cy—Ph5—O2 | 4% |
| 3-Ph—Ph5—Ph-2 | 4% |
| 4-Ph—Ph5—Ph-2 | 4% |

TABLE 19

| | Example 25 | Example 26 | Example 27 | Example 28 |
|---|---|---|---|---|
| Liquid crystal composition | Liquid crystal composition 7 | Liquid crystal composition 7 | Liquid crystal composition 7 | Liquid crystal composition 7 |
| Color filter | Color filter 1 | Color filter 2 | Color filter 3 | Color filter 4 |
| VHR | 99.5 | 99.3 | 99.1 | 98.9 |
| ID | 25 | 50 | 66 | 84 |
| Screen burn-in | Excellent | Excellent | Good | Good |

TABLE 20

| | Example 29 | Example 30 | Example 31 | Example 32 |
|---|---|---|---|---|
| Liquid crystal composition | Liquid crystal composition 8 | Liquid crystal composition 8 | Liquid crystal composition 8 | Liquid crystal composition 8 |
| Color filter | Color filter 1 | Color filter 2 | Color filter 3 | Color filter 4 |
| VHR | 99.6 | 99.4 | 99.2 | 99.0 |
| ID | 16 | 29 | 62 | 91 |
| Screen burn-in | Excellent | Excellent | Excellent | Good |

TABLE 21

| | Example 33 | Example 34 | Example 35 | Example 36 |
|---|---|---|---|---|
| Liquid crystal composition | Liquid crystal composition 9 | Liquid crystal composition 9 | Liquid crystal composition 9 | Liquid crystal composition 9 |
| Color filter | Color filter 1 | Color filter 2 | Color filter 3 | Color filter 4 |
| VHR | 99.5 | 99.3 | 99.2 | 99.1 |
| ID | 21 | 39 | 57 | 74 |
| Screen burn-in | Excellent | Excellent | Excellent | Excellent |

Each of the liquid crystal display devices of Examples 25 to 36 had high VHR and small ID. In the evaluation of screen burn-in, no afterimage was observed, or, if any, a very minor afterimage was observed but acceptable.

Examples 37 to 48

As in Example 1, liquid crystal compositions shown in Table 22 were placed, the color filters shown in Table 8 were used to produce liquid crystal display devices of Examples 37 to 48, and the VHR and ID thereof were measured. The screen burn-in of each liquid crystal display device was evaluated. Tables 23 to 25 show results of the measurement and evaluation.

TABLE 22

| Liquid crystal composition 10 | | Liquid crystal composition 11 | | Liquid crystal composition 12 | |
|---|---|---|---|---|---|
| $T_{NI}/°C.$ | 76.7 | $T_{NI}/°C.$ | 80.3 | $T_{NI}/°C.$ | 85.8 |
| $\Delta n$ | 0.109 | $\Delta n$ | 0.105 | $\Delta n$ | 0.104 |
| $\Delta \epsilon$ | -3.0 | $\Delta \epsilon$ | -3.1 | $\Delta \epsilon$ | -3.2 |
| $\eta / mPa \cdot s$ | 22.4 | $\eta / mPa \cdot s$ | 21.8 | $\eta / mPa \cdot s$ | 22.0 |
| $\gamma_1 / mPa \cdot s$ | 131 | $\gamma_1 / mPa \cdot s$ | 126 | $\gamma_1 / mPa \cdot s$ | 128 |
| $\gamma_1 / \Delta n^2 \times 10^{-2}$ | 110 | $\gamma_1 / \Delta n^2 \times 10^{-2}$ | 114 | $\gamma_1 / \Delta n^2 \times 10^{-2}$ | 119 |
| 3-Cy-Cy-2 | 24% | 3-Cy-Cy-2 | 24% | 3-Cy-Cy-2 | 24% |
| 3-Cy-Cy-4 | 6% | 3-Cy-Cy-4 | 10% | 3-Cy-Cy-4 | 10% |
| 3-Cy-Ph-O1 | 5% | 3-Cy-Ph-O1 | 4% | 3-Cy-Ph-O1 | 4% |
| 3-Cy-Ph5-O4 | 6% | 3-Cy-Ph5-O4 | 6% | 3-Cy-Ph5-O4 | 6% |
| 3-P h-Ph5-O2 | 6% | 3-Ph-Ph5-O2 | 6% | 3-Ph-Ph5-O2 | 6% |
| 2-Cy-Ph-Ph5-O2 | 8% | 2-Cy-Ph-Ph5-O2 | 8% | 2-Cy-Ph-Ph5-O2 | 8% |
| 3-Cy-Ph-Ph5-O2 | 8% | 3-Cy-Ph-Ph5-O2 | 8% | 3-Cy-Ph-Ph5-O2 | 8% |
| 3-Cy-Cy-Ph5-O3 | 7% | 3-Cy-Cy-Ph5-O3 | 7% | 3-Cy-Cy-Ph5-O3 | 7% |
| 4-Cy-Cy-Ph5-O2 | 9% | 4-Cy-Cy-Ph5-O2 | 9% | 4-Cy-Cy-Ph5-O2 | 9% |
| 5-Cy-Cy-Ph5-O2 | 7% | 5-Cy-Cy-Ph5-O2 | 7% | 5-Cy-Cy-Ph5-O2 | 7% |
| 3-Ph-Ph5-Ph-2 | 4% | 3-Ph-Ph5-Ph-2 | 4% | 3-Ph-Ph5-Ph-2 | 4% |
| 4-Ph-Ph5-Ph-2 | 4% | 4-Ph-Ph5-Ph-2 | 4% | 4-Ph-Ph5-Ph-2 | 4% |
| 5-Ph-Ph-1 | 6% | 5-Ph-Ph-1 | 3% | 3-Cy-Cy-Ph-1 | 3% |

TABLE 23

|  | Example 37 | Example 38 | Example 39 | Example 40 |
|---|---|---|---|---|
| Liquid crystal composition | Liquid crystal composition 10 | Liquid crystal composition 10 | Liquid crystal composition 10 | Liquid crystal composition 10 |
| Color filter | Color filter 1 | Color filter 2 | Color filter 3 | Color filter 4 |
| VHR | 99.5 | 99.3 | 99.1 | 98.9 |
| ID | 21 | 37 | 64 | 90 |
| Screen burn-in | Excellent | Excellent | Excellent | Good |

TABLE 24

|  | Example 41 | Example 42 | Example 43 | Example 44 |
|---|---|---|---|---|
| Liquid crystal composition | Liquid crystal composition 11 | Liquid crystal composition 11 | Liquid crystal composition 11 | Liquid crystal composition 11 |
| Color filter | Color filter 1 | Color filter 2 | Color filter 3 | Color filter 4 |
| VHR | 99.7 | 99.5 | 99.3 | 99.2 |
| ID | 18 | 25 | 47 | 77 |
| Screen burn-in | Excellent | Excellent | Excellent | Excellent |

TABLE 25

|  | Example 45 | Example 46 | Example 47 | Example 48 |
|---|---|---|---|---|
| Liquid crystal composition | Liquid crystal composition 12 | Liquid crystal composition 12 | Liquid crystal composition 12 | Liquid crystal composition 12 |
| Color filter | Color filter 1 | Color filter 2 | Color filter 3 | Color filter 4 |
| VHR | 99.8 | 99.4 | 99.2 | 99.1 |
| ID | 12 | 31 | 60 | 79 |
| Screen burn-in | Excellent | Excellent | Excellent | Good |

Each of the liquid crystal display devices of Examples 37 to 48 had high VHR and small ID. In the evaluation of screen burn-in, no afterimage was observed, or, if any, a very minor afterimage was observed but acceptable.

Examples 49 to 60

As in Example 1, liquid crystal compositions shown in Table 26 were placed, the color filters shown in Table 8 were used to produce liquid crystal display devices of Examples 49 to 60, and the VHR and ID thereof were measured. The screen burn-in of each liquid crystal display device was evaluated. Tables 27 to 29 show results of the measurement and evaluation.

TABLE 26

| Liquid crystal composition 13 | | Liquid crystal composition 14 | | Liquid crystal composition 15 | |
|---|---|---|---|---|---|
| $T_{NI}$ / °C | 71.9 | $T_{NI}$ / °C | 78.8 | $T_{NI}$ / °C | 73.8 |
| $\Delta n$ | 0.116 | $\Delta n$ | 0.113 | $\Delta n$ | 0.113 |
| $\Delta \epsilon$ | -3.6 | $\Delta \epsilon$ | -3.5 | $\Delta \epsilon$ | -3.9 |
| $\eta$ / mPa·s | 21.2 | $\eta$ / mPa·s | 21.1 | $\eta$ / mPa·s | 21.8 |
| $\gamma_1$ / mPa·s | 123 | $\gamma_1$ / mPa·s | 122 | $\gamma_1$ / mPa·s | 123 |
| $\gamma_1 / \Delta n^2 \times 10^{-2}$ | 92 | $\gamma_1 / \Delta n^2 \times 10^{-2}$ | 95 | $\gamma_1 / \Delta n^2 \times 10^{-2}$ | 97 |
| 3-Cy-Cy-2 | 24% | 3-Cy-Cy-2 | 23% | 3-Cy-Cy-2 | 16% |
| 3-Cy-Ph-O1 | 7% | 3-Cy-Cy-4 | 5% | 3-Cy-Cy-4 | 9% |
| 2-Cy-Ph5-O2 | 6% | 3-Cy-Ph-O1 | 3% | 3-Cy-Ph-O1 | 6% |
| 3-Cy-Ph5-O4 | 6% | 2-Cy-Ph5-O2 | 5% | 2-Cy-Ph5-O2 | 6% |
| 3-Ph-Ph5-O2 | 5% | 3-Cy-Ph5-O4 | 5% | 3-Cy-Ph5-O4 | 6% |
| 5-Ph-Ph5-O2 | 5% | 3-Ph-Ph5-O2 | 5% | 3-Ph-Ph5-O2 | 6% |
| 2-Cy-Ph-Ph5-O2 | 7% | 5-Ph-Ph5-O2 | 5% | 5-Ph-Ph5-O2 | 6% |
| 3-Cy-Ph-Ph5-O2 | 9% | 2-Cy-Ph-Ph5-O2 | 7% | 2-Cy-Ph-Ph5-O2 | 5% |
| 3-Cy-Cy-Ph5-O3 | 5% | 3-Cy-Ph-Ph5-O2 | 7% | 3-Cy-Ph-Ph5-O2 | 7% |
| 4-Cy-Cy-Ph5-O2 | 5% | 3-Cy-Cy-Ph5-O3 | 5% | 3-Cy-Cy-Ph5-O3 | 5% |
| 5-Cy-Cy-Ph5-O2 | 4% | 4-Cy-Cy-Ph5-O2 | 6% | 4-Cy-Cy-Ph5-O2 | 6% |
| 3-Ph-Ph5-Ph-2 | 5% | 5-Cy-Cy-Ph5-O2 | 5% | 5-Cy-Cy-Ph5-O2 | 6% |
| 4-Ph-Ph5-Ph-2 | 6% | 3-Ph-Ph5-Ph-2 | 5% | 3-Ph-Ph5-Ph-2 | 5% |
| 3-Cy-Cy-Ph-1 | 6% | 4-Ph-Ph5-Ph-2 | 6% | 4-Ph-Ph5-Ph-2 | 5% |
|  |  | 3-Cy-Cy-Ph-1 | 8% | 3-Cy-Cy-Ph-1 | 6% |

TABLE 27

|  | Example 49 | Example 50 | Example 51 | Example 52 |
|---|---|---|---|---|
| Liquid crystal composition | Liquid crystal composition 13 | Liquid crystal composition 13 | Liquid crystal composition 13 | Liquid crystal composition 13 |
| Color filter | Color filter 1 | Color filter 2 | Color filter 3 | Color filter 4 |
| VHR | 99.6 | 99.4 | 99.2 | 99.1 |
| ID | 21 | 33 | 59 | 78 |
| Screen burn-in | Excellent | Excellent | Excellent | Good |

TABLE 28

|  | Example 53 | Example 54 | Example 55 | Example 56 |
|---|---|---|---|---|
| Liquid crystal composition | Liquid crystal composition 14 | Liquid crystal composition 14 | Liquid crystal composition 14 | Liquid crystal composition 14 |
| Color filter | Color filter 1 | Color filter 2 | Color filter 3 | Color filter 4 |
| VHR | 99.5 | 99.3 | 99.2 | 89.1 |
| ID | 22 | 41 | 64 | 96 |
| Screen burn-in | Excellent | Excellent | Good | Good |

TABLE 29

|  | Example 57 | Example 58 | Example 59 | Example 60 |
|---|---|---|---|---|
| Liquid crystal composition | Liquid crystal composition 15 | Liquid crystal composition 15 | Liquid crystal composition 15 | Liquid crystal composition 15 |
| Color filter | Color filter 1 | Color filter 2 | Color filter 3 | Color filter 4 |
| VHR | 99.4 | 99.3 | 99.2 | 99.0 |
| ID | 28 | 44 | 65 | 90 |
| Screen burn-in | Excellent | Excellent | Excellent | Good |

Each of the liquid crystal display devices of Examples 49 to 60 had high VHR and small ID. In the evaluation of screen burn-in, no afterimage was observed, or, if any, a very minor afterimage was observed but acceptable.

Example 61 to 72

As in Example 1, liquid crystal compositions shown in Table 30 were placed, the color filters shown in Table 8 were used to produce liquid crystal display devices of Examples 61 to 72, and the VHR and ID thereof were measured. The screen burn-in of each liquid crystal display device was evaluated. Tables 31 to 33 show results of the measurement and evaluation.

TABLE 30

| Liquid crystal composition 16 | | Liquid crystal composition 17 | | Liquid crystal composition 18 | |
|---|---|---|---|---|---|
| $T_{NI}$ / °C | 75.9 | $T_{NI}$ / °C | 82.3 | $T_{NI}$ / °C | 85.7 |
| $\Delta n$ | 0.112 | $\Delta n$ | 0.111 | $\Delta n$ | 0.112 |
| $\Delta \epsilon$ | -2.8 | $\Delta \epsilon$ | -2.7 | $\Delta \epsilon$ | -2.8 |
| $\eta$ / mPa·s | 19.8 | $\eta$ / mPa·s | 19.2 | $\eta$ / mPa·s | 20.1 |
| $\gamma_1$ / mPa·s | 121 | $\gamma_1$ / mPa·s | 114 | $\gamma_1$ / mPa·s | 119 |
| $\gamma_1 / \Delta n^2 \times 10^{-2}$ | 96 | $\gamma_1 / \Delta n^2 \times 10^{-2}$ | 94 | $\gamma_1 / \Delta n^2 \times 10^{-2}$ | 95 |
| 3-Cy-Cy-2 | 19% | 3-Cy-Cy-2 | 21% | 3-Cy-Cy-2 | 19% |
| 3-Cy-Cy-4 | 12% | 3-Cy-Cy-4 | 12% | 3-Cy-Cy-4 | 12% |
| 3-Cy-Cy-5 | 5% | 3-Cy-Cy-5 | 5% | 3-Cy-Cy-5 | 4% |
| 3-Cy-Ph-O1 | 5% | 2-Cy-Ph5-O2 | 4% | 2-Cy-Ph5-O2 | 4% |
| 2-Cy-Ph5-O2 | 4% | 3-Cy-Ph5-O4 | 4% | 3-Cy-Ph5-O4 | 4% |
| 3-Cy-Ph5-O4 | 4% | 3-Ph-Ph5-O2 | 3% | 3-Ph-Ph5-O2 | 3% |
| 3-Ph-Ph5-O2 | 3% | 5-Ph-Ph5-O2 | 4% | 5-Ph-Ph5-O2 | 4% |
| 5-Ph-Ph5-O2 | 4% | 2-Cy-Ph-Ph5-O2 | 6% | 2-Cy-Ph-Ph5-O2 | 6% |
| 2-Cy-Ph-Ph5-O2 | 6% | 3-Cy-Ph-Ph5-O2 | 6% | 3-Cy-Ph-Ph5-O2 | 6% |
| 3-Cy-Ph-Ph5-O2 | 6% | 3-Cy-Cy-Ph5-O3 | 5% | 3-Cy-Cy-Ph5-O3 | 5% |
| 3-Cy-Cy-Ph5-O3 | 5% | 4-Cy-Cy-Ph5-O2 | 5% | 4-Cy-Cy-Ph5-O2 | 5% |
| 4-Cy-Cy-Ph5-O2 | 5% | 5-Cy-Cy-Ph5-O2 | 4% | 5-Cy-Cy-Ph5-O2 | 4% |
| 5-Cy-Cy-Ph5-O2 | 5% | 3-Ph-Ph5-Ph-2 | 7% | 3-Ph-Ph5-Ph-2 | 7% |
| 3-Ph-Ph5-Ph-2 | 8% | 4-Ph-Ph5-Ph-2 | 8% | 4-Ph-Ph5-Ph-2 | 8% |
| 4-Ph-Ph5-Ph-2 | 9% | 3-Cy-Cy-Ph-1 | 6% | 3-Cy-Cy-Ph-1 | 9% |

TABLE 31

|  | Example 61 | Example 62 | Example 63 | Example 64 |
|---|---|---|---|---|
| Liquid crystal composition | Liquid crystal composition 16 | Liquid crystal composition 16 | Liquid crystal composition 16 | Liquid crystal composition 16 |
| Color filter | Color filter 1 | Color filter 2 | Color filter 3 | Color filter 4 |
| VHR | 99.5 | 99.3 | 99.2 | 99.0 |
| ID | 30 | 51 | 68 | 88 |
| Screen burn-in | Excellent | Excellent | Excellent | Good |

TABLE 32

|  | Example 65 | Example 66 | Example 67 | Example 68 |
|---|---|---|---|---|
| Liquid crystal composition | Liquid crystal composition 17 | Liquid crystal composition 17 | Liquid crystal composition 17 | Liquid crystal composition 17 |
| Color filter | Color filter 1 | Color filter 2 | Color filter 3 | Color filter 4 |
| VHR | 99.4 | 99.3 | 99.1 | 98.9 |
| ID | 32 | 46 | 83 | 101 |
| Screen burn-in | Excellent | Excellent | Good | Good |

TABLE 33

|  | Example 69 | Example 70 | Example 71 | Example 72 |
|---|---|---|---|---|
| Liquid crystal composition | Liquid crystal composition 18 | Liquid crystal composition 18 | Liquid crystal composition 18 | Liquid crystal composition 18 |
| Color filter | Color filter 1 | Color filter 2 | Color filter 3 | Color filter 4 |
| VHR | 99.5 | 99.4 | 99.2 | 99.0 |
| ID | 24 | 32 | 65 | 86 |
| Screen burn-in | Excellent | Excellent | Excellent | Good |

Each of the liquid crystal display devices of Examples 61 to 72 had high VHR and small ID. In the evaluation of screen burn-in, no afterimage was observed, or, if any, a very minor afterimage was observed but acceptable.

Examples 73 to 84

As in Example 1, liquid crystal compositions shown in Table 34 were placed, the color filters shown in Table 8 were used to produce liquid crystal display devices of Examples 73 to 84, and the VHR and ID thereof were measured. The screen burn-in of each liquid crystal display device was evaluated. Tables 35 to 37 show results of the measurement and evaluation.

TABLE 34

| Liquid crystal composition 19 | |
|---|---|
| $T_{Ni}/°C$ | 77.1 |
| $\Delta n$ | 0.104 |
| $\Delta\epsilon$ | −3.5 |
| $\eta/mPa \cdot s$ | 25.1 |
| $\gamma_1/mPa \cdot s$ | 141 |
| $\gamma_1/\Delta n^2 \times 10^{-2}$ | 131 |
| 3-Cy—Cy—2 | 22% |
| 3-Cy—Ph—O1 | 14% |
| 2-Cy—Ph5—O2 | 7% |
| 3-Cy—Ph5—O4 | 8% |
| 2-Cy—Ph—Ph5—O2 | 7% |
| 3-Cy—Ph—Ph5—O2 | 9% |
| 3-Cy—Cy—Ph5—O3 | 8% |
| 4-Cy—Cy—Ph5—O2 | 8% |
| 5-Cy—Cy—Ph5—O2 | 8% |
| 3-Ph—Ph5—Ph—2 | 5% |
| 4-Ph—Ph5—Ph—2 | 4% |

| Liquid crystal composition 20 | |
|---|---|
| $T_{Ni}/°C$ | 82.7 |
| $\Delta n$ | 0.107 |
| $\Delta\epsilon$ | −3.0 |
| $\eta/mPa \cdot s$ | 24.2 |
| $\gamma_1/mPa \cdot s$ | 141 |
| $\gamma_1/\Delta n^2 \times 10^{-2}$ | 123 |
| 3-Cy—Cy—2 | 24% |
| 3-Cy—Cy—4 | 5% |
| 3-Cy—Ph—O1 | 6% |
| 2-Cy—Ph5—O2 | 5% |
| 3-Cy—Ph5—O4 | 5% |
| 2-Cy—Ph—Ph5—O2 | 7% |
| 3-Cy—Ph—Ph5—O2 | 9% |
| 3-Cy—Cy—Ph5—O3 | 8% |
| 4-Cy—Cy—Ph5—O2 | 8% |
| 5-Cy—Cy—Ph5—O2 | 8% |
| 3-Ph—Ph5—Ph—2 | 5% |
| 4-Ph—Ph5—Ph—2 | 5% |
| 5-Ph—Ph—1 | 5% |

| Liquid crystal composition 21 | |
|---|---|
| $T_{Ni}/°C$ | 86.4 |
| $\Delta n$ | 0.106 |
| $\Delta\epsilon$ | −3.0 |
| $\eta/mPa \cdot s$ | 24.4 |
| $\gamma_1/mPa \cdot s$ | 142 |
| $\gamma_1/\Delta n^2 \times 10^{-2}$ | 126 |
| 3-Cy—Cy—2 | 24% |
| 3-Cy—Cy—4 | 5% |
| 3-Cy—Ph—O1 | 6% |
| 2-Cy—Ph5—O2 | 5% |
| 3-Cy—Ph5—O4 | 5% |
| 2-Cy—Ph—Ph5—O2 | 7% |
| 3-Cy—Ph—Ph5—O2 | 9% |
| 3-Cy—Cy—Ph5—O3 | 8% |
| 4-Cy—Cy—Ph5—O2 | 8% |
| 5-Cy—Cy—Ph5—O2 | 8% |
| 3-Ph—Ph5—Ph—2 | 5% |
| 4-Ph—Ph5—Ph—2 | 5% |
| 5-Ph—Ph—1 | 3% |
| 3-Cy—Cy—Ph—1 | 2% |

TABLE 35

|  | Example 73 | Example 74 | Example 75 | Example 76 |
|---|---|---|---|---|
| Liquid crystal composition | Liquid crystal composition 19 | Liquid crystal composition 19 | Liquid crystal composition 19 | Liquid crystal composition 19 |
| Color filter | Color filter 1 | Color filter 2 | Color filter 3 | Color filter 4 |
| VHR | 99.6 | 99.4 | 99.3 | 99.1 |
| ID | 19 | 36 | 48 | 81 |
| Screen burn-in | Excellent | Excellent | Excellent | Good |

TABLE 36

|  | Example 77 | Example 78 | Example 79 | Example 80 |
|---|---|---|---|---|
| Liquid crystal composition | Liquid crystal composition 20 | Liquid crystal composition 20 | Liquid crystal composition 20 | Liquid crystal composition 20 |
| Color filter | Color filter 1 | Color filter 2 | Color filter 3 | Color filter 4 |
| VHR | 99.7 | 99.5 | 99.4 | 99.2 |
| ID | 16 | 29 | 36 | 70 |
| Screen burn-in | Excellent | Excellent | Excellent | Excellent |

TABLE 37

|  | Example 81 | Example 82 | Example 83 | Example 84 |
|---|---|---|---|---|
| Liquid crystal composition | Liquid crystal composition 21 | Liquid crystal composition 21 | Liquid crystal composition 21 | Liquid crystal composition 21 |
| Color filter | Color filter 1 | Color filter 2 | Color filter 3 | Color filter 4 |
| VHR | 99.5 | 99.4 | 99.3 | 98.9 |
| ID | 26 | 38 | 65 | 92 |
| Screen burn-in | Excellent | Excellent | Excellent | Good |

Each of the liquid crystal display devices of Examples 73 to 84 had high VHR and small ID. In the evaluation of screen burn-in, no afterimage was observed, or, if any, a very minor afterimage was observed but acceptable.

Examples 85 to 96

As in Example 1, liquid crystal compositions shown in Table 38 were placed, the color filters shown in Table 8 were used to produce liquid crystal display devices of Examples 85 to 96, and the VHR and ID thereof were measured. The screen burn-in of each liquid crystal display device was evaluated. Tables 39 to 41 show results of the measurement and evaluation.

TABLE 38

| Liquid crystal composition 22 | |
|---|---|
| $T_{Ni}/°C$ | 75.5 |
| $\Delta n$ | 0.102 |
| $\Delta \epsilon$ | -2.8 |
| $\eta/mPa \cdot s$ | 22.2 |
| $\gamma_1/mPa \cdot s$ | 121 |
| $\gamma_1/\Delta n^2 \times 10^{-2}$ | 117 |
| 3-Cy—Cy—2 | 14% |
| 3-Cy—Cy—4 | 12% |
| 3-Cy—Cy—5 | 5% |
| 3-Cy—Ph—O1 | 7% |
| 2-Cy—Ph5—O2 | 7% |
| 3-Cy—Ph5—O4 | 7% |
| 2-Cy—Ph—Ph5—O2 | 8% |
| 3-Cy—Ph—Ph5—O2 | 8% |
| 3-Cy—Cy—Ph5—O3 | 6% |
| 4-Cy—Cy—Ph5—O2 | 7% |
| 5-Cy—Cy—Ph5—O2 | 6% |
| 3-Ph—Ph5—Ph—2 | 3% |
| 4-Ph—Ph5—Ph—2 | 3% |
| 5-Ph—Ph—1 | 6% |
| 3-Cy—Cy—Ph—1 | 1% |
| Liquid crystal composition 23 | |
| $T_{Ni}/°C$ | 80.3 |
| $\Delta n$ | 0.101 |
| $\Delta \epsilon$ | -2.9 |
| $\eta/mPa \cdot s$ | 22.0 |
| $\gamma_1/mPa \cdot s$ | 118 |
| $\gamma_1/\Delta n^2 \times 10^{-2}$ | 117 |

TABLE 38-continued

| | |
|---|---|
| 3-Cy—Cy—2 | 17% |
| 3-Cy—Cy—4 | 12% |
| 3-Cy—Cy—5 | 5% |
| 3-Cy—Ph—O1 | 6% |
| 2-Cy—Ph5—O2 | 12% |
| 2-Cy—Ph—Ph5—O2 | 9% |
| 3-Cy—Ph—Ph5—O2 | 9% |
| 3-Cy—Cy—Ph5—O3 | 6% |
| 4-Cy—Cy—Ph5—O2 | 8% |
| 5-Cy—Cy—Ph5—O2 | 6% |
| 3-Ph—Ph5—Ph—2 | 3% |
| 4-Ph—Ph5—Ph—2 | 3% |
| 5-Ph—Ph—1 | 4% |
| Liquid crystal composition 24 | |
| $T_{Ni}/°C$ | 85.0 |
| $\Delta n$ | 0.102 |
| $\Delta \epsilon$ | -3.0 |
| $\eta/mPa \cdot s$ | 22.7 |
| $\gamma_1/mPa \cdot s$ | 122 |
| $\gamma_1/\Delta n^2 \times 10^{-2}$ | 118 |
| 3-Cy—Cy—2 | 16% |
| 3-Cy—Cy—4 | 12% |
| 3-Cy—Cy—5 | 5% |
| 3-Cy—Ph—O1 | 5% |
| 2-Cy—Ph5—O2 | 12% |
| 2-Cy—Ph—Ph5—O2 | 9% |
| 3-Cy—Ph—Ph5—O2 | 9% |
| 3-Cy—Cy—Ph5—O3 | 6% |
| 4-Cy—Cy—Ph5—O2 | 8% |
| 5-Cy—Cy—Ph5—O2 | 6% |
| 3-Ph—Ph5—Ph—2 | 3% |
| 4-Ph—Ph5—Ph—2 | 3% |
| 5-Ph—Ph-1 | 3% |
| 3-Cy—Cy—Ph—1 | 3% |

TABLE 39

|  | Example 85 | Example 86 | Example 87 | Example 88 |
|---|---|---|---|---|
| Liquid crystal composition | Liquid crystal composition 22 | Liquid crystal composition 22 | Liquid crystal composition 22 | Liquid crystal composition 22 |
| Color filter | Color filter 1 | Color filter 2 | Color filter 3 | Color filter 4 |
| VHR | 99.5 | 99.3 | 99.2 | 99.0 |
| ID | 27 | 49 | 65 | 87 |
| Screen burn-in | Excellent | Excellent | Excellent | Good |

TABLE 40

|  | Example 89 | Example 90 | Example 91 | Example 92 |
|---|---|---|---|---|
| Liquid crystal composition | Liquid crystal composition 23 | Liquid crystal composition 23 | Liquid crystal composition 23 | Liquid crystal composition 23 |
| Color filter | Color filter 1 | Color filter 2 | Color filter 3 | Color filter 4 |
| VHR | 99.5 | 99.3 | 99.2 | 99.1 |
| ID | 34 | 61 | 64 | 83 |
| Screen burn-in | Excellent | Excellent | Good | Good |

TABLE 41

|  | Example 93 | Example 94 | Example 95 | Example 96 |
|---|---|---|---|---|
| Liquid crystal composition | Liquid crystal composition 24 | Liquid crystal composition 24 | Liquid crystal composition 24 | Liquid crystal composition 24 |
| Color filter | Color filter 1 | Color filter 2 | Color filter 3 | Color filter 4 |
| VHR | 99.8 | 99.5 | 99.4 | 99.2 |
| ID | 12 | 32 | 49 | 70 |
| Screen burn-in | Excellent | Excellent | Excellent | Excellent |

Each of the liquid crystal display devices of Examples 85 to 96 had high VHR and small ID. In the evaluation of screen burn-in, no afterimage was observed, or, if any, a very minor afterimage was observed but acceptable.

Examples 97 to 108

As in Example 1, liquid crystal compositions shown in Table 42 were placed, the color filters shown in Table 8 were used to produce liquid crystal display devices of Examples 97 to 108, and the VHR and ID thereof were measured. The screen burn-in of each liquid crystal display device was evaluated. Tables 43 to 45 show results of the measurement and evaluation.

TABLE 42

| Liquid crystal composition 25 | |
|---|---|
| $T_{Ni}/°C$ | 75.6 |
| $\Delta n$ | 0.104 |
| $\Delta \epsilon$ | -2.8 |
| $\eta/mPa \cdot s$ | 20.2 |
| $\gamma_1/mPa \cdot s$ | 117 |
| $\gamma_1/\Delta n^2 \times 10^{-2}$ | 107 |
| 3-Cy—Cy—2 | 25% |
| 3-Cy—Cy—4 | 10% |
| 3-Cy—Ph—O1 | 4% |
| 2-Cy—Ph5—O2 | 7% |
| 3-Cy—Ph5—O4 | 8% |
| 2-Cy—Ph—Ph5—O2 | 5% |
| 3-Cy—Ph—Ph5—O2 | 6% |
| 3-Cy—Cy—Ph5—O3 | 6% |
| 4-Cy—Cy—Ph5—O2 | 7% |
| 5-Cy—Cy—Ph5—O2 | 6% |

TABLE 42-continued

| 3-Ph—Ph5—Ph—2 | 8% |
|---|---|
| 4-Ph—Ph5—Ph—2 | 8% |

| Liquid crystal composition 26 | |
|---|---|
| $T_{Ni}/°C$ | 81.1 |
| $\Delta n$ | 0.105 |
| $\Delta \epsilon$ | -2.8 |
| $\eta/mPa \cdot s$ | 20.8 |
| $\gamma_1/mPa \cdot s$ | 119 |
| $\gamma_1/\Delta n^2 \times 10^{-2}$ | 107 |
| 3-Cy—Cy—2 | 25% |
| 3-Cy—Cy—4 | 10% |
| 3-Cy—Ph—O1 | 4% |
| 2-Cy—Ph5—O2 | 12% |
| 2-Cy—Ph—Ph5—O2 | 5% |
| 3-Cy—Ph—Ph5—O2 | 6% |
| 3-Cy—Cy—Ph5—O3 | 7% |
| 4-Cy—Cy—Ph5—O2 | 8% |
| 5-Cy—Cy—Ph5—O2 | 7% |
| 3-Ph—Ph5—Ph—2 | 8% |
| 4-Ph—Ph5—Ph—2 | 8% |

| Liquid crystal composition 27 | |
|---|---|
| $T_{Ni}/°C$ | 85.7 |
| $\Delta n$ | 0.105 |
| $\Delta \epsilon$ | -2.9 |
| $\eta/mPa \cdot s$ | 21.0 |
| $\gamma_1/mPa \cdot s$ | 92 |
| $\gamma_1/\Delta n^2 \times 10^{-2}$ | 82 |
| 3-Cy—Cy—2 | 25% |
| 3-Cy—Cy—4 | 12% |
| 2-Cy—Ph5—O2 | 12% |
| 2-Cy—Ph—Ph5—O2 | 5% |
| 3-Cy—Ph—Ph5—O2 | 6% |
| 3-Cy—Cy—Ph5—O3 | 7% |
| 4-Cy—Cy—Ph5—O2 | 8% |
| 5-Cy—Cy—Ph5—O2 | 7% |
| 3-Ph—Ph5—Ph—2 | 8% |
| 4-Ph—Ph5—Ph—2 | 8% |
| 3-Cy—Cy—Ph—1 | 2% |

TABLE 43

|  | Example 97 | Example 98 | Example 99 | Example 100 |
| --- | --- | --- | --- | --- |
| Liquid crystal composition | Liquid crystal composition 25 | Liquid crystal composition 25 | Liquid crystal composition 25 | Liquid crystal composition 25 |
| Color filter | Color filter 1 | Color filter 2 | Color filter 3 | Color filter 4 |
| VHR | 99.8 | 99.6 | 99.3 | 99.2 |
| ID | 14 | 22 | 52 | 74 |
| Screen burn-in | Excellent | Excellent | Excellent | Good |

TABLE 44

|  | Example 101 | Example 102 | Example 103 | Example 104 |
| --- | --- | --- | --- | --- |
| Liquid crystal composition | Liquid crystal composition 26 | Liquid crystal composition 26 | Liquid crystal composition 26 | Liquid crystal composition 26 |
| Color filter | Color filter 1 | Color filter 2 | Color filter 3 | Color filter 4 |
| VHR | 99.6 | 99.4 | 99.3 | 99.2 |
| ID | 19 | 33 | 52 | 69 |
| Screen burn-in | Excellent | Excellent | Excellent | Excellent |

TABLE 45

|  | Example 105 | Example 106 | Example 107 | Example 108 |
| --- | --- | --- | --- | --- |
| Liquid crystal composition | Liquid crystal composition 27 | Liquid crystal composition 27 | Liquid crystal composition 27 | Liquid crystal composition 27 |
| Color filter | Color filter 1 | Color filter 2 | Color filter 3 | Color filter 4 |
| VHR | 99.6 | 99.4 | 99.2 | 99.0 |
| ID | 21 | 40 | 61 | 82 |
| Screen burn-in | Excellent | Excellent | Excellent | Good |

Each of the liquid crystal display devices of Examples 97 to 108 had high VHR and small ID. In the evaluation of screen burn-in, no afterimage was observed, or, if any, a very minor afterimage was observed but acceptable.

Examples 109 to 112

The liquid crystal composition 1 was mixed with 0.3 mass % of 2-methyl-acrylic acid 4-{2-[4-(2-acryloyloxy-ethyl)-phenoxycarbonyl]-ethyl}-biphenyl-4'-yl ester to produce a liquid crystal composition 28. The liquid crystal composition 28 was placed in the VA cell used in Example 1 and then polymerized by being irradiated with ultraviolet for 600 seconds (3.0 J/cm$^2$) while a driving voltage was applied between the electrodes. Then, the color filters 1 to 4 shown in Table 8 were used to produce liquid crystal display devices of Examples 109 to 112, and the VHR and ID thereof were measured. The screen burn-in of each liquid crystal display device was evaluated. Table 46 shows results of the measurement and evaluation.

TABLE 46

|  | Example 109 | Example 110 | Example 111 | Example 112 |
| --- | --- | --- | --- | --- |
| Liquid crystal composition | Liquid crystal composition 28 | Liquid crystal composition 28 | Liquid crystal composition 28 | Liquid crystal composition 28 |
| Color filter | Color filter 1 | Color filter 2 | Color filter 3 | Color filter 4 |
| VHR | 99.4 | 99.3 | 99.1 | 98.9 |
| ID | 30 | 54 | 79 | 93 |
| Screen burn-in | Excellent | Excellent | Good | Good |

Each of the liquid crystal display devices of Examples 109 to 112 had high VHR and small ID. In the evaluation of screen burn-in, no afterimage was observed, or, if any, a very minor afterimage was observed but acceptable.

Examples 113 to 116

The liquid crystal composition 13 was mixed with 0.3 mass % of bismethacrylic acid biphenyl-4,4'-diyl ester to produce a liquid crystal composition 29. The liquid crystal composition 29 was placed in the VA cell used in Example 1 and then polymerized by being irradiated with ultraviolet for 600 seconds (3.0 J/cm$^2$) while a driving voltage was applied between the electrodes. Then, the color filters 1 to 4 shown in Table 8 were used to produce liquid crystal display devices of Examples 113 to 116, and the VHR and ID thereof were measured. The screen burn-in of each liquid crystal display device was evaluated. Table 47 shows results of the measurement and evaluation.

TABLE 47

|  | Example 113 | Example 114 | Example 115 | Example 116 |
| --- | --- | --- | --- | --- |
| Liquid crystal composition | Liquid crystal composition 29 | Liquid crystal composition 29 | Liquid crystal composition 29 | Liquid crystal composition 29 |
| Color filter | Color filter 1 | Color filter 2 | Color filter 3 | Color filter 4 |
| VHR | 99.5 | 99.3 | 99.1 | 99.0 |
| ID | 28 | 53 | 72 | 88 |
| Screen burn-in | Excellent | Excellent | Good | Good |

Each of the liquid crystal display devices of Examples 113 to 116 had high VHR and small ID. In the evaluation of screen burn-in, no afterimage was observed, or, if any, a very minor afterimage was observed but acceptable.

Examples 117 to 120

The liquid crystal composition 19 was mixed with 0.3 mass % of bismethacrylic acid 3-fluorobiphenyl-4,4'-diyl ester to produce a liquid crystal composition 30. The liquid crystal composition 30 was placed in the VA cell used in Example 1 and then polymerized by being irradiated with ultraviolet for 600 seconds (3.0 J/cm$^2$) while a driving voltage was applied between the electrodes. Then, the color filters 1 to 4 shown in Table 8 were used to produce liquid crystal display devices of Examples 117 to 120, and the VHR and ID thereof were measured. The screen burn-in of each liquid crystal display device was evaluated. Table 48 shows results of the measurement and evaluation.

TABLE 48

|  | Example 117 | Example 118 | Example 119 | Example 120 |
| --- | --- | --- | --- | --- |
| Liquid crystal composition | Liquid crystal composition 30 | Liquid crystal composition 30 | Liquid crystal composition 30 | Liquid crystal composition 30 |
| Color filter | Color filter 1 | Color filter 2 | Color filter 3 | Color filter 4 |
| VHR | 99.5 | 99.3 | 99.1 | 99.0 |
| ID | 22 | 48 | 68 | 92 |
| Screen burn-in | Excellent | Excellent | Excellent | Good |

Each of the liquid crystal display devices of Examples 117 to 120 had high VHR and small ID. In the evaluation of screen burn-in, no afterimage was observed, or, if any, a very minor afterimage was observed but acceptable.

Comparative Examples 1 to 12

As in Example 1, comparative liquid crystal compositions shown in Table 49 were placed, the color filters 1 to 4 shown in Table 8 were used to produce liquid crystal display devices of Comparative Examples 1 to 12, and the VHR and ID thereof were measured. The screen burn-in of each liquid crystal display device was evaluated. Tables 50 to 52 show results of the measurement and evaluation.

TABLE 49

| Comparative liquid crystal composition 1 | |
|---|---|
| $T_{Ni}/°C$ | 75.5 |
| Δn | 0.104 |
| Δε | −2.88 |
| η/mPa·s | 22.5 |
| $γ_1$/mPa·s | 123 |
| $γ_1/Δn^2 × 10^{-2}$ | 114 |
| 3-Cy—Cy-2 | 24% |
| 3-Cy—Cy-4 | 4% |
| 3-Cy—Ph5—O2 | 7% |
| 3-Cy—Ph5—O4 | 8% |
| 2-Cy—Ph—Ph5—O2 | 4% |
| 3-Cy—Ph—Ph5—O2 | 5% |
| 3-Cy—Cy—Ph5—O3 | 8% |
| 4-Cy—Cy—Ph5—O2 | 10% |
| 5-Cy—Cy—Ph5—O2 | 8% |
| 3-Ph—Ph5—Ph-2 | 4% |
| 4-Ph—Ph5—Ph-2 | 4% |
| 5-Ph—Ph-1 | 10% |
| 3-Cy—Cy—Ph-1 | 4% |

| Comparative liquid crystal composition 2 | |
|---|---|
| $T_{Ni}/°C$ | 80.7 |
| Δn | 0.104 |
| Δε | −2.88 |
| η/mPa·s | 22.3 |
| $γ_1$/mPa·s | 122 |
| $γ_1/Δn^2 × 10^{-2}$ | 113 |
| 3-Cy—Cy-2 | 24% |
| 3-Cy—Cy-4 | 4% |
| 3-Cy—Ph5—O2 | 7% |
| 3-Cy—Ph5—O4 | 8% |
| 2-Cy—Ph—Ph5—O2 | 5% |
| 3-Cy—Ph—Ph5—O2 | 6% |
| 3-Cy—Cy—Ph5—O3 | 7% |
| 4-Cy—Cy—Ph5—O2 | 9% |
| 5-Cy—Cy—Ph5—O2 | 7% |
| 3-Ph—Ph5—Ph-2 | 4% |
| 4-Ph—Ph5—Ph-2 | 4% |
| 5-Ph—Ph-1 | 7% |
| 3-Cy—Cy—Ph-1 | 8% |

| Comparative liquid crystal composition 3 | |
|---|---|
| $T_{Ni}/°C$ | 85.8 |
| Δn | 0.104 |
| Δε | −2.95 |
| η/mPa·s | 22.4 |
| $γ_1$/mPa·s | 124 |
| $γ_1/Δn^2 × 10^{-2}$ | 114 |
| 3-Cy—Cy-2 | 24% |
| 3-Cy—Cy-4 | 4% |
| 3-Cy—Ph5—O2 | 7% |
| 3-Cy—Ph5—O4 | 8% |
| 2-Cy—Ph—Ph5—O2 | 6% |
| 3-Cy—Ph—Ph5—O2 | 7% |

TABLE 49-continued

| | |
|---|---|
| 3-Cy—Cy—Ph5—O3 | 7% |
| 4-Cy—Cy—Ph5—O2 | 7% |
| 5-Cy—Cy—Ph5—O2 | 7% |
| 3-Ph—Ph5—Ph-2 | 4% |
| 4-Ph—Ph5—Ph-2 | 4% |
| 5-Ph—Ph-1 | 4% |
| 3-Cy—Cy—Ph-1 | 11% |

TABLE 50

| | Comparative Example 1 | Comparative Example 2 | Comparative Example 3 | Comparative Example 4 |
|---|---|---|---|---|
| Liquid crystal composition | Comparative liquid crystal composition 1 | Comparative liquid crystal composition 1 | Comparative liquid crystal composition 1 | Comparative liquid crystal composition 1 |
| Color filter | Color filter 1 | Color filter 2 | Color filter 3 | Color filter 4 |
| VHR | 98.3 | 98.1 | 98.0 | 97.8 |
| ID | 144 | 165 | 171 | 186 |
| Screen burn-in | Poor | Poor | Poor | Poor |

TABLE 51

| | Comparative Example 5 | Comparative Example 6 | Comparative Example 7 | Comparative Example 8 |
|---|---|---|---|---|
| Liquid crystal composition | Comparative liquid crystal composition 2 | Comparative liquid crystal composition 2 | Comparative liquid crystal composition 2 | Comparative liquid crystal composition 2 |
| Color filter | Color filter 1 | Color filter 2 | Color filter 3 | Color filter 4 |
| VHR | 98.4 | 98.3 | 98.2 | 98.0 |
| ID | 132 | 148 | 164 | 179 |
| Screen burn-in | Poor | Poor | Poor | Poor |

TABLE 52

| | Comparative Example 9 | Comparative Example 10 | Comparative Example 11 | Comparative Example 12 |
|---|---|---|---|---|
| Liquid crystal composition | Comparative liquid crystal composition 3 | Comparative liquid crystal composition 3 | Comparative liquid crystal composition 3 | Comparative liquid crystal composition 3 |
| Color filter | Color filter 1 | Color filter 2 | Color filter 3 | Color filter 4 |
| VHR | 98.5 | 98.4 | 98.2 | 98.0 |
| ID | 138 | 147 | 157 | 182 |
| Screen burn-in | Bad | Poor | Poor | Poor |

As compared with the liquid crystal display device of the present invention, each of the liquid crystal display devices of Comparative Examples 1 to 12 had lower VHR and larger ID. In the evaluation of screen burn-in, an afterimage was observed, which was unacceptable.

Comparative Examples 13 to 24

As in Example 1, comparative liquid crystal compositions shown in Table 53 were placed, the color filters 1 to 4 shown in Table 8 were used to produce liquid crystal display devices of Comparative Examples 13 to 24, and the VHR and ID thereof were measured. The screen burn-in of each liquid crystal display device was evaluated. Tables 54 to 56 show results of the measurement and evaluation.

TABLE 53

| Comparative liquid crystal composition 4 | |
|---|---|
| $T_{Ni}/°C$ | 73.6 |
| $\Delta n$ | 0.099 |
| $\Delta \epsilon$ | −2.15 |
| $\eta/mPa \cdot s$ | 17.7 |
| $\gamma_1/mPa \cdot s$ | 104 |
| $\gamma_1/\Delta n^2 \times 10^{-2}$ | 106 |
| 3-Cy—Cy-2 | 20% |
| 3-Cy—Cy-4 | 12% |
| 3-Cy—Cy-5 | 7% |
| 3-Cy—Ph—O1 | 12% |
| 3-Cy—Ph5—O2 | 5% |
| 3-Cy—Ph5—O4 | 5% |
| 2-Cy—Ph—Ph5—O2 | 11% |
| 3-Cy—Ph—Ph5—O2 | 11% |
| 3-Cy—Cy—Ph5—O3 | 3% |
| 4-Cy—Cy—Ph5—O2 | 3% |
| 5-Cy—Cy—Ph5—O2 | 3% |
| 3-Ph—Ph5—Ph-2 | 4% |
| 4-Ph—Ph5—Ph-2 | 4% |

| Comparative liquid crystal composition 5 | |
|---|---|
| $T_{Ni}/°C$ | 80.9 |
| $\Delta n$ | 0.094 |
| $\Delta \epsilon$ | −2.16 |
| $\eta/mPa \cdot s$ | 17.0 |
| $\gamma_1/mPa \cdot s$ | 97 |
| $\gamma_1/\Delta n^2 \times 10^{-2}$ | 109 |
| 3-Cy—Cy-2 | 24% |
| 3-Cy—Cy-4 | 12% |
| 3-Cy—Cy-5 | 15% |
| 3-Cy—Ph5—O2 | 5% |
| 3-Cy—Ph5—O4 | 5% |
| 2-Cy—Ph—Ph5—O2 | 11% |
| 3-Cy—Ph—Ph5—O2 | 11% |
| 3-Cy—Cy—Ph5—O3 | 3% |
| 4-Cy—Cy—Ph5—O2 | 3% |
| 5-Cy—Cy—Ph5—O2 | 3% |
| 3-Ph—Ph5—Ph-2 | 4% |
| 4-Ph—Ph5—Ph-2 | 4% |

| Comparative liquid crystal composition 6 | |
|---|---|
| $T_{Ni}/°C$ | 84.7 |
| $\Delta n$ | 0.085 |
| $\Delta \epsilon$ | −2.13 |
| $\eta/mPa \cdot s$ | 17.5 |
| $\gamma_1/mPa \cdot s$ | 98 |
| $\gamma_1/\Delta n^2 \times 10^{-2}$ | 136 |
| 3-Cy—Cy-2 | 21% |
| 3-Cy—Cy-4 | 15% |
| 3-Cy—Cy-5 | 15% |
| 3-Cy—Ph5—O2 | 5% |
| 3-Cy—Ph5—O4 | 5% |
| 2-Cy—Ph—Ph5—O2 | 4% |
| 3-Cy—Ph—Ph5—O2 | 5% |
| 3-Cy—Cy—Ph5—O3 | 7% |
| 4-Cy—Cy—Ph5—O2 | 8% |
| 5-Cy—Cy—Ph5—O2 | 7% |
| 3-Ph—Ph5—Ph-2 | 4% |
| 4-Ph—Ph5—Ph-2 | 4% |

TABLE 54

| | Comparative Example 13 | Comparative Example 14 | Comparative Example 15 | Comparative Example 16 |
|---|---|---|---|---|
| Liquid crystal composition | Comparative liquid crystal composition 4 | Comparative liquid crystal composition 4 | Comparative liquid crystal composition 4 | Comparative liquid crystal composition 4 |
| Color filter | Color filter 1 | Color filter 2 | Color filter 3 | Color filter 4 |
| VHR | 98.5 | 98.3 | 98.1 | 97.9 |
| ID | 140 | 154 | 169 | 188 |
| Screen burn-in | Poor | Poor | Poor | Poor |

TABLE 55

| | Comparative Example 17 | Comparative Example 18 | Comparative Example 19 | Comparative Example 20 |
|---|---|---|---|---|
| Liquid crystal composition | Comparative liquid crystal composition 5 | Comparative liquid crystal composition 5 | Comparative liquid crystal composition 5 | Comparative liquid crystal composition 5 |
| Color filter | Color filter 1 | Color filter 2 | Color filter 3 | Color filter 4 |
| VHR | 98.5 | 98.4 | 98.3 | 98.1 |
| ID | 135 | 142 | 151 | 168 |
| Screen burn-in | Bad | Poor | Poor | Poor |

TABLE 56

| | Comparative Example 21 | Comparative Example 22 | Comparative Example 23 | Comparative Example 24 |
|---|---|---|---|---|
| Liquid crystal composition | Comparative liquid crystal composition 6 | Comparative liquid crystal composition 6 | Comparative liquid crystal composition 6 | Comparative liquid crystal composition 6 |
| Color filter | Color filter 1 | Color filter 2 | Color filter 3 | Color filter 4 |
| VHR | 98.4 | 98.2 | 98.1 | 98.0 |
| ID | 133 | 149 | 167 | 174 |
| Screen burn-in | Poor | Poor | Poor | Poor |

As compared with the liquid crystal display device of the present invention, each of the liquid crystal display devices of Comparative Examples 13 to 24 had lower VHR and larger ID. In the evaluation of screen burn-in, an afterimage was observed, which was unacceptable.

Comparative Examples 25 to 36

As in Example 1, comparative liquid crystal compositions shown in Table 57 were placed, the color filters 1 to 4 shown in Table 8 were used to produce liquid crystal display devices of Comparative Examples 25 to 36, and the VHR and ID thereof were measured. The screen burn-in of each liquid crystal display device was evaluated. Tables 58 to 60 show results of the measurement and evaluation.

TABLE 57

| Comparative liquid crystal composition 7 | |
|---|---|
| $T_{Ni}/°C$ | 77.1 |
| $\Delta n$ | 0.109 |
| $\Delta \epsilon$ | −2.10 |
| $\eta/mPa \cdot s$ | 21.6 |
| $\gamma_1/mPa \cdot s$ | 130 |
| $\gamma_1/\Delta n^2 \times 10^{-2}$ | 109 |
| 3-Cy—Cy-2 | 24% |
| 3-Cy—Cy-4 | 7% |
| 3-Cy—Ph—O1 | 5% |
| 2-Cy—Ph5—O2 | 2% |

TABLE 57-continued

| | |
|---|---|
| 3-Cy—Ph5—O4 | 2% |
| 2-Cy—Ph—Ph5—O2 | 8% |
| 3-Cy—Ph—Ph5—O2 | 8% |
| 3-Cy—Cy—Ph5—O3 | 7% |
| 4-Cy—Cy—Ph5—O2 | 9% |
| 5-Cy—Cy—Ph5—O2 | 7% |
| 3-Ph—Ph5—Ph2 | 4% |
| 4-Ph—Ph5—Ph-2 | 4% |
| 5-Ph—Ph-1 | 13% |

| Comparative liquid crystal composition 8 | |
|---|---|
| $T_{Ni}/°C.$ | 80.8 |
| $\Delta n$ | 0.108 |
| $\Delta \epsilon$ | -2.20 |
| $\eta/mPa \cdot s$ | 22.1 |
| $\gamma_1/mPa \cdot s$ | 133 |
| $\gamma_1/\Delta n^2 \times 10^{-2}$ | 114 |
| 3-Cy—Cy-2 | 24% |
| 3-Cy—Cy-4 | 7% |
| 3-Cy—Ph—O1 | 5% |
| 2-Cy—Ph5—O2 | 2% |
| 3-Cy—Ph5—O4 | 2% |
| 2-Cy—Ph—Ph5—O2 | 8% |
| 3-Cy—Ph—Ph5—O2 | 8% |
| 3-Cy—Cy—Ph5—O3 | 8% |
| 4-Cy—Cy—Ph5—O2 | 8% |
| 5-Cy—Cy—Ph5—O2 | 8% |
| 3-Ph—Ph5—Ph-2 | 4% |
| 4-Ph—Ph5—Ph-2 | 4% |
| 5-Ph—Ph-1 | 11% |
| 3-Cy—Cy—Ph-1 | 1% |

| Comparative liquid crystal composition 9 | |
|---|---|
| $T_{Ni}/°C.$ | 86.3 |
| $\Delta n$ | 0.107 |
| $\Delta \epsilon$ | -2.27 |
| $\eta/mPa \cdot s$ | 22.3 |
| $\gamma_1/mPa \cdot s$ | 134 |
| $\gamma_1/\Delta n^2 \times 10^{-2}$ | 118 |
| 3-Cy—Cy-2 | 24% |
| 3-Cy—Cy-4 | 7% |
| 3-Cy—Ph—O1 | 5% |
| 2-Cy—Ph5—O2 | 2% |
| 3-Cy—Ph5—O4 | 2% |
| 2-Cy—Ph—Ph5—O2 | 8% |
| 3-Cy—Ph—Ph5—O2 | 8% |
| 3-Cy—Cy—Ph5—O3 | 8% |
| 4-Cy—Cy—Ph5—O2 | 8% |
| 5-Cy—Cy—Ph5—O2 | 8% |
| 3-Ph—Ph5—Ph-2 | 4% |
| 4-Ph—Ph5—Ph-2 | 4% |
| 5-Ph—Ph-1 | 8% |
| 3-Cy—Cy—Ph-1 | 4% |

TABLE 58

| | Comparative Example 25 | Comparative Example 26 | Comparative Example 27 | Comparative Example 28 |
|---|---|---|---|---|
| Liquid crystal composition | Comparative liquid crystal composition 7 | Comparative liquid crystal composition 7 | Comparative liquid crystal composition 7 | Comparative liquid crystal composition 7 |
| Color filter | Color filter 1 | Color filter 2 | Color filter 3 | Color filter 4 |
| VHR | 98.4 | 98.2 | 98.1 | 97.9 |
| ID | 141 | 150 | 172 | 189 |
| Screen burn-in | Poor | Poor | Poor | Poor |

TABLE 59

| | Comparative Example 29 | Comparative Example 30 | Comparative Example 31 | Comparative Example 32 |
|---|---|---|---|---|
| Liquid crystal composition | Comparative liquid crystal composition 8 | Comparative liquid crystal composition 8 | Comparative liquid crystal composition 8 | Comparative liquid crystal composition 8 |
| Color filter | Color filter 1 | Color filter 2 | Color filter 3 | Color filter 4 |
| VHR | 98.5 | 98.4 | 98.2 | 98.0 |
| ID | 132 | 149 | 158 | 179 |
| Screen burn-in | Bad | Poor | Poor | Poor |

TABLE 60

| | Comparative Example 33 | Comparative Example 34 | Comparative Example 35 | Comparative Example 36 |
|---|---|---|---|---|
| Liquid crystal composition | Comparative liquid crystal composition 9 | Comparative liquid crystal composition 9 | Comparative liquid crystal composition 9 | Comparative liquid crystal composition 9 |
| Color filter | Color filter 1 | Color filter 2 | Color filter 3 | Color filter 4 |
| VHR | 98.4 | 98.3 | 98.3 | 98.1 |
| ID | 139 | 154 | 161 | 170 |
| Screen burn-in | Poor | Poor | Poor | Poor |

As compared with the liquid crystal display device of the present invention, each of the liquid crystal display devices of Comparative Examples 25 to 36 had lower VHR and larger ID. In the evaluation of screen burn-in, an afterimage was observed, which was unacceptable.

Comparative Example 37 to 44

As in Example 1, comparative liquid crystal compositions shown in Table 61 were placed, the color filters 1 to 4 shown in Table 8 were used to produce liquid crystal display devices of Comparative Examples 37 to 44, and the VHR and ID thereof were measured. The screen burn-in of each liquid crystal display device was evaluated. Tables 62 and 63 show results of the measurement and evaluation.

TABLE 61

| Comparative liquid crystal composition 10 | |
|---|---|
| $T_{Ni}/°C.$ | 62.2 |
| $\Delta n$ | 0.087 |
| $\Delta \epsilon$ | -4.1 |
| $\eta/mPa \cdot s$ | 21.3 |
| $\gamma_1/mPa \cdot s$ | 97 |
| $\gamma_1/\Delta n^2 \times 10^{-2}$ | 129 |
| 3-Cy—Cy-2 | 12% |
| 3-Cy—Cy-4 | 12% |
| 3-Cy—Cy-5 | 5% |
| 3-Cy—Ph—O1 | 6% |
| 2-Cy—Ph5—O2 | 16% |
| 3-Cy—Ph5—O4 | 16% |
| 2-Cy—Ph—Ph5—O2 | 7% |
| 3-Cy—Ph—Ph5—O2 | 8% |
| 3-Cy—Cy—Ph5—O3 | 5% |
| 4-Cy—Cy—Ph5—O2 | 5% |
| 5-Cy—Cy—Ph5-O2 | 5% |
| 3-Cy—Cy—Ph-1 | 3% |

| Comparative liquid crystal composition 11 | |
|---|---|
| $T_{Ni}/°C.$ | 72.4 |
| $\Delta n$ | 0.088 |

TABLE 61-continued

| | |
|---|---|
| Δε | −4.2 |
| η/mPa · s | 23.8 |
| $\gamma_1$/mPa · s | 106 |
| $\gamma_1/\Delta n^2 \times 10^{-2}$ | 138 |
| 3-Cy—Cy-4 | 20% |
| 3-Cy—Cy-5 | 15% |
| 2-Cy—Ph5—O2 | 16% |
| 3-Cy—Ph5—O4 | 16% |
| 2-Cy—Ph—Ph5—O2 | 7% |
| 3-Cy—Ph—Ph5—O2 | 8% |
| 3-Cy—Cy—Ph5—O3 | 5% |
| 4-Cy—Cy—Ph5—O2 | 5% |
| 5-Cy—Cy—Ph5—O2 | 5% |
| 3-Cy—Cy—Ph-1 | 3% |

TABLE 62

| | Comparative Example 37 | Comparative Example 38 | Comparative Example 39 | Comparative Example 40 |
|---|---|---|---|---|
| Liquid crystal composition | Comparative liquid crystal composition 10 | Comparative liquid crystal composition 10 | Comparative liquid crystal composition 10 | Comparative liquid crystal composition 10 |
| Color filter | Color filter 1 | Color filter 2 | Color filter 3 | Color filter 4 |
| VHR | 98.3 | 98.2 | 98.0 | 97.8 |
| ID | 149 | 158 | 173 | 189 |
| Screen burn-in | Poor | Poor | Poor | Poor |

TABLE 63

| | Comparative Example 41 | Comparative Example 42 | Comparative Example 43 | Comparative Example 44 |
|---|---|---|---|---|
| Liquid crystal composition | Comparative liquid crystal composition 11 | Comparative liquid crystal composition 11 | Comparative liquid crystal composition 11 | Comparative liquid crystal composition 11 |
| Color filter | Color filter 1 | Color filter 2 | Color filter 3 | Color filter 4 |
| VHR | 98.4 | 98.2 | 98.1 | 98.0 |
| ID | 142 | 155 | 164 | 172 |
| Screen burn-in | Poor | Poor | Poor | Poor |

As compared with the liquid crystal display device of the present invention, each of the liquid crystal display devices of Comparative Examples 37 to 44 had lower VHR and larger ID. In the evaluation of screen burn-in, an afterimage was observed, which was unacceptable.

Comparative Examples 45 to 56

As in Example 1, comparative liquid crystal compositions shown in Table 64 were placed, the color filters 1 to 4 shown in Table 8 were used to produce liquid crystal display devices of Comparative Examples 45 to 56, and the VHR and ID thereof were measured. The screen burn-in of each liquid crystal display device was evaluated. Tables 65 and 67 show results of the measurement and evaluation.

TABLE 64

| Comparative liquid crystal composition 12 | |
|---|---|
| $T_{NI}$/° C. | 74.9 |
| Δn | 0.103 |
| Δε | −2.34 |
| η/mPa · s | 18.4 |
| $\gamma_1$/mPa · s | 106 |
| $\gamma_1/\Delta n^2 \times 10^{-2}$ | 99 |
| 3-Cy—Cy-2 | 20% |
| 3-Cy—Cy-4 | 12% |
| 3-Cy—Cy-5 | 5% |
| 3-Cy—Ph—O1 | 5% |
| 2-Cy—Ph5—O2 | 7% |
| 3-Cy—Ph5—O4 | 8% |
| 2-Cy—Ph—Ph5—O2 | 6% |
| 3-Cy—Ph—Ph5—O2 | 6% |
| 3-Cy—Cy—Ph5—O3 | 4% |
| 4-Cy—Cy—Ph5—O2 | 4% |
| 5-Cy—Cy—Ph5—O2 | 4% |
| 3-Ph—Ph5—Ph-2 | 7% |
| 4-Ph—Ph5—Ph-2 | 8% |
| 3-Cy—Cy—Ph-1 | 4% |
| Comparative liquid crystal composition 13 | |
| $T_{NI}$/° C. | 79.6 |
| Δn | 0.104 |
| Δε | −2.39 |
| η/mPa · s | 18.9 |
| $\gamma_1$/mPa · s | 108 |
| $\gamma_1/\Delta n^2 \times 10^{-2}$ | 99 |
| 3-Cy—Cy-2 | 20% |
| 3-Cy—Cy-4 | 12% |
| 3-Cy—Cy-5 | 5% |
| 3-Cy—Ph—O1 | 2% |
| 2-Cy—Ph5—O2 | 7% |
| 3-Cy—Ph5—O4 | 8% |
| 2-Cy—Ph—Ph5—O2 | 6% |
| 3-Cy—Ph—Ph5—O2 | 6% |
| 3-Cy—Cy—Ph5—O3 | 4% |
| 4-Cy—Cy—Ph5—O2 | 4% |
| 5-Cy—Cy—Ph5—O2 | 4% |
| 3-Ph—Ph5—Ph-2 | 7% |
| 4-Ph—Ph5—Ph-2 | 8% |
| 3-Cy—Cy—Ph-1 | 7% |
| Comparative liquid crystal composition 14 | |
| $T_{NI}$/° C. | 85.4 |
| Δn | 0.107 |
| Δε | −2.46 |
| η/mPa · s | 20.0 |
| $\gamma_1$/mPa · s | 114 |
| $\gamma_1/\Delta n^2 \times 10^{-2}$ | 99 |
| 3-Cy—Cy-2 | 18% |
| 3-Cy—Cy-4 | 12% |
| 3-Cy—Cy-5 | 5% |
| 2-Cy—Ph5—O2 | 7% |
| 3-Cy—Ph5—O4 | 8% |
| 2-Cy—Ph—Ph5—O2 | 6% |
| 3-Cy—Ph—Ph5—O2 | 6% |
| 3-Cy—Cy—Ph5—O3 | 4% |
| 4-Cy—Cy—Ph5—O2 | 4% |
| 5-Cy—Cy—Ph5—O2 | 4% |
| 3-Ph—Ph5—Ph-2 | 7% |
| 4-Ph—Ph5—Ph-2 | 8% |
| 3-Cy—Cy—Ph-1 | 11% |

TABLE 65

| | Comparative Example 45 | Comparative Example 46 | Comparative Example 47 | Comparative Example 48 |
|---|---|---|---|---|
| Liquid crystal composition | Comparative liquid crystal composition 12 | Comparative liquid crystal composition 12 | Comparative liquid crystal composition 12 | Comparative liquid crystal composition 12 |
| Color filter | Color filter 1 | Color filter 2 | Color filter 3 | Color filter 4 |
| VHR | 98.3 | 98.2 | 98.0 | 97.8 |
| ID | 146 | 159 | 176 | 190 |
| Screen burn-in | Poor | Poor | Poor | Poor |

TABLE 66

|  | Comparative Example 49 | Comparative Example 50 | Comparative Example 51 | Comparative Example 52 |
| --- | --- | --- | --- | --- |
| Liquid crystal composition | Comparative liquid crystal composition 13 | Comparative liquid crystal composition 13 | Comparative liquid crystal composition 13 | Comparative liquid crystal composition 13 |
| Color filter | Color filter 1 | Color filter 2 | Color filter 3 | Color filter 4 |
| VHR | 98.4 | 98.3 | 98.1 | 98.0 |
| ID | 132 | 144 | 162 | 177 |
| Screen burn-in | Bad | Poor | Poor | Poor |

TABLE 67

|  | Comparative Example 53 | Comparative Example 54 | Comparative Example 55 | Comparative Example 56 |
| --- | --- | --- | --- | --- |
| Liquid crystal composition | Comparative liquid crystal composition 14 | Comparative liquid crystal composition 14 | Comparative liquid crystal composition 14 | Comparative liquid crystal composition 14 |
| Color filter | Color filter 1 | Color filter 2 | Color filter 3 | Color filter 4 |
| VHR | 98.5 | 98.3 | 98.4 | 98.1 |
| ID | 129 | 143 | 158 | 170 |
| Screen burn-in | Bad | Poor | Poor | Poor |

As compared with the liquid crystal display device of the present invention, each of the liquid crystal display devices of Comparative Examples 45 to 56 had lower VHR and larger ID. In the evaluation of screen burn-in, an afterimage was observed, which was unacceptable.

Comparative Examples 57 to 60

As in Example 1, a comparative liquid crystal composition shown in Table 68 was placed, the color filters 1 to 4 shown in Table 8 were used to produce liquid crystal display devices of Comparative Examples 57 to 60, and the VHR and ID thereof were measured. The screen burn-in of each liquid crystal display device was evaluated. Table 69 shows results of the measurement and evaluation.

TABLE 68

| Comparative liquid crystal composition 15 | |
| --- | --- |
| $T_{NI}$/° C. | 86.3 |
| Δn | 0.105 |
| Δε | −3.41 |
| η/mPa · s | 26.4 |
| $γ_1$/mPa · s | 149 |
| $γ_1/Δn^2 × 10^{-2}$ | 135 |
| 3-Cy—Cy-2 | 24% |
| 3-Cy—Ph—O1 | 11% |
| 2-Cy—Ph5—O2 | 10% |
| 2-Cy—Ph—Ph5—O2 | 7% |
| 3-Cy—Ph—Ph5—O2 | 9% |
| 3-Cy—Cy—Ph5—O3 | 10% |
| 4-Cy—Cy—Ph5—O2 | 10% |
| 5-Cy—Cy—Ph5—O2 | 10% |
| 3-Ph—Ph5—Ph-2 | 4% |
| 4-Ph—Ph5—Ph-2 | 4% |
| 5-Ph—Ph-1 | 1% |

TABLE 69

|  | Comparative Example 57 | Comparative Example 58 | Comparative Example 59 | Comparative Example 60 |
| --- | --- | --- | --- | --- |
| Liquid crystal composition | Comparative liquid crystal composition 15 | Comparative liquid crystal composition 15 | Comparative liquid crystal composition 15 | Comparative liquid crystal composition 15 |
| Color filter | Color filter 1 | Color filter 2 | Color filter 3 | Color filter 4 |
| VHR | 98.4 | 98.2 | 98.0 | 97.9 |
| ID | 137 | 152 | 167 | 179 |
| Screen burn-in | Poor | Poor | Poor | Poor |

As compared with the liquid crystal display device of the present invention, each of the liquid crystal display devices of Comparative Examples 57 to 60 had lower VHR and larger ID. In the evaluation of screen burn-in, an afterimage was observed, which was unacceptable.

Comparative Examples 61 to 68

The liquid crystal compositions 1, 2, 8, 13, 14, 19, 20, and 26 were placed in the VA cells used in Example 1, the comparative color filter 1 shown in Table 8 was used to produce liquid crystal display devices of Comparative Examples 61 to 68, and the VHR and ID thereof were measured. The screen burn-in of each liquid crystal display device was evaluated. Tables 70 and 71 show results of the measurement and evaluation.

TABLE 70

|  | Comparative Example 61 | Comparative Example 62 | Comparative Example 63 | Comparative Example 64 |
| --- | --- | --- | --- | --- |
| Liquid crystal composition | Liquid crystal composition 1 | Liquid crystal composition 2 | Liquid crystal composition 8 | Liquid crystal composition 13 |
| Color filter | Comparative color filter 1 | Comparative color filter 1 | Comparative color filter 1 | Comparative color filter 1 |
| VHR | 97.3 | 97.5 | 97.6 | 97.4 |
| ID | 220 | 207 | 195 | 212 |
| Screen burn-in | Poor | Poor | Poor | Poor |

TABLE 71

|  | Comparative Example 65 | Comparative Example 66 | Comparative Example 67 | Comparative Example 68 |
| --- | --- | --- | --- | --- |
| Liquid crystal composition | Liquid crystal composition 14 | Liquid crystal composition 19 | Liquid crystal composition 20 | Liquid crystal composition 26 |
| Color filter | Comparative color filter 1 | Comparative color filter 1 | Comparative color filter 1 | Comparative color filter 1 |
| VHR | 97.4 | 97.5 | 97.6 | 97.5 |
| ID | 209 | 206 | 198 | 203 |
| Screen burn-in | Poor | Poor | Poor | Poor |

As compared with the liquid crystal display device of the present invention, each of the liquid crystal display devices of Comparative Examples 61 to 68 had lower VHR and larger ID. In the evaluation of screen burn-in, an afterimage was observed, which was unacceptable.

Examples 121 to 132

As in Example 1, liquid crystal compositions shown in Table 72 were placed, the color filters shown in Table 8 were used to produce liquid crystal display devices of Examples 121 to 132, and the VHR and ID thereof were measured. The screen burn-in of each liquid crystal display device was evaluated. Tables 73 to 75 show results of the measurement and evaluation.

TABLE 72

| Liquid crystal composition 31 | |
|---|---|
| TNI/° C. | 75.5 |
| Δn | 0.103 |
| Δε | −3.1 |
| η/mPa · s | 15.8 |
| γ1/mPa · s | 113 |
| γ1/Δn2 × 10−2 | 113 |
| 3-Cy—Cy-2 | 13% |
| 3-Cy—Cy—V1 | 12% |
| 3-Cy—Cy-4 | 5% |
| 3-Ph—Ph-1 | 3% |
| 5-Ph—Ph-1 | 12% |
| 3-Cy—Cy—Ph-1 | 3% |
| V—Cy—Ph—Ph-3 | 6% |
| 3-Cy—1O—Ph5—O2 | 11% |
| 2-Cy—Cy—1O—Ph5—O2 | 12% |
| 3-Cy—Cy—1O—Ph5—O2 | 12% |
| 4-Cy—Cy—1O—Ph5—O2 | 2% |
| V—Cy—Cy—1O—Ph5—O2 | 3% |
| 1V—Cy—Cy—1O—Ph5—O2 | 6% |
| Liquid crystal composition 32 | |
| TNI/° C. | 75.4 |
| Δn | 0.109 |
| Δε | −3.1 |
| η/mPa · s | 14.9 |
| γ1/mPa · s | 110 |
| γ1/Δn2 × 10−2 | 92 |
| 2-Cy—Cy—V1 | 20% |
| 3-Cy—Cy—V1 | 13% |
| 3-Ph—Ph-1 | 10% |
| 5-Ph—Ph-1 | 5% |
| 3-Cy—Ph—Ph-2 | 6% |
| 1V—Cy—1O—Ph5—O2 | 8% |
| 2-Cy—Cy—1O—Ph5—O2 | 10% |
| 3-Cy—Cy—1O—Ph5—O2 | 10% |
| V—Cy—Cy—1O—Ph5—O2 | 10% |
| 1V—Cy—Cy—1O—Ph5—O2 | 4% |
| 3-Ph—Ph5—Ph-2 | 4% |
| Liquid crystal composition 33 | |
| TNI/° C. | 83.1 |
| Δn | 0.114 |
| Δε | −2.9 |
| η/mPa · s | 14.8 |
| γ1/mPa · s | 92 |
| γ1/Δn2 × 10−2 | 71 |
| V2—Ph—Ph-1 | 5% |
| 3-Cy—Cy—V | 39% |
| 3-Cy—1O—Ph5—O2 | 5% |
| 2-Cy—Cy—1O—Ph5—O2 | 11% |
| 3-Cy—Cy—1O—Ph5—O1 | 11% |
| 3-Cy—Cy—1O—Ph5—O2 | 6% |
| 2-Cy—Ph—Ph5—O2 | 6% |
| 3-Ph—Ph5—Ph-1 | 8% |
| 3-Ph—Ph5—Ph-2 | 9% |

TABLE 73

| | Example 121 | Example 122 | Example 123 | Example 124 |
|---|---|---|---|---|
| Liquid crystal composition | Liquid crystal composition 31 | Liquid crystal composition 31 | Liquid crystal composition 31 | Liquid crystal composition 31 |
| Color filter | Color filter 1 | Color filter 2 | Color filter 3 | Color filter 4 |
| VHR | 99.6 | 99.4 | 99.3 | 99.2 |
| ID | 15 | 33 | 56 | 73 |
| Screen burn-in | Excellent | Excellent | Excellent | Good |

TABLE 74

| | Example 125 | Example 126 | Example 127 | Example 128 |
|---|---|---|---|---|
| Liquid crystal composition | Liquid crystal composition 32 | Liquid crystal composition 32 | Liquid crystal composition 32 | Liquid crystal composition 32 |
| Color filter | Color filter 1 | Color filter 2 | Color filter 3 | Color filter 4 |
| VHR | 99.5 | 99.3 | 99.2 | 99.1 |
| ID | 24 | 49 | 64 | 77 |
| Screen burn-in | Excellent | Excellent | Excellent | Good |

TABLE 75

| | Example 129 | Example 130 | Example 131 | Example 132 |
|---|---|---|---|---|
| Liquid crystal composition | Liquid crystal composition 33 | Liquid crystal composition 33 | Liquid crystal composition 33 | Liquid crystal composition 33 |
| Color filter | Color filter 1 | Color filter 2 | Color filter 3 | Color filter 4 |
| VHR | 99.5 | 99.3 | 99.1 | 99.0 |
| ID | 28 | 50 | 69 | 83 |
| Screen burn-in | Excellent | Excellent | Good | Good |

Each of the liquid crystal display devices of Examples 121 to 132 had high VHR and small ID. In the evaluation of screen burn-in, no afterimage was observed, or, if any, a very minor afterimage was observed but acceptable.

Examples 133 to 140

As in Example 1, liquid crystal compositions shown in Table 76 were placed, the color filters shown in Table 8 were used to produce liquid crystal display devices of Examples 133 to 140, and the VHR and ID thereof were measured. The screen burn-in of each liquid crystal display device was evaluated. Tables 77 and 78 show results of the measurement and evaluation.

TABLE 76

| Liquid crystal composition 34 | |
|---|---|
| TNI/° C. | 76.3 |
| Δn | 0.106 |
| Δε | −3.0 |
| η/mPa · s | 16.6 |
| γ1/mPa · s | 106 |
| γ1/Δn2 × 10−2 | 95 |
| 3-Cy—Cy-2 | 17% |
| 3-Cy—Ph—Ph-2 | 12% |
| 3-Cy—1O—Ph5—O1 | 11% |
| 3-Cy—1O—Ph5—O2 | 17% |
| 3-Nd—Ph5—Ph-2 | 4% |
| 3-Cy—Cy—V | 5% |
| 3-Cy—Cy—V1 | 10% |
| V—Cy—Ph—Ph-3 | 12% |
| V—Cy—Cy—1O—Ph5—O3 | 12% |
| Liquid crystal composition 35 | |
| TNI/° C. | 76.6 |
| Δn | 0.109 |
| Δε | −3.2 |
| η/mPa · s | 13.9 |
| γ1/mPa · s | 95 |
| γ1/Δn2 × 10−2 | 80 |
| 1V—Cy—1O—Ph5—O2 | 12% |
| 1V—Cy—Cy—1O—Ph5—O2 | 12% |
| 3-Cy—1O—Ph5—O2 | 2% |
| 2-Cy—Cy—1O—Ph5—O2 | 5% |
| 3-Cy—Cy—1O—Ph5—O2 | 4% |
| 3-Cy—Ph—Ph5—O2 | 4% |
| 3-Cy—Cy—V | 38% |

TABLE 76-continued

| | |
|---|---|
| 3-Cy—Cy—V1 | 3% |
| 3-Ph—Ph-1 | 3% |
| V2—Ph—Ph5—Ph—2V | 12% |
| 1V2—Ph—Ph5—Ph2—V1 | 5% |

TABLE 77

| | Example 133 | Example 134 | Example 135 | Example 136 |
|---|---|---|---|---|
| Liquid crystal composition | Liquid crystal composition 34 | Liquid crystal composition 34 | Liquid crystal composition 34 | Liquid crystal composition 34 |
| Color filter | Color filter 1 | Color filter 2 | Color filter 3 | Color filter 4 |
| VHR | 99.5 | 99.3 | 99.2 | 99.1 |
| ID | 30 | 48 | 66 | 78 |
| Screen burn-in | Excellent | Excellent | Excellent | Good |

TABLE 78

| | Example 137 | Example 138 | Example 139 | Example 140 |
|---|---|---|---|---|
| Liquid crystal composition | Liquid crystal composition 35 | Liquid crystal composition 35 | Liquid crystal composition 35 | Liquid crystal composition 35 |
| Color filter | Color filter 1 | Color filter 2 | Color filter 3 | Color filter 4 |
| VHR | 99.4 | 99.3 | 99.1 | 99.0 |
| ID | 34 | 51 | 70 | 86 |
| Screen burn-in | Excellent | Excellent | Excellent | Good |

Each of the liquid crystal display devices of Examples 133 to 140 had high VHR and small ID. In the evaluation of screen burn-in, no afterimage was observed, or, if any, a very minor afterimage was observed but acceptable.

The invention claimed is:

1. A liquid crystal display device comprising a first substrate, a second substrate, a liquid crystal composition layer disposed between the first substrate and the second substrate, a color filter including a black matrix and at least RGB three-color pixel portions, a pixel electrode, and a common electrode, wherein the liquid crystal composition layer contains a liquid crystal composition containing a compound represented by Formula (I) in an amount of 30 to 50%

[Chem. 1]

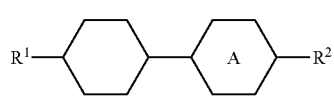

(I)

(where $R^1$ and $R^2$ each independently represent an alkyl group having 1 to 8 carbon atoms, an alkenyl group having 2 to 8 carbon atoms, an alkoxy group having 1 to 8 carbon atoms, or an alkenyloxy group having 2 to 8 carbon atoms; and A represents a 1,4-phenylene group or a trans-1,4-cyclohexylene group), a compound represented by Formula (II-1) in an amount of 5 to 30%

[Chem. 2]

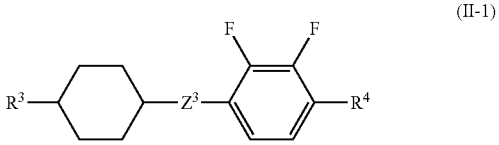

(II-1)

(where $R^3$ represents an alkyl group having 1 to 8 carbon atoms, an alkenyl group having 2 to 8 carbon atoms, an alkoxy group having 1 to 8 carbon atoms, or an alkenyloxy group having 2 to 8 carbon atoms; $R^4$ represents an alkyl group having 1 to 8 carbon atoms, an alkenyl group having 4 to 8 carbon atoms, an alkoxy group having 1 to 8 carbon atoms, or an alkenyloxy group having 3 to 8 carbon atoms; and $Z^3$ represents a single bond, —CH=CH—, —C≡C—, —CH$_2$CH$_2$—, —(CH$_2$)$_4$—, —COO—, —OCO—, —OCH$_2$—, —CH$_2$O—, —OCF$_2$—, or —CF$_2$O—), and a compound represented by Formula (II-2) in an amount of 25 to 45%

[Chem. 3]

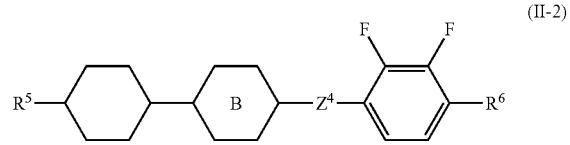

(II-2)

(where $R^5$ represents an alkyl group having 1 to 8 carbon atoms, an alkenyl group having 2 to 8 carbon atoms, an alkoxy group having 1 to 8 carbon atoms, or an alkenyloxy group having 2 to 8 carbon atoms; $R^6$ represents an alkyl group having 1 to 8 carbon atoms, an alkenyl group having 4 to 8 carbon atoms, an alkoxy group having 1 to 8 carbon atoms, or an alkenyloxy group having 3 to 8 carbon atoms; B represents a 1,4-phenylene group or trans-1,4-cyclohexylene group which is optionally substituted with a fluorine atom; and $Z^4$ represents a single bond, —CH=CH—, —C≡C—, —CH$_2$CH$_2$—, —(CH$_2$)$_4$—, —COO—, —OCO—, —OCH$_2$—, —CH$_2$O—, —OCF$_2$—, or —CF$_2$O—), and the black matrix contains a colorant that is at least one pigment selected from carbon black, titanium black, and an organic pigment.

2. The liquid crystal display device according to claim 1, wherein the liquid crystal composition layer further contains a compound represented by Formula (III) in an amount of 3 to 35%

[Chem. 4]

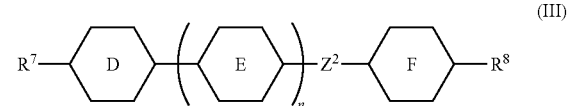

(III)

(where $R^7$ and $R^8$ each independently represent an alkyl group having 1 to 8 carbon atoms, alkenyl group having 2 to 8 carbon atoms, an alkoxy group having 1 to 8 carbon atoms, or an alkenyloxy group having 2 to 8 carbon atoms; D, E, and F each independently represent a 1,4-phenylene group or trans-1,4-cyclohexylene which is optionally substituted with a fluorine atom; $Z^2$ represents a single bond, —OCH$_2$—, —OCO—, —CH$_2$O—, or —COO—; n represents 0, 1, or 2; and the compound represented by Formula (III) is different from the compounds represented by Formulae (I), (II-1), and (II-2)).

3. The liquid crystal display device according to claim 1, wherein at least one pigment having a volume resistivity of not less than $10^6$ Ω·cm and selected from carbon black, titanium black, and an organic pigment is used.

4. The liquid crystal display device according to claim 1, wherein the RGB three-color pixel portions contain colorants that are C. I. Solvent Red 124 for the R pixel portion, a mixture of C. I. Solvent Blue 67 and C. I. Solvent Yellow 162 for the G pixel portion, and C. I. Solvent Blue 7 for the B pixel portion.

5. The liquid crystal display device according to claim 1, wherein the RGB three-color pixel portions contain colorants that are C. I. Pigment Red 254 for the R pixel portion, C. I. Pigment Green 7 and/or 36 for the G pixel portion, and C. I. Pigment Blue 15:6 for the B pixel portion.

6. The liquid crystal display device according to claim 1, wherein the R pixel portion contains at least one organic dye or pigment selected from the group consisting of C. I. Pigment Red 177, 242, 166, 167, and 179; C. I. Pigment Orange 38 and 71; C. I. Pigment Yellow 150, 215, 185, 138, and 139; C. I. Solvent Red 89; C. I. Solvent Orange 56; and C. I. Solvent Yellow 21, 82, 83:1, 33, and 162.

7. The liquid crystal display device according to claim 1, wherein the G pixel portion contains at least one organic dye or pigment selected from the group consisting of C. I. Pigment Yellow 150, 215, 185, and 138 and C. I. Solvent Yellow 21, 82, 83:1, and 33.

8. The liquid crystal display device according to claim 1, wherein the B pixel portion contains at least one organic dye or pigment selected from the group consisting of C. I. Pigment Blue 1; C. I. Pigment Violet 23; C. I. Basic Blue 7; C. I. Basic Violet 10; C. I. Acid Blue 1, 90, and 83; and C. I. Direct Blue 86.

9. The liquid crystal display device according to claim 1, wherein the color filter includes the black matrix, the RGB three-color pixel portions, and a Y pixel portion, and the Y pixel portion contains a colorant that is at least one yellow organic dye or pigment selected from the group consisting of C. I. Pigment Yellow 150, 215, 185, 138, and 139 and C. I. Solvent Yellow 21, 82, 83:1, 33, and 162.

10. The liquid crystal display device according to claim 1, wherein at least one compound represented by Formula (I) in which A represents a trans-1,4-cyclohexylene group and at least one compound represented by Formula (I) in which A represents a 1,4-phenylene group are used.

11. The liquid crystal display device according to claim 1, wherein at least one compound represented by Formula (II-2) in which B represents a 1,4-phenylene group and at least one compound represented by Formula (II-2) in which B represents a trans-1,4-cyclohexylene group are used.

12. The liquid crystal display device according to claim 2, wherein the amount of the compounds represented by Formulae (II-1), (II-2), and (III) is in the range of 35 to 70%.

13. The liquid crystal display device according to claim 1, wherein in the liquid crystal composition contained in the liquid crystal composition layer, Z represented by the following formula is not more than 13000

$$Z = \frac{\gamma 1}{\Delta n^2} \qquad \text{[Math. 1]}$$

(where γ1 represents rotational viscosity, and Δn represents refractive index anisotropy), γ1 is not more than 150, and Δn ranges from 0.08 to 0.13.

14. The liquid crystal display device according to claim 1, wherein in the liquid crystal composition contained in the liquid crystal composition layer, the upper limit of the nematic liquid crystal phase temperature is in the range of 60 to 120° C., the lower limit of the nematic liquid crystal phase temperature is −20° C. or lower, the difference between the upper limit and the lower limit of the nematic liquid crystal phase temperature is in the range of 100 to 150.

15. The liquid crystal display device according to claim 1, wherein the liquid crystal composition contained in the liquid crystal composition layer has a specific resistance of not less than $10^{12}$ (Ω·m).

16. The liquid crystal display device according to claim 1, wherein the liquid crystal composition further contains a polymerizable compound represented by Formula (V)

[Chem. 5]

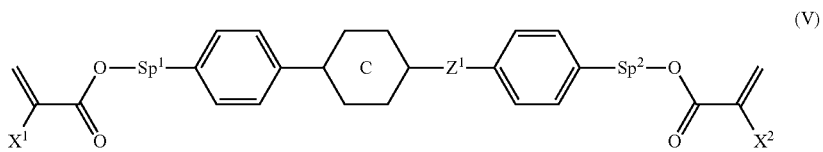

(V)

(where $X^1$ and $X^2$ each independently represent a hydrogen atom or a methyl group; $Sp^1$ and $Sp^2$ each independently represent a single bond, an alkylene group having 1 to 8 carbon atoms, or —O—(CH$_2$)$_s$— (where s represents an integer from 2 to 7, and the oxygen atom is connected to an aromatic ring); $Z^1$ represents —OCH$_2$—, —CH$_2$O—, —COO—, —OCO—, —CF$_2$O—, —OCF$_2$—, —CH$_2$CH$_2$—, —CF$_2$CF$_2$—, —CH=CH—COO—, —CH=CH—OCO—, —COO—CH=CH—, —OCO—CH=CH—, —COO—CH$_2$CH$_2$—, —OCO—CH$_2$CH$_2$—, —CH$_2$CH$_2$—COO—, —CH$_2$CH$_2$—OCO—, —COO—CH$_2$—, —OCO—CH$_2$—, —CH$_2$—COO—, —CH$_2$—OCO—, —CY$^1$=CY$^2$— (where $Y^1$ and $Y^2$ each independently represent a fluorine atom or a hydrogen atom), —C≡C—, or a single bond; C represents a 1,4-phenylene group, a trans-1,4-cyclohexylene group, or a single bond; and in each 1,4-phenylene group in the formula, any hydrogen atom is optionally substituted with a fluorine atom), and the liquid crystal composition is polymerized to serve as the liquid crystal composition layer.

17. The liquid crystal display device according to claim 16, wherein in Formula (V), C represents a single bond, and $Z^1$ represents a single bond.

\* \* \* \* \*